(12) United States Patent
Ning

(10) Patent No.: US 10,495,856 B2
(45) Date of Patent: Dec. 3, 2019

(54) WIDE-ANGLE LENSES WITH LOW DISTORTION

(71) Applicant: Alex Ning, Carlsbad, CA (US)

(72) Inventor: Alex Ning, Carlsbad, CA (US)

(*) Notice: Subject to any disclaimer, the term of this patent is extended or adjusted under 35 U.S.C. 154(b) by 310 days.

(21) Appl. No.: 15/518,228

(22) PCT Filed: Oct. 25, 2015

(86) PCT No.: PCT/US2015/057266
§ 371 (c)(1),
(2) Date: Apr. 10, 2017

(87) PCT Pub. No.: WO2016/069418
PCT Pub. Date: May 6, 2016

(65) Prior Publication Data
US 2017/0307857 A1    Oct. 26, 2017

Related U.S. Application Data

(60) Provisional application No. 62/212,489, filed on Aug. 31, 2015, provisional application No. 62/158,352, filed on May 7, 2015, provisional application No. 62/069,227, filed on Oct. 27, 2014.

(51) Int. Cl.
*G02B 13/06* (2006.01)
*G02B 9/62* (2006.01)
*G02B 9/64* (2006.01)
*G02B 13/18* (2006.01)

(52) U.S. Cl.
CPC .............. *G02B 13/06* (2013.01); *G02B 9/62* (2013.01); *G02B 9/64* (2013.01); *G02B 13/18* (2013.01)

(58) Field of Classification Search
CPC .... G02B 13/06; G02B 13/18; G02B 13/0045; G02B 13/005; G02B 9/62; G02B 9/64; G02B 15/177
USPC .......................................... 359/761, 762, 770
See application file for complete search history.

(56) References Cited

U.S. PATENT DOCUMENTS

| | | |
|---|---|---|
| 4,211,472 A | 7/1980 | Nakamura |
| 4,381,888 A | 5/1983 | Momiyama |
| 5,805,359 A | 9/1998 | Yamanashi |
| 7,443,612 B2 | 10/2008 | Suzuki |
| 7,864,452 B2 | 1/2011 | Ning |
| 7,869,141 B2 | 1/2011 | Ning |
| 7,929,221 B2 | 4/2011 | Ning |
| 8,203,798 B2 | 6/2012 | Takato |
| 8,237,842 B2 | 8/2012 | Wakamiya |
| 8,254,040 B2 | 8/2012 | Peng et al. |
| 8,264,783 B2 | 9/2012 | Peng et al. |
| 8,416,510 B2 | 4/2013 | Kubota et al. |
| 8,416,512 B2 | 4/2013 | Harada et al. |
| 8,873,167 B2 | 10/2014 | Ning |
| 2004/0027685 A1* | 2/2004 | Mihara ................... G02B 13/22 359/686 |

(Continued)

*Primary Examiner* — Bumsuk Won
*Assistant Examiner* — Jeffrey E Madonna
(74) *Attorney, Agent, or Firm* — Mark Wisnosky

(57) ABSTRACT

A wide-angle lens system that includes four lens groups arranged from object to image and having a field of view greater than 90 degrees is described. The lens elements within each of the four groups are selected for optimization of performance factors of low chromatic aberration, low optical distortion and manufacturability. Design methods are included and shown through exemplary optimized designs.

22 Claims, 34 Drawing Sheets

Example 1

(56) References Cited

U.S. PATENT DOCUMENTS

| | | | |
|---|---|---|---|
| 2006/0061873 A1* | 3/2006 | Saori | G02B 15/177 |
| | | | 359/680 |
| 2009/0219631 A1 | 9/2009 | Ning | |
| 2009/0231708 A1* | 9/2009 | Shibata | G02B 15/177 |
| | | | 359/557 |
| 2010/0073778 A1* | 3/2010 | Hirakawa | G02B 15/177 |
| | | | 359/684 |
| 2011/0211267 A1 | 9/2011 | Takato | |
| 2011/0279908 A1* | 11/2011 | Kon | G02B 15/177 |
| | | | 359/686 |
| 2013/0128369 A1 | 5/2013 | Kim | |
| 2014/0071333 A1 | 3/2014 | Kanetaka et al. | |
| 2014/0177067 A1* | 6/2014 | Saori | G02B 15/177 |
| | | | 359/686 |
| 2014/0240851 A1 | 8/2014 | Kawamura | |

* cited by examiner

Example 1

WIDE-ANGLE LENSES WITH LOW DISTORTION

CROSS-REFERENCE TO RELATED APPLICATIONS

This application claims priority to U.S. Provisional applications: 62/158352, titled: Super wide-angle lenses with low lateral color and distortion, filed May 7, 2015; and, 62/069227, titled: Super wide-angle lenses with low lateral color aberration and low optical distortion, filed Oct. 27, 2014; and, 62/212489, titled: Super wide angle low distortion lens, filed Aug. 31, 2015. All prior applications and this application are by the same inventor and all prior applications are currently pending.

BACKGROUND OF THE INVENTION

Technical Field

The present invention relates to wide-angle lens systems for optical imaging that are designed with low color aberration and low optical distortion.

Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. Lateral chromatic aberration is the separation of image height on the focal plane at off-axis field points between light rays of different wavelengths. Optical distortion is deformation of the geometric shape of the objects. These aberration becomes more significant and difficult to correct for wide-angle lenses.

DISCLOSURE OF THE INVENTION

A "lens" or "lens system" in the present invention is comprised of multiple lens elements. The term "lens elements" as used here are also known in the art as simply lenses. A positive lens element is a lens element having a positive effective focal length. A negative element has negative effective focal length. The word "lens element" and "element" are used interchangeably unless otherwise specified. The lens elements are arranged into groups. The present invention is a lens system that is comprised of four lens element groups. The groups are arranged and numbered sequentially from object to image along the optical axis of the lens system with each lens element, also arranged and numbered sequentially from object to image, having it center on the optical axis and each lens element is circularly symmetric about the optical axis.

All of the lens systems of this invention adhere to a general description. The lens system is comprised of four groups of lens elements. The groups arranged sequentially from object to image are:

Group 1: This is the first lens group facing the object space starting from the outermost element facing the object space, and ending with an element just prior to a positive element. This first group has negative power. This group comprises 2 to 3 elements with the first element being either positive or negative, and the remaining negative. Some or all elements in this group are aspheric with at least one of the two surfaces described by the following aspheric equation:

$$z = \frac{cr^2}{1 + \sqrt{1-(1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

where z is the sag height at radial distance r from the optical axis, k is the conic constant and $\alpha_i$ (i=1,2,3 ... 8) are the aspheric coefficients.

In a preferred embodiment a positive power lens element is included as the first lens element of the group. In a second preferred embodiment there is at least one aspheric element forming a subgroup within this group to provide optical distortion correction. In a third preferred embodiment the aspheric element is the first element. In another embodiment the aspheric element has negative power and it is made of plastic material such as Zeonex® materials manufactured by Zeon Corporation in Japan. The effective focal length of this group F1 satisfies the following condition:

$$-1.38 = <F1/F= <-0.68 \quad (1)$$

where F is the effective focal length of the entire lens assembly.

Group 2: This group is the next group that the rays encounter after group 1 starting with a positive element and ending before the aperture stop. This group has positive power. Prior art uses a single positive element in this group (For example, U.S. Pat. No. 7,929,221) to correct the lateral color. However if this group is made of a special structure with at least two elements as shown by several of the following examples lateral chromatic aberration can be further improved. In another embodiment the two elements in group 2 are a cemented doublet. In a preferred embodiment the group includes at least two elements made with materials having moderate Abbe values. The Abbe value of any element in this group satisfies the following condition:

$$V2i>=35.3 \quad (2)$$

where i is the element number for elements in Group 2. With 2 or more elements in this group, the average Abbe value of all elements in this group satisfies the following condition:

$$37.2=<V2\text{ave}=<57.5 \quad (3)$$

The effective focal length of this group F2 satisfies the following condition:

$$1.27=<F2/F=<3.56 \quad (4)$$

There is a separate mechanical aperture or spacer structure between Group 2 and the next lens Group 3.

Group 3: This lens group starts with the first element after the aperture stop, and ends with the negative element of the doublet pair. It comprises a doublet lens element structure. A doublet lens structure is made of two elements with opposing power. The negative element is either a meniscus or double concave element. The two elements are often cemented together with optical cement to form a cemented doublet. The negative element of the doublet faces the image plane. In another embodiment the third group further includes a positive power lens element that is placed nearer the object than the doublet. The negative element of the doublet is made with material having an Abbe value satisfying the following condition:

$$23.8=<V3n=<28.3 \quad (5)$$

Where V3n is the Abbe value of the negative element of the doublet pair.

The following condition is satisfied by the radius of curvature Rd of the common surface of the doublet pair. In case of cemented doublet, Rd is the image surface radius of the positive element and the object surface radius of the negative element.

In case of an air-spaced doublet, Rd is the average value of the image surface radius of the positive element, and the object surface radius of the negative element.

$$0.6 =< |Rd/F| =< 1.51 \qquad (6)$$

The effective focal length of this group F3 satisfies the following condition:

$$|F3/F| =< 168.3 \qquad (7)$$

Group 4: This lens group has positive power starting from the first element after the negative element of the doublet pair in the $3^{rd}$ group and ends before any flat filters or sensor cover glass. The effective focal length F4 of this group satisfies the following condition:

$$2.23 =< F4/F =< 5.36 \qquad (8)$$

In the preferred embodiment there is 1 to 2 aspheric elements in this group forming a subgroup to provide aberration correction. In another preferred embodiment at least one aspheric element has a complex surface profile where the local tangent of the surface changes sign from positive to negative or negative to positive from the center to the perimeter of the element. In another embodiments there are two aspheric elements constituting a sub-group within Group 4. In another embodiment the aspheric elements are made of plastic materials. The aspheric elements have compensating positive power balancing the negative power of the aspheric elements in Group 1.

In a preferred embodiment, the following condition is satisfied:

$$-1.22 =< F1a/F4a =< -0.5 \qquad (9)$$

where F1a is the effective focal length of the subgroup of aspheric elements in Group 1 and F4a is the effective focal length of the aspheric elements in Group 4. In preferred embodiments, |F1a|/F4a is between 0.75 and 1.25. In other words, the power of the positive aspheric element subgroup in Group 4 deviates less than 25% from the absolute power of the aspheric element subgroup in Group 1.

The following condition is satisfied:

$$F1a/F =< -1.55 \qquad (10)$$

When the aspheric elements are made of plastic elements, the focal plane of the lens assembly can be sensitive to temperature changes in the environment. When conditions (9) and (10) are met individually or jointly the lens assembly can be thermally de-sensitized to lessen the effect of thermal induced focus shift.

In preferred embodiments the following condition is satisfied:

$$-0.66 =< F1/F2 =< -0.33 \qquad (1)$$

The examples further show filter elements and an image sensor cover glass. These elements are shown as being located between the last lens element of Group 4 and image plane.

The invention therefore includes design options. Changes in one lens element(s) are not independent of the other lens elements in the system. Selection of particular lens element(s) optimizing for reduced color aberration or reduced optical distortion or design for manufacturability will require optimization of the other elements in the design to maintain performance. The lens design of the current invention allows for such choices and optimization for particular performance. The examples that follow show design choices that focus on reduced lateral chromatic aberration, reduced optical distortion and design for manufacturability. The preferred embodiments include improvements in both chromatic aberration and optical distortion performance. The present invention provides the designer with a lens system where such trade-offs can be made. The examples that follow demonstrate this flexibility of the invented lens system.

MODES FOR CARRYING OUT THE INVENTION

Example 1

Figure 1:
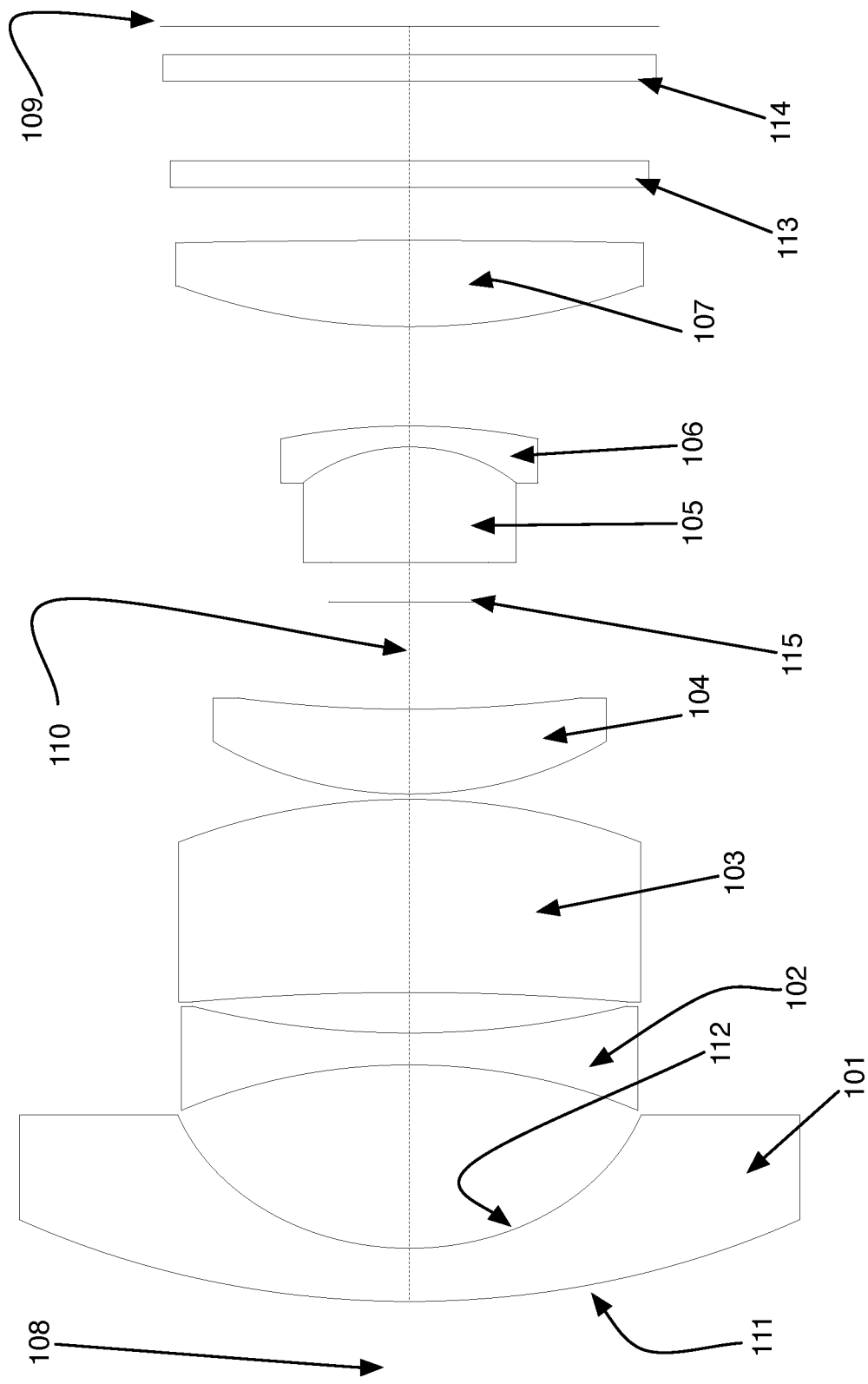
FIG. 1 shows a first embodiment: a seven-element design, also identified as Example 1.

FIG. 1 shows the layout of Example 1. This design has a field angle of +/−75° (for a total field of view 150°) with a relative aperture of F/2.8. The lens system is comprised sequentially from object end 108 to image plane 109 of seven lens elements 101-107. Each lens element is centered on the optical axis 110 of the lens system and each lens element is shown in a side cross-sectional view. Also shown are a filter 113 and a cover glass 114 for the image sensor 109. The first lens element 101 is a negative power meniscus lens having an object surface 111 and an image surface 112. All the other lens elements 102-107 similarly have object and image surfaces but these are not labeled so as to keep the Figure readable. The first lens element's object surface 111 is convex in all of the embodiments. The first lens elements image surface 112 is concave. The image surfaces 111, 112 are identified sequentially as surface 1 and surface 2 in Table 1 that gives the detailed prescription for the lens design of FIG. 1. This is true for all surfaces in the lens design. Therefore the object surface of the second lens element 102 is surface 3 and the image surface of the second lens element 102 is surface 4 and so on. The second lens element 102 is an element with negative power. These two elements 101, 102 form the first lens group and fit the general description for Group 1 as discussed above.

The second lens group is comprised of two lens elements: the third lens element 103 and the fourth lens element 104. The group has positive power and the second and last element 104 is a meniscus element with positive power having a concave image-facing surface. The Abbe # of the material for this meniscus element 104, as discussed below in conjunction with table 1, is 46.6. Again, the elements fit the general prescription for Group 2 as discussed above: two lens elements, positive power and the image surface of the element nearest the image plane is concave and the Abbe # for the material of the last image facing element satisfies (2a), (2b) and (3).

Following the second lens group sequentially from object to image is the aperture 115. The aperture separates the second lens group and the third lens group. The third lens group comprises a doublet lens element structure. A doublet lens structure is made of two elements 105, 106 with opposing power. The negative element 106 is either a meniscus or double concave element. The two elements are cemented together with optical cement to form a cemented doublet. The negative element 106 of the doublet faces the image plane. The common surface of the cemented doublet has a negative radius of curvature.

The fourth lens group is comprised of a single lens element 107. This lens group has positive power. In this embodiment the lens element is spherical. There are no aspherical elements in this example. In the preferred embodiment, and in examples discussed below, there is at least one aspheric element in this group to provide improved distortion correction.

Also shown in FIG. 1 are a filter element 113 and cover 114 for the image sensor 109.

Table 1 shows the prescription of Example 1. Lens curvature reported as radii are measured with the origin on the image side using notation known in the art. The notation used here is as used in the optical analysis software such as Zemax® (Zemax is a registered trademark of Radiant Zemax, LLC). The format for the table is the same for all subsequent examples. The surface refers to the surface of each lens element in sequence from object to image. Therefore surface 1 is the object surface 111 of the first lens element 101 of Example 1 as shown in FIG. 1. Surface 2 is the image surface 112 of the first lens element 101 of Example 1. Surface 3 is the object surface of the second lens element 102 of example 1, and so forth. The Surface type is identified as either Standard or Aspheric. In the Example 1 all lens surfaces are spherical. A positive radius implies that the center of the surface is on the image side of the surface and a negative radius the object side. A value of infinity implies a planar surface. The thickness is the distance to the next nearest surface. The values for radius, thickness and diameter are all given in millimeters. However the performance is not dependent upon the particular dimensions. That is the design can be scaled to any dimension. Nd is the index of refraction at d-line for the material of the lens element associated with the particular surface. Similarly Abbe # are given for the lens element associated with the surface. As shown the first lens element 101 of Example 1 is made from material having an index of refraction of 1.911 and an Abbe # of 35.256. The diameter is the diameter of the lens element again given in mm but could be scaled to any size with equivalent performance. Finally the comments are given to help with clarity comment "L1" implies the values in that row refer to the first lens element. Group 1 is comprised of L1 and L2. Group 2 is comprised of L3 and L4. Group 3 is comprised of lens elements L5 and L6 and Group 4 is comprised of lens element L7. The prescriptions for other examples discussed below use the same format.

TABLE 1

Optical Prescription of Example 1

| Surface | Type | Radius | Thickness | Nd | Abbe # | Diameter | Comment |
|---|---|---|---|---|---|---|---|
| 1 | STANDARD | 12.479 | 1.000 | 1.911 | 35.256 | 12.006 | L1 |
| 2 | STANDARD | 3.787 | 3.454 | | | 7.131 | |
| 3 | STANDARD | −7.613 | 0.600 | 1.593 | 68.327 | 7.030 | L2 |
| 4 | STANDARD | 11.352 | 0.763 | | | 6.684 | |

TABLE 1-continued

Optical Prescription of Example 1

| Surface | Type | Radius | Thickness | Nd | Abbe # | Diameter | Comment |
|---|---|---|---|---|---|---|---|
| 5 | STANDARD | −31.509 | 3.636 | 1.804 | 46.568 | 6.691 | L3 |
| 6 | STANDARD | −8.215 | 0.100 | | | 7.113 | |
| 7 | STANDARD | 5.118 | 1.596 | 1.804 | 46.568 | 6.045 | L4 |
| 8 | STANDARD | 16.543 | 2.021 | | | 5.282 | |
| STO | STANDARD | Infinity | 0.742 | | | 2.479 | Stop |
| 10 | STANDARD | 524.306 | 2.174 | 1.593 | 68.327 | 2.426 | L5 |
| 11 | STANDARD | −2.329 | 0.397 | 1.805 | 25.477 | 3.281 | L6 |
| 12 | STANDARD | −8.125 | 1.868 | | | 3.952 | |
| 13 | STANDARD | 8.678 | 1.624 | 1.755 | 52.329 | 7.117 | L7 |
| 14 | STANDARD | −136.324 | 1.000 | | | 7.193 | |
| 15 | STANDARD | Infinity | 0.500 | 1.517 | 64.212 | 7.324 | Filter |
| 16 | STANDARD | Infinity | 1.492 | | | 7.365 | |
| 17 | STANDARD | Infinity | 0.500 | 1.517 | 64.167 | 7.551 | Sensor cover |
| 18 | STANDARD | Infinity | 0.535 | | | 7.594 | |
| IMA | STANDARD | Infinity | | | | 7.669 | Image Sensor |

Figure 2:
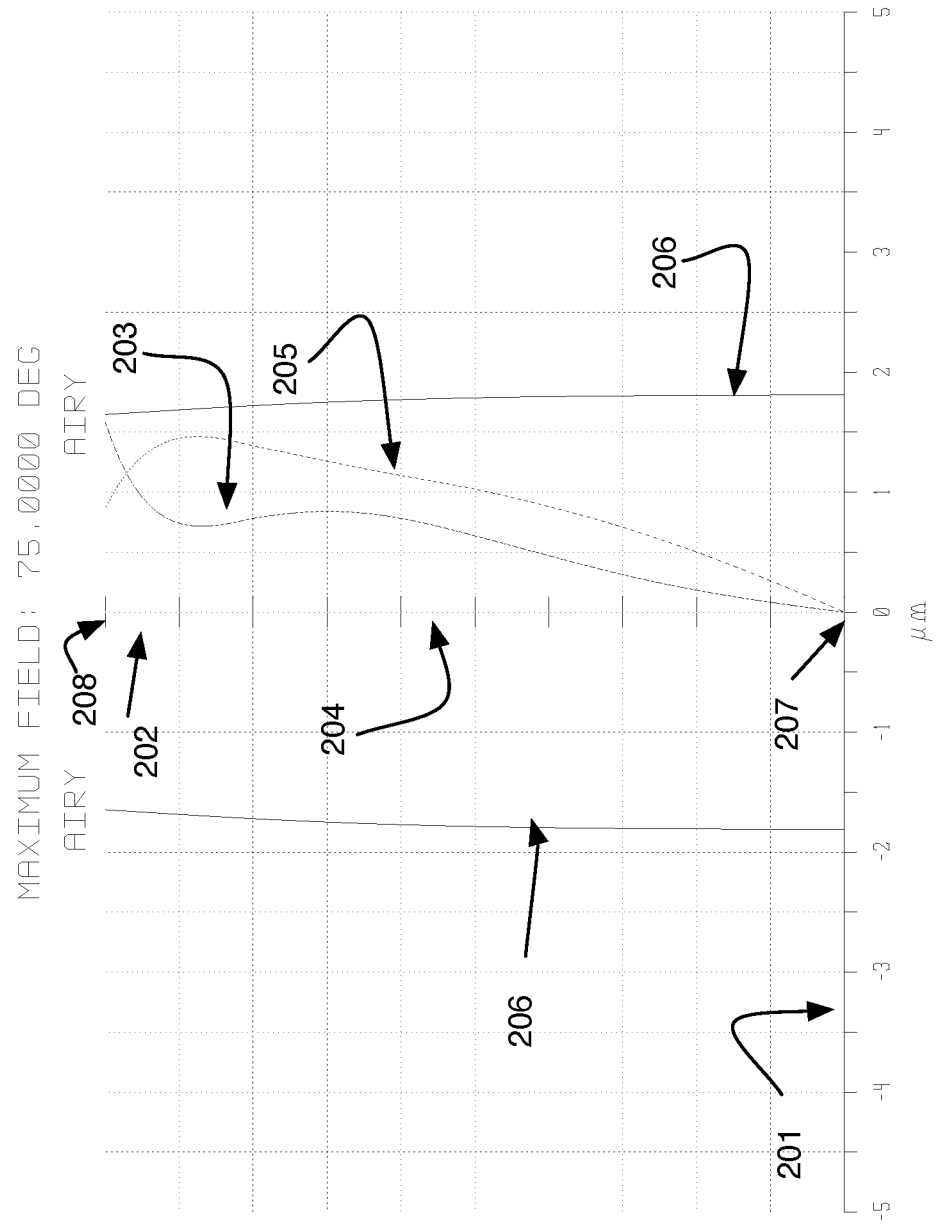
FIG. 2 shows chromatic aberration performance curves for the embodiment of FIG. 1.

FIG. 2 shows predicted chromatic aberration performance for Example 1 from the Zemax® software package (Zemax is a registered trademark of Zemax, LLC a Delaware Limited Liability Company). The x-axis 201 measures distance in microns and the Y-axis 202 refers to the angular distance off the optical axis. In the Example 1 the lens has a half angle field of view of 75 degrees or a full field of view of 150 degrees. The data shown are for Airy disk 206 caused by diffraction of light, as a known performance measure in the art, and for each of colors blue 203, green 204 and red 205. The wavelengths for blue, green, and, red are 0.430 microns, 0.530 microns and 0.630 microns respectively. The values shown are for the image height difference between red 205 and blue 203 chief rays and the green chief ray whose values 204 therefore align with the y-axis 202. The results show that the lateral color correction of the design of Example 1 is very effective. Color performance for other examples discussed below use this same format.

Example 2

Figure 3:
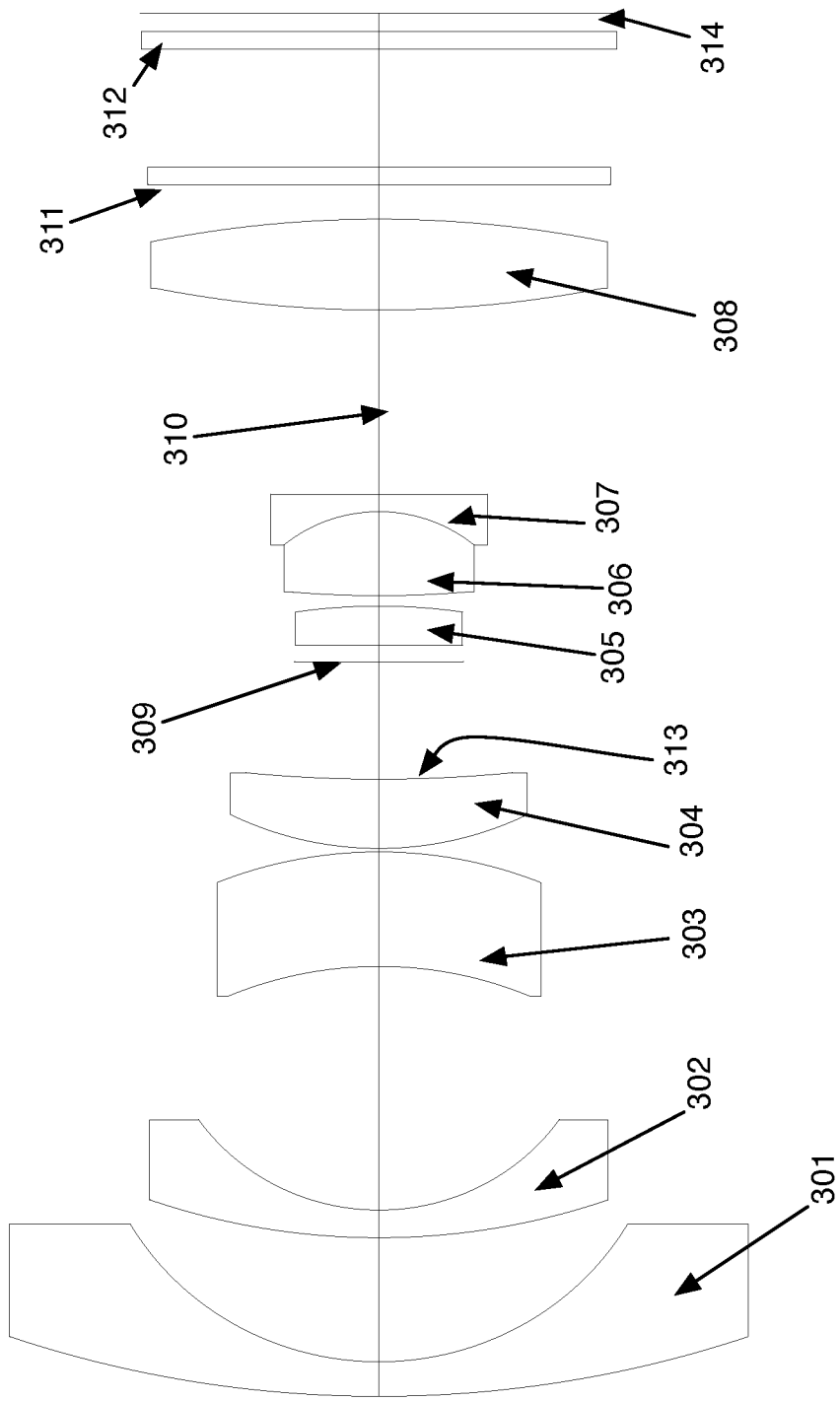
FIG. 3 shows a second embodiment: an eight-element design, also identified as Example 2.

FIG. 3 shows the optical layout of Example 2. This design has a field angle of +/−65 deg, or a 130 degree field of view and a relative aperture of F/2.8. The design is comprised of four groups that total 8 lens elements 301-308 all centered upon the optical axis 310 and arranged sequentially from object to image. Group 1 is the first lens group facing the object space. This group is comprised of negative lens elements 301, 302. The first element (L1) 301 is a meniscus element with a convex surface facing the object. The second lens element 302 in the first group is also a meniscus lens with negative power. This first group has negative power. Both lens elements 301, 302 are spherical. Group 2 is the next group after group 1. This group has positive power. The lens elements 303, 304 of this group are important for lateral color correction. The elements are arranged such that there is a meniscus element 304 with positive power having a concave image-facing surface 313. This element is the last element in this group facing the image plane 314. There is an aperture stop 309 between Group 2 and the next lens group, group 3. Group 3 in this second example is comprised of three lens elements 305, 306, 307. includes the doublet lens element structure of lens element 306, 307. A doublet lens structure is made of two elements with opposing power. The negative element 307 is a meniscus element. The two elements 306, 307 are cemented together with optical cement to form a cemented doublet. The negative element 307 of the doublet faces the image plane. The fourth group is comprised of the single lens element 308. The lens element, and therefore the lens group, has positive power. Although in the preferred embodiment there is at least one aspheric element in this group to provide distortion correction, this example includes only spherical lens elements. The examples further show filter elements 311 and an image sensor cover glass 312. These elements are shown as being located between the last lens element of Group 4 and image plane 314.

Table 2 shows the optical prescription for construction of Example 2. The format is the same as already discussed with Table 1. All lenses in this example are spherical lenses. The units are given in mm but the actual structure of the lens can be scaled to any size.

Example 2, from the description shown in FIG. 3 and the details of Table 2, is seen to adhere to the general description for the first embodiment.

TABLE 2

Optical Prescription of Example 2

| Surface | Type | Radius | Thickness | Nd | Abbe# | Diameter | Comment |
|---|---|---|---|---|---|---|---|
| 1 | STANDARD | 31.350 | 1.000 | 1.593 | 68.327 | 20.539 | L1 |
| 2 | STANDARD | 7.990 | 3.590 | | | 13.822 | |
| 3 | STANDARD | 19.067 | 0.800 | 1.620 | 60.374 | 12.744 | L2 |
| 4 | STANDARD | 6.112 | 7.052 | | | 10.023 | |
| 5 | STANDARD | −10.617 | 3.313 | 1.835 | 42.729 | 8.425 | L3 |
| 6 | STANDARD | −11.844 | 0.100 | | | 9.015 | |
| 7 | STANDARD | 9.178 | 2.003 | 1.911 | 35.256 | 8.260 | L4 |
| 8 | STANDARD | 36.882 | 3.399 | | | 7.400 | |

TABLE 2-continued

Optical Prescription of Example 2

| Surface | Type | Radius | Thickness | Nd | Abbe# | Diameter | Comment |
|---|---|---|---|---|---|---|---|
| STO | STANDARD | Infinity | 0.462 | | | 4.700 | Stop |
| 10 | STANDARD | Infinity | 1.147 | 1.593 | 68.327 | 4.599 | L5 |
| 11 | STANDARD | −15.701 | 0.302 | | | 4.632 | |
| 12 | STANDARD | 28.384 | 2.430 | 1.593 | 68.327 | 4.800 | L6 |
| 13 | STANDARD | −4.102 | 0.500 | 1.847 | 23.791 | 5.280 | L7 |
| 14 | STANDARD | Infinity | 5.334 | | | 6.022 | |
| 15 | STANDARD | 30.937 | 2.630 | 1.923 | 20.882 | 12.350 | L8 |
| 16 | STANDARD | −30.937 | 1.000 | | | 12.692 | |
| 17 | STANDARD | Infinity | 0.500 | 1.517 | 64.212 | 12.847 | Filter |
| 18 | STANDARD | Infinity | 3.421 | | | 12.877 | |
| 19 | STANDARD | Infinity | 0.500 | 1.517 | 64.167 | 13.195 | Sensor Cover |
| 20 | STANDARD | Infinity | 0.530 | | | 13.226 | |
| IMA | STANDARD | Infinity | | | | 13.275 | |

Figure 4:
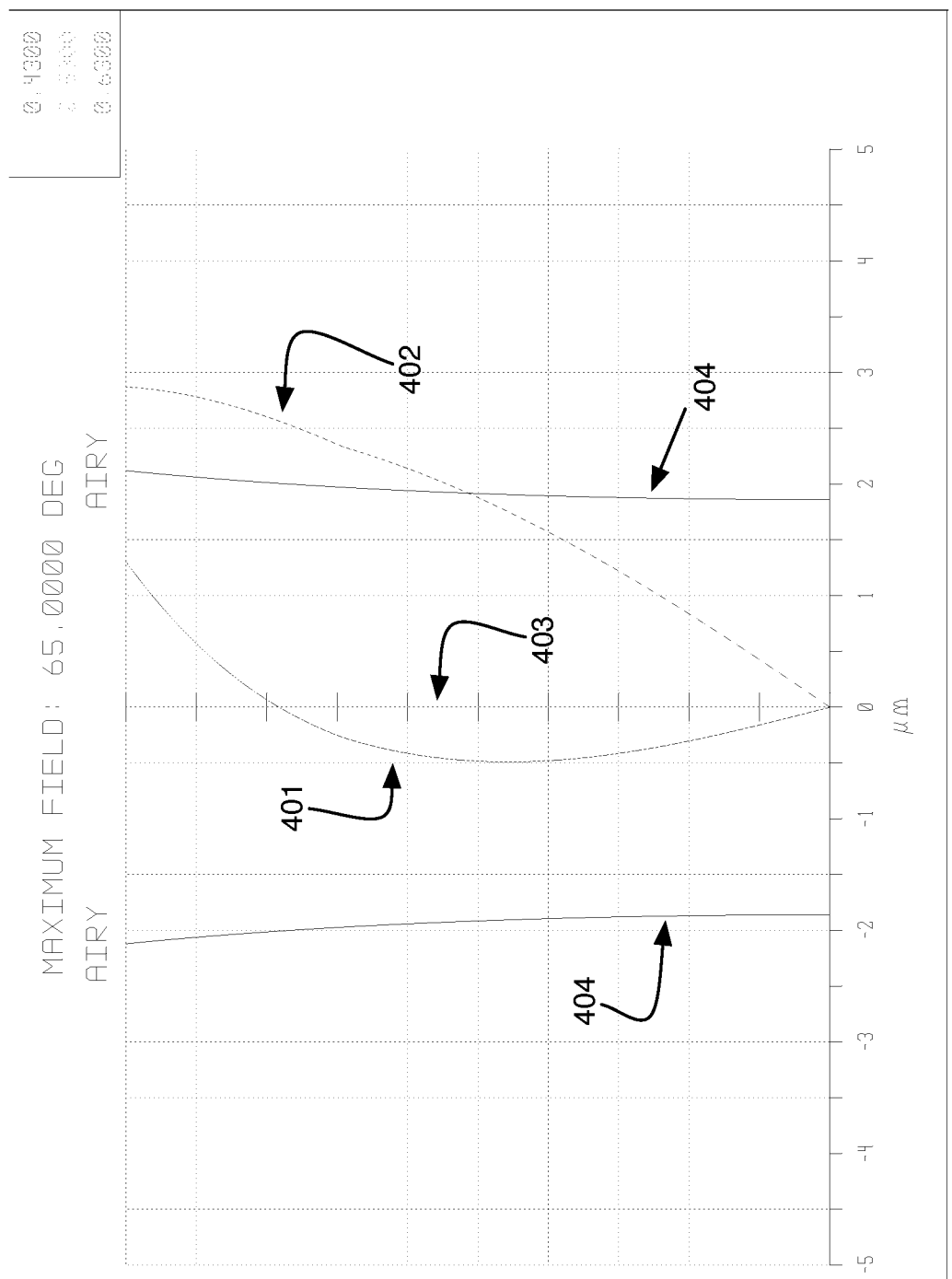
FIG. 4 shows chromatic aberration performance curves for the embodiment of FIG. 3.

FIG. 4 shows color performance for Example 2 and shows that the lateral color is effectively corrected with Example 2. The Figure uses the same form as already discussed with FIG. 2. The focal location for a blue 401 and red 402 line are shown relative to a green line which therefore coincides with the Y axis 403. Locations for an Airy Disk 404 are also shown. The X-axis shows distance in microns and the Y-axis 403 extends from zero to 65 degrees the field angle for example 2.

Example 3

Figure 5:
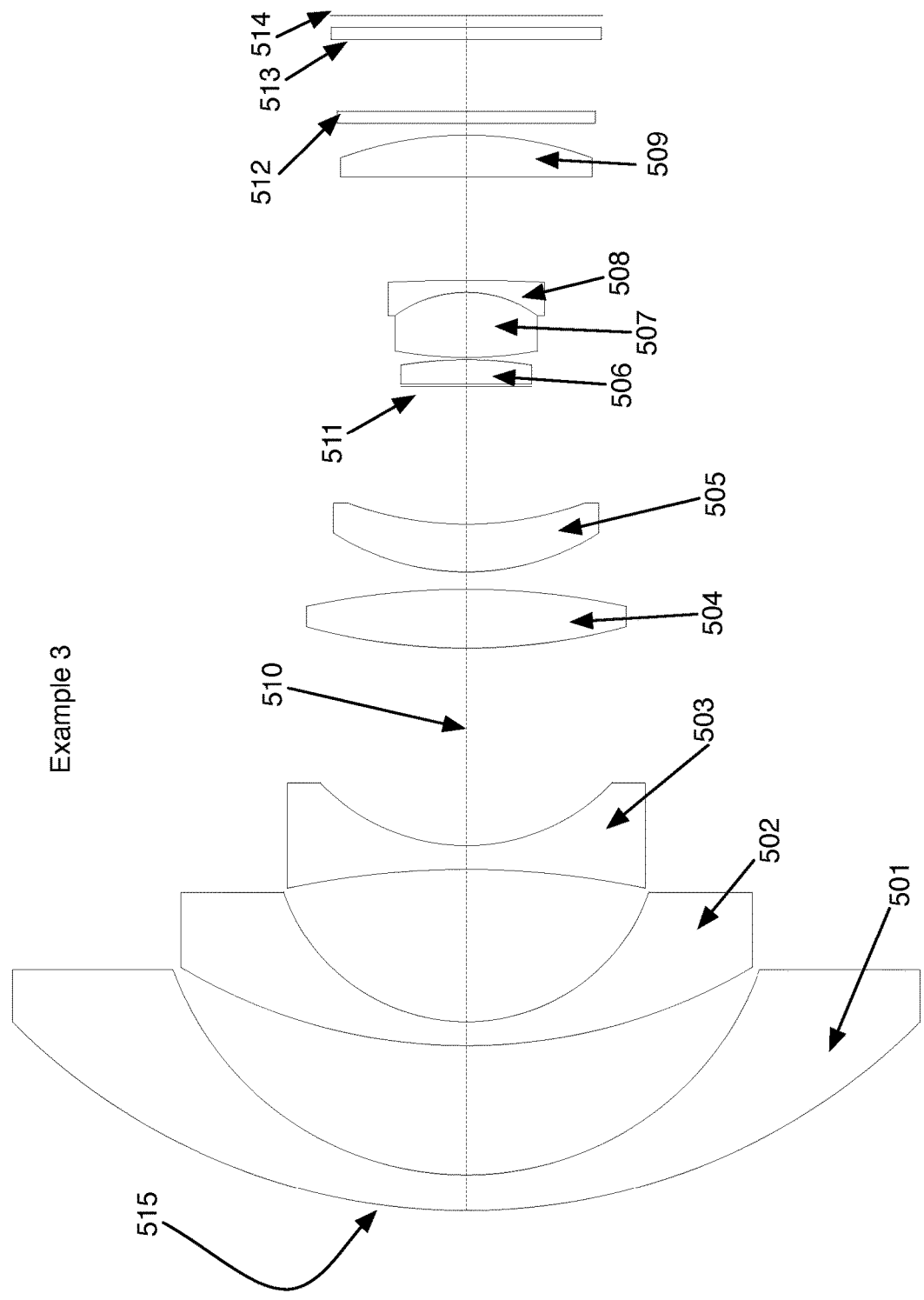
FIG. 5 shows a third embodiment: a nine-element design, also identified as Example 3.

FIG. 5 shows the optical layout of Example 3. This is a fisheye lens with 195 deg total field of view having a F/2.0 aperture. Again the example follows the general description for the first embodiment. The lens system is comprised of four lens groups that include a total of 9 lens elements 501-509. The groups are arranged sequentially from object to image centered upon the optical axis 510. Group 1 includes three lens elements 501-503. The first element 501 is a negative power lens with a convex surface facing the object. This first group has negative power. The second group includes two lens elements 504, 505. This group has positive power. The second element 505 is a meniscus element with positive power having a concave image-facing surface. This element 505 is the last element in this group facing the image space. An aperture stop 511 separates the lens elements 504, 505 of group 2 and the lens elements 506-508 of group 3. Group 3 comprises a doublet lens element structure. A doublet lens structure is made of two elements 507, 508 with opposing power. The negative element 508 is a meniscus element. The two elements are cemented together with optical cement to form a cemented doublet. The negative element 508 of the doublet faces the image plane 514. Group 4 is the final lens group in the sequence from object to image and in this example is comprised of a single lens element 509 having positive power. Although in the preferred embodiment there is at least one aspheric element in this group to provide distortion correction, the single lens element 509 in this example 3 is a spherical lens. The example further shows filter element 512 and an image sensor cover glass 513. These elements are shown as being located between the last lens element 509 of Group 4 and image plane 514. In the preferred embodiment the lens structures have short back focal distance. Table 3 shows the optical prescription for Example 3. The format for the Table 3 is the same as already discussed for Tables 1 and 2. Group 1 comprises L1, L2 and L3. Group 2 comprises L4 and L5. Group 3 is L6, L7 and L8 and Group 4 is L9.

TABLE 3

Optical Prescription for Example 3

| Surf | Type | Radius | Thickness | Nd | Abbe# | Diameter | Comment |
|---|---|---|---|---|---|---|---|
| 1 | STANDARD | 26.307 | 1.500 | 1.786 | 44.207 | 37.546 | L1 |
| 2 | STANDARD | 12.887 | 5.395 | | | 24.279 | |
| 3 | STANDARD | 23.013 | 1.000 | 1.744 | 44.904 | 23.635 | L2 |
| 4 | STANDARD | 7.972 | 6.373 | | | 15.106 | |
| 5 | STANDARD | −35.634 | 1.000 | 1.593 | 68.327 | 14.825 | L3 |
| 6 | STANDARD | 8.274 | 8.261 | | | 12.081 | |
| 7 | STANDARD | 24.994 | 2.451 | 1.835 | 42.729 | 13.238 | L4 |
| 8 | STANDARD | −31.294 | 0.728 | | | 13.112 | |
| 9 | STANDARD | 10.096 | 1.991 | 1.773 | 49.613 | 10.988 | L5 |
| 10 | STANDARD | 14.004 | 5.768 | | | 9.803 | |
| STO | STANDARD | Infinity | 0.100 | | | 5.439 | Stop |
| 12 | STANDARD | Infinity | 1.021 | 1.593 | 68.327 | 5.422 | L6 |
| 13 | STANDARD | −16.128 | 0.096 | | | 5.352 | |
| 14 | STANDARD | 16.422 | 2.710 | 1.593 | 68.327 | 5.626 | L7 |
| 15 | STANDARD | −4.977 | 0.500 | 1.847 | 23.791 | 5.902 | L8 |
| 16 | STANDARD | −69.615 | 4.336 | | | 6.475 | |
| 17 | STANDARD | Infinity | 1.744 | 1.835 | 42.729 | 10.071 | L9 |
| 18 | STANDARD | −14.814 | 0.500 | | | 10.409 | |
| 19 | STANDARD | Infinity | 0.500 | 1.517 | 64.167 | 10.630 | Filter |

TABLE 3-continued

Optical Prescription for Example 3

| Surf | Type | Radius | Thickness | Nd | Abbe# | Diameter | Comment |
|---|---|---|---|---|---|---|---|
| 20 | STANDARD | Infinity | 2.999 | | | 10.680 | |
| 21 | STANDARD | Infinity | 0.500 | 1.517 | 64.167 | 11.137 | Sensor Cover |
| 22 | STANDARD | Infinity | 0.500 | | | 11.187 | |
| IMA | STANDARD | Infinity | | | | 11.275 | image plane |

Figure 6:
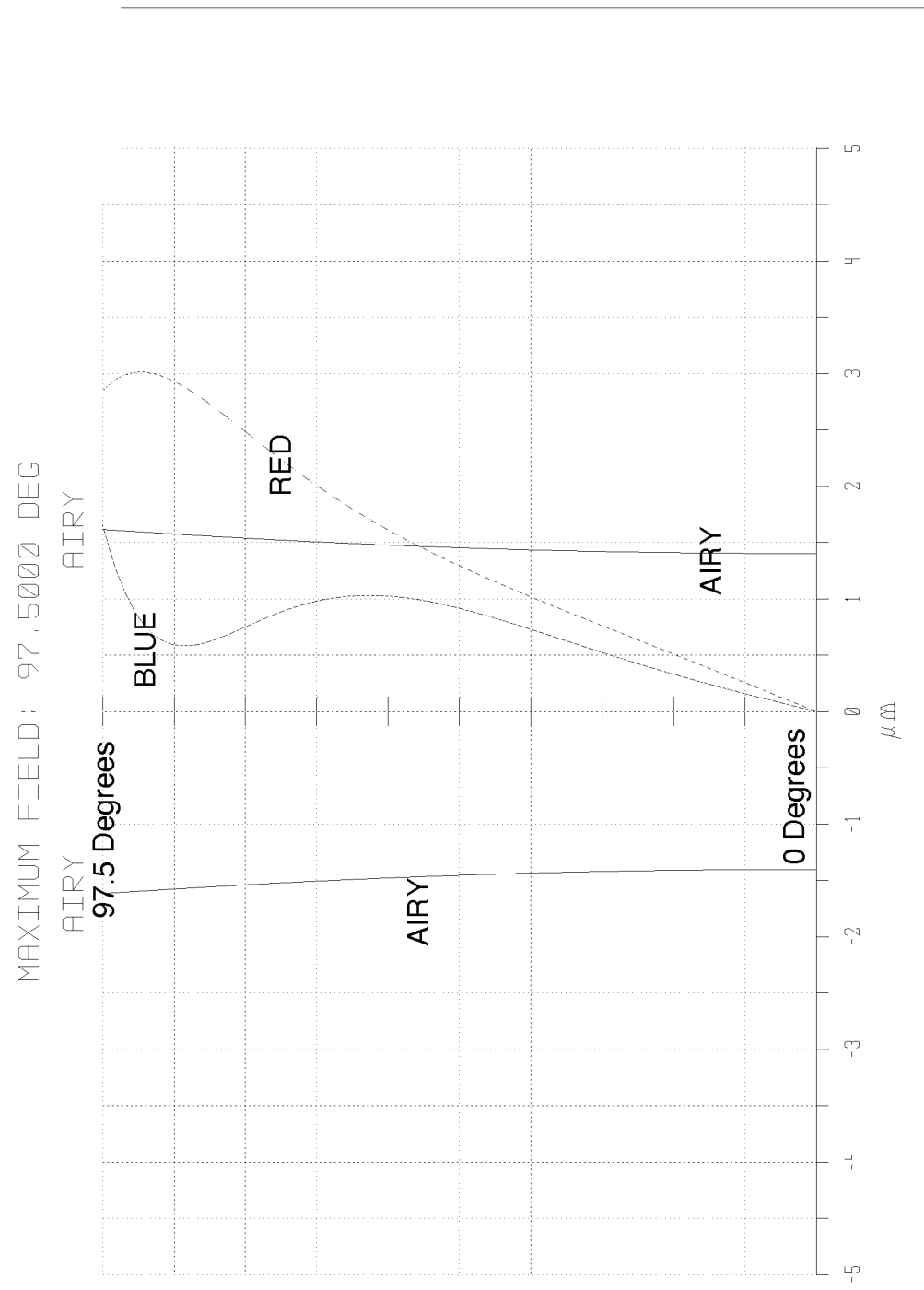
FIG. 6 shows chromatic aberration performance curves for the embodiment of FIG. 5.

FIG. 6 shows the chromatic aberration performance for Example 3 in the same form as FIGS. 2 and 4 for the previous examples. The data for blue (0.45 microns) and red (0.63 microns) are shown on the same graph relative to the green (0.56 microns) which therefore coincides with the Y-axis. The range for the Y-axis is 97.5 degrees the field angle for the lens system of Example 3. The data shows that the lateral color is effectively corrected in Example 3.

Example 4

Figure 7:
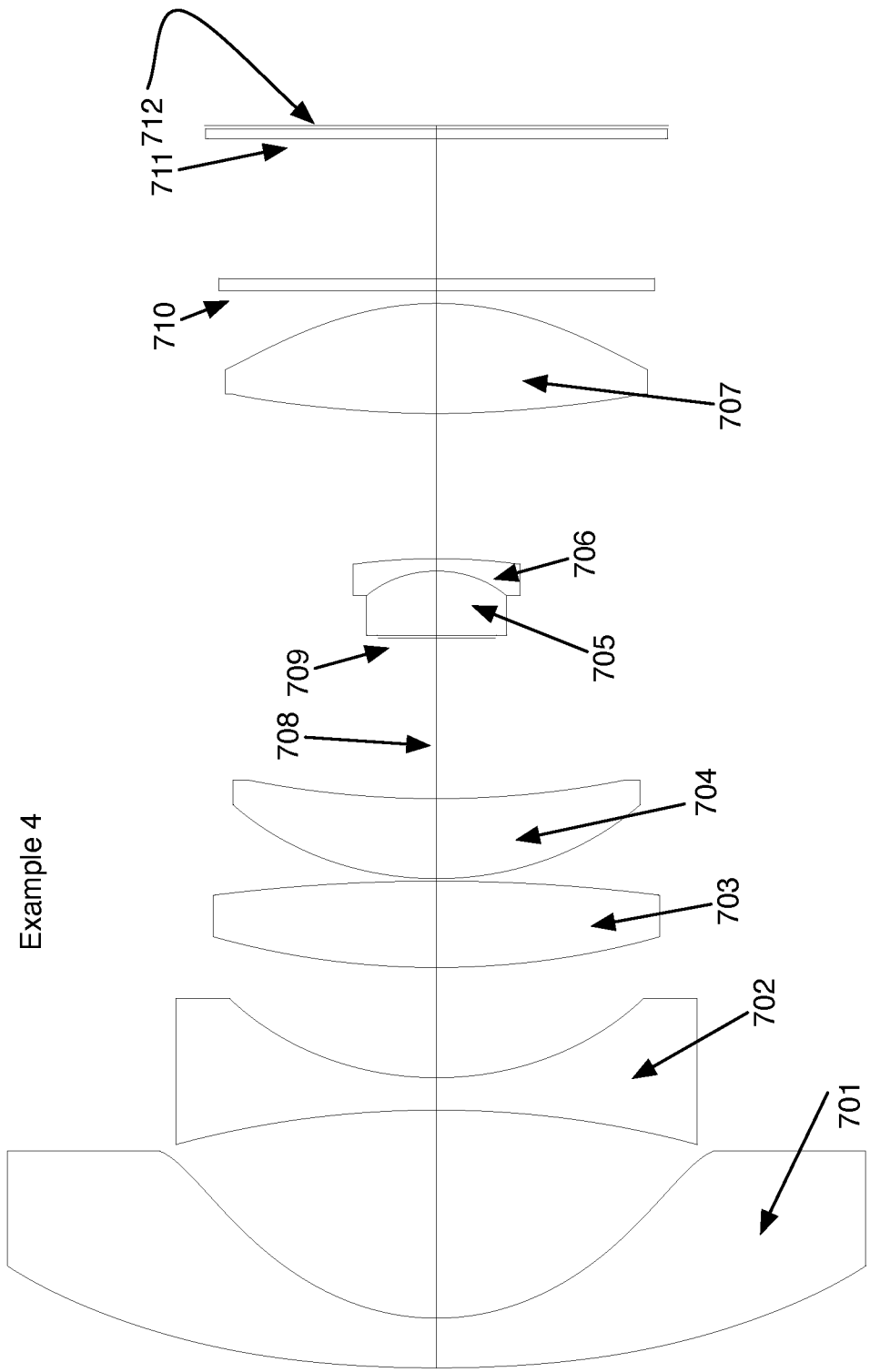
FIG. 7 shows a fourth embodiment: a seven-element design, also identified as Example 4.

FIG. 7 shows the optical layout of Example 4. This design has a field angle of +/− 55 deg with a relative aperture of F/2.9. This example shows effective correction of both lateral color and optical distortion. Optical distortion is a departure from f-tan condition (where the image height is equal to the product of the effective focal length and tangent of the field angle). A distortion free lens would follow the f-tan relationship perfectly. This example follows the general description for the first embodiment. The lens system is comprised of four lens groups arranged sequentially from object to image as group 1 to group 4. The first lens group comprises a number of negative lens elements 701, 702. The first element 701 (L1) is a meniscus element with a convex surface facing the object. This first group has negative power. The second lens group has positive power and is comprised in the example of two lens elements 703, 704. The elements are arranged such that there is a meniscus element 704 with positive power having a concave image-facing surface. This element is the last element in this group facing the image space. There is an aperture stop 709 between the second lens group 703, 704 and the third lens group. The third lens group is comprised of two lens elements 705, 706. The third lens group comprises the lens elements 705, 706 having a doublet structure. A doublet lens structure is made of two elements with opposing power. The negative element 706 is either a meniscus element. The two elements are cemented together with optical cement to form a cemented doublet. The negative element 706 of the doublet faces the image plane. The fourth lens group has positive power and in this embodiment is comprised of a single lens element 707. In this, the preferred embodiment, there is at least one aspheric element 707 in this group to provide distortion correction. The examples further show filter elements 710 and an image sensor cover glass 711. These elements are shown as being located between the last lens element 707 of Group 4 and image plane 712. In this preferred embodiment the lens structures have short back focal distance. The distance from the last element 707 of Group 4 to the image plane 712 is less than 75% of the image height.

The optical prescription for example 4 is shown in Table 4. The format is the same as already discussed. Group 1 comprises L1 701 and L2 702. Group 2 comprises L3 703 and L4 704. Group 3 is L5 705 and L6 706. Group 4 is L7 707. Lens 1 of the first group and lens 7, in Group 4 are aspheric.

TABLE 4

Optical Prescription for Example 4

| Surf | Type | Radius | Thickness | Nd | Abbe# | Diameter | Comment |
|---|---|---|---|---|---|---|---|
| 1 | ASPH | 41.131 | 2.000 | 1.535 | 56.197 | 29.654 | L1 |
| 2 | ASPH | 6.969 | 8.380 | | | 19.119 | conic = 1.016 |
| 3 | STD | −29.861 | 1.300 | 1.717 | 47.920 | 18.014 | L2 |
| 4 | STD | 9.612 | 4.437 | | | 14.294 | |
| 5 | STD | 24.597 | 3.477 | 1.804 | 46.568 | 15.421 | L3 |
| 6 | STD | −52.774 | 0.100 | | | 15.320 | |
| 7 | STD | 9.801 | 3.221 | 1.835 | 42.729 | 14.060 | L4 |
| 8 | STD | 28.620 | 6.471 | | | 13.030 | |
| STO | STD | Infinity | 0.100 | | | 4.049 | Stop |
| 10 | STD | Infinity | 2.592 | 1.589 | 61.248 | 4.122 | L5 |
| 11 | STD | −3.440 | 0.500 | 1.728 | 28.315 | 4.833 | L6 |
| 12 | STD | −18.296 | 5.839 | | | 5.759 | |
| 13 | ASPH | 27.180 | 4.434 | 1.535 | 56.197 | 14.106 | L7 |
| 14 | ASPH | −8.879 | 0.500 | | | 14.575 | |
| 15 | STD | Infinity | 0.500 | 1.517 | 64.212 | 15.005 | Filter |
| 16 | STD | Infinity | 5.627 | | | 15.049 | |
| 17 | STD | Infinity | 0.400 | 1.517 | 64.167 | 15.813 | Sensor cover |
| 18 | STD | Infinity | 0.125 | | | 15.953 | |
| IMA | STD | Infinity | | | | 16.023 | image sensor |

In this example, both lens element number 1 or L1 and lens element number 7 or L7 are aspheric elements where at least one of the lens element surface is described by the well-known aspheric equation as follows:

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

Table 5 shows the detailed aspheric coefficients for L1 (surface 1 and 2) and L7 (surface 13 and 14). Lens curvature reported as radii using notation known in the art. The notation used here is as used in the optical analysis software such as Zemax® (Zemax is a registered trademark of Radiant Zemax, LLC). The format for Table 5 is the same for all subsequent examples of aspheric parameters.

TABLE 5

Aspheric Coefficients for Example 4

Surface 1: L1

Coeff on r 2: 0
Coeff on r 4: 4.7691987e−005
Coeff on r 6: −1.5149859e−007
Coeff on r 8: 8.4974428e−011
Coeff on r 10: 8.7029649e−013

Surface 2: L1

Coeff on r 2: 0
Coeff on r 4: 0.00015280021
Coeff on r 6: −7.9507793e−008
Coeff on r 8: 2.511845e−008
Coeff on r 10: −4.3143663e−010

Surface 13: L7

Coeff on r 2: 0
Coeff on r 4: −0.00016026674
Coeff on r 6: 2.0233699e−006

Surface 14: L7

Coeff on r 2: 0
Coeff on r 4: 0.00025564672
Coeff on r 6: 2.0438614e−006
Coeff on r 8: −2.6426067e−008
Coeff on r 10: 7.6780523e−010

Figure 8:
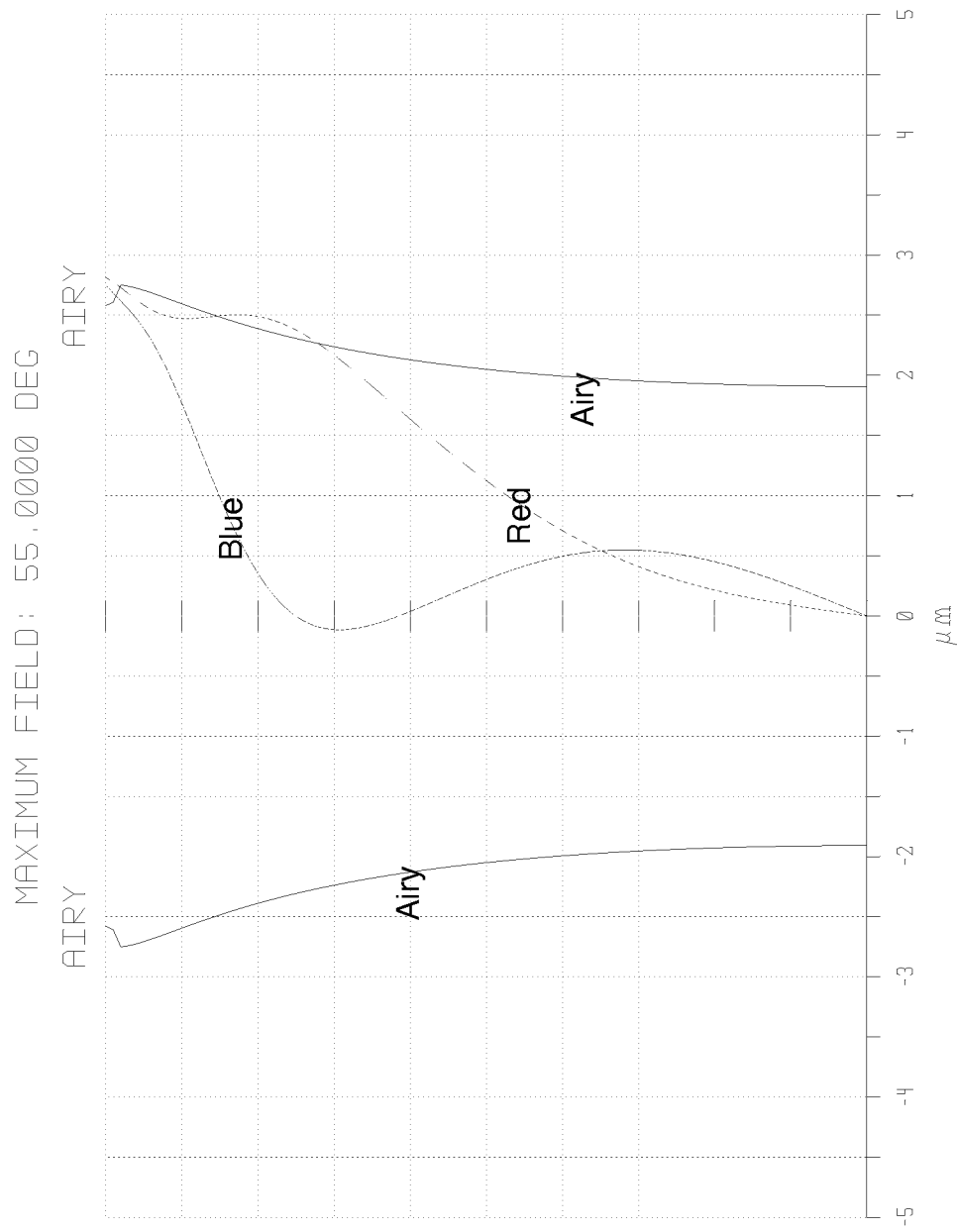
FIG. 8 shows chromatic aberration performance curves for the embodiment of FIG. 7.

FIG. 8 shows the lateral color performance of Example 4. The form of the chart is the same as that for charts 2, 4 and 6 already discussed. The data shows that the lateral color aberration is effectively corrected in Example 4.

Figure 9:
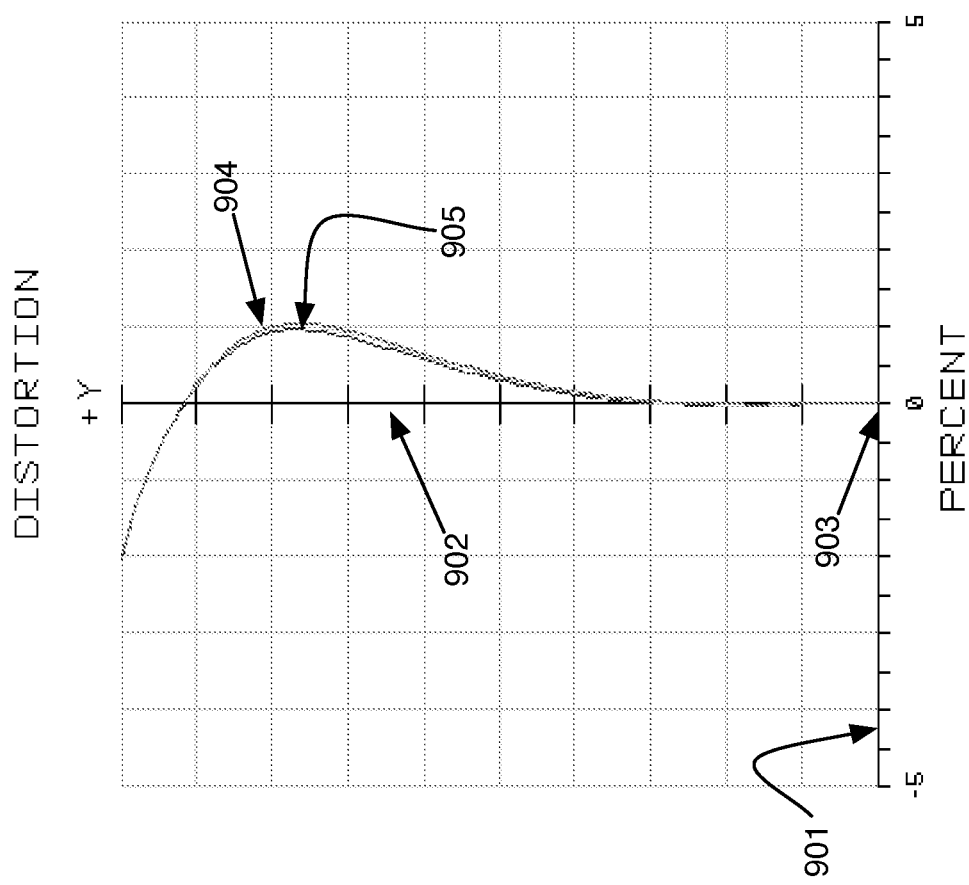
FIG. 9 shows optical performance curves for the embodiment of FIG. 7.

Example 4 further includes elements to correct for optical distortion. FIG. 9 shows the optical distortion performance for Example 4. The X-axis 901 is the percentage deviation from the f-tan relationship and the Y-axis 902 gives values for the field angle going from 0 degrees at the origin 903 to the maximum field angle at the maximum of the Y-axis 904 which in this case is 55 degrees or a 110 field of view lens. The data lines 905 include data for blue (0.46 microns), green (0.54 microns) and red (0.605 microns). The data 905 shows absolute distortion value of less than 2% for all three colors across the entire field of view of the Example 4 lens system.

Example 5

Figure 10:
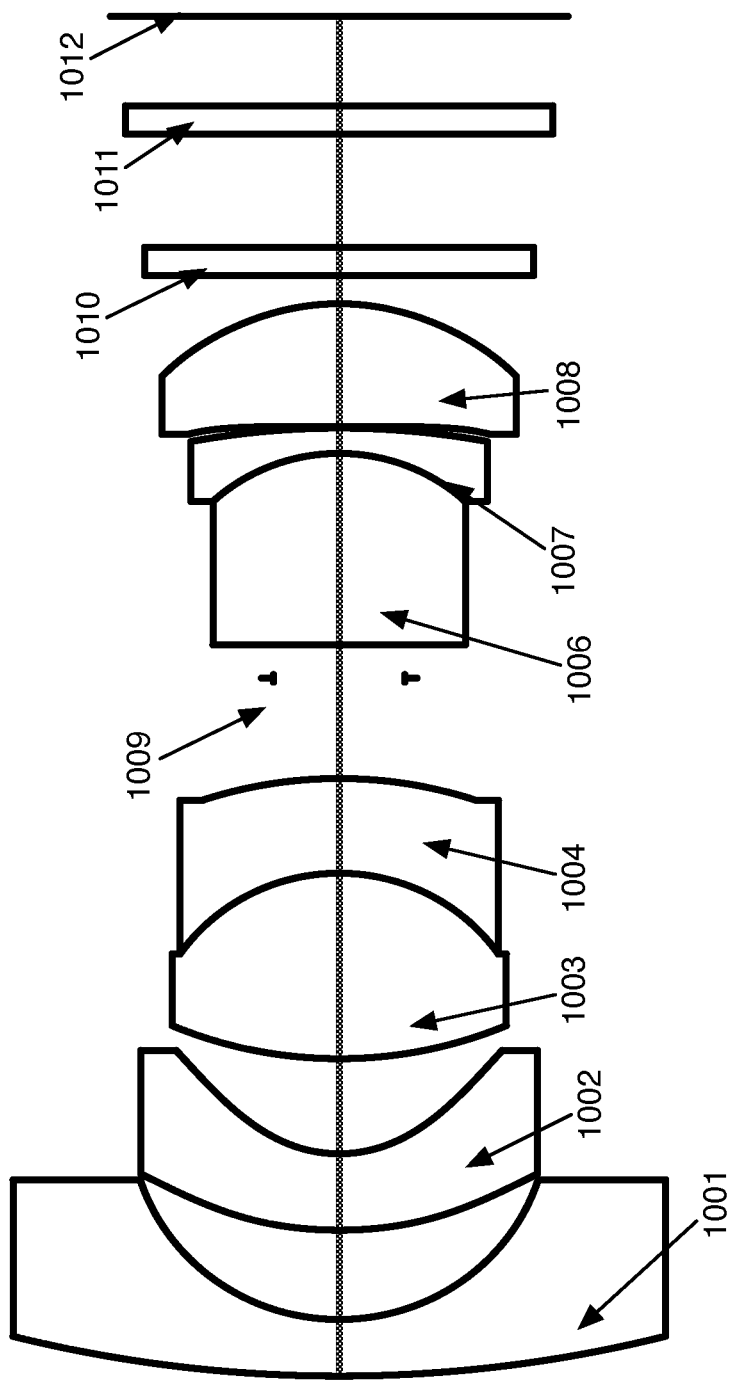
FIG. 10 shows a fifth embodiment: a seven-element design, also identified as Example 5.

FIG. 10 shows the optical layout of Example 5 where lateral chromatic aberration is corrected. The first lens group facing the object space is comprised of two negative lens elements 1001, 1002 with at least one aspheric element (L2) 1002. The first element 1001 (L1) is always a meniscus element with a convex surface facing the object. This first group has negative power. The aspheric element 1002 in this group has negative power. The next group is comprised of two element 1003, 1004 forming a cemented doublet. The element structure of this group is important for lateral color correction. There is an aperture stop 1005 between Group 2 and Group 3. The third lens group has two lens elements 1006 and 1007. The lens elements are arranged to form a doublet lens element structure. A doublet lens structure is made of two elements with opposing power. The negative element 1007 is either a meniscus or double concave element. The two elements are often cemented together with optical cement to form a cemented doublet. The negative element 1007 of the doublet faces the image plane. The fourth group is comprised of a single lens element (L7) 1008. This lens group has positive power. In addition, it is preferable to use at least one aspheric element in this group to provide distortion correction. The aspheric element 1008 in this group has positive power. The positive power of this element compensates the negative power of aspheric element 1002 in the first group to provide effective athermalization. Also shown are a filter element 1009, a sensor cover 1010. Both the latter elements are placed between the last lens element 1008 of the fourth group and the image plane 1011. Table 6 shows the optical prescription for the lens elements of Example 5. Group 1 comprises L1 and L2. Group 2 comprises L3 and L4. Group 3 is L5 and L6. Group 4 is L7. Aspheric elements are L2 and L7 with details shown in Table 7.

TABLE 6

Optical Prescription of Example 5.

| Surf | Type | Radius | Thickness | Nd | Abbe# | Diameter | Comment |
|---|---|---|---|---|---|---|---|
| 1 | STD | 22.309 | 1.000 | 1.593 | 68.327 | 11.108 | L1 |
| 2 | STD | 3.562 | 1.578 | | | 6.780 | |
| 3 | ASPH | 6.509 | 1.350 | 1.535 | 56.197 | 6.748 | L2 |
| 4 | ASPH | 2.204 | 1.679 | | | 5.558 | conic = −0.956 |
| 5 | STD | 7.214 | 3.277 | 1.788 | 47.508 | 5.692 | L3 |
| 6 | STD | −3.289 | 1.673 | 1.723 | 38.022 | 5.428 | L4 |
| 7 | STD | −7.272 | 1.771 | | | 4.653 | |
| STO | STD | Infinity | 0.591 | | | 2.243 | Stop |
| 9 | STD | 196.216 | 3.382 | 1.593 | 68.327 | 2.837 | L5 |
| 10 | STD | −3.150 | 0.448 | 1.805 | 25.477 | 4.298 | L6 |
| 11 | STD | −13.571 | 0.031 | | | 5.043 | |
| 12 | ASPH | Infinity | 2.166 | 1.535 | 56.197 | 5.166 | L7 |
| 13 | ASPH | −3.849 | 0.500 | | | 6.032 | |
| 14 | STD | Infinity | 0.500 | 1.517 | 64.212 | 6.534 | FILTER |
| 15 | STD | Infinity | 2.000 | | | 6.626 | |
| 16 | STD | Infinity | 0.500 | 1.516 | 64.115 | 7.189 | Cover |
| 17 | STD | Infinity | 1.581 | | | 7.281 | |
| IMA | STD | Infinity | | | | 7.793 | Image Plane |

TABLE 7

Aspheric Coefficients for L2 and L7 of Example 5.

Surface 3: L2

Coeff on r 2: 0
Coeff on r 4: 0.003728039
Coeff on r 6: −0.00048444718
Coeff on r 8: 2.3994773e−005
Coeff on r 10: −6.4494038e−007

Surface 4: L2

Coeff on r 2: 0
Coeff on r 4: 0.0084249798
Coeff on r 6: −0.0013112074
Coeff on r 8: 4.7093472e−005
Coeff on r 10: −7.9505389e−007

Surface 12: L7

Coeff on r 2: 0
Coeff on r 4: −0.0023803132
Coeff on r 6: 2.8665103e−005
Coeff on r 8: −2.3818169e−005

Surface 13: L7

Coeff on r 2: 0
Coeff on r 4: 0.002291451
Coeff on r 6: 4.3563804e−005
Coeff on r 8: −4.8893737e−006
Coeff on r 10: −2.4643699e−007

Figure 11:
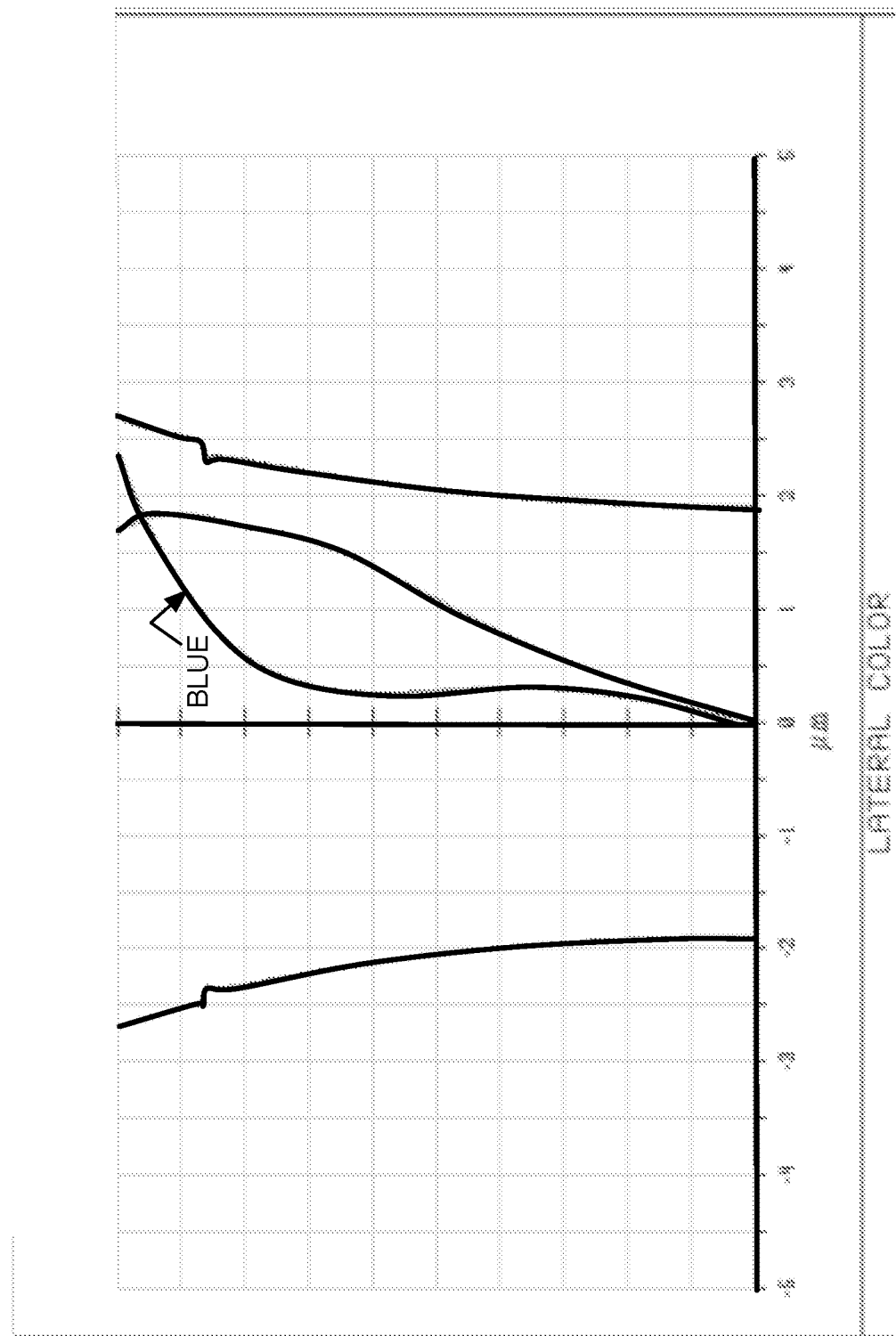
FIG. 11 shows the chromatic aberration performance for the embodiment of FIG. 10.
Figure 12:
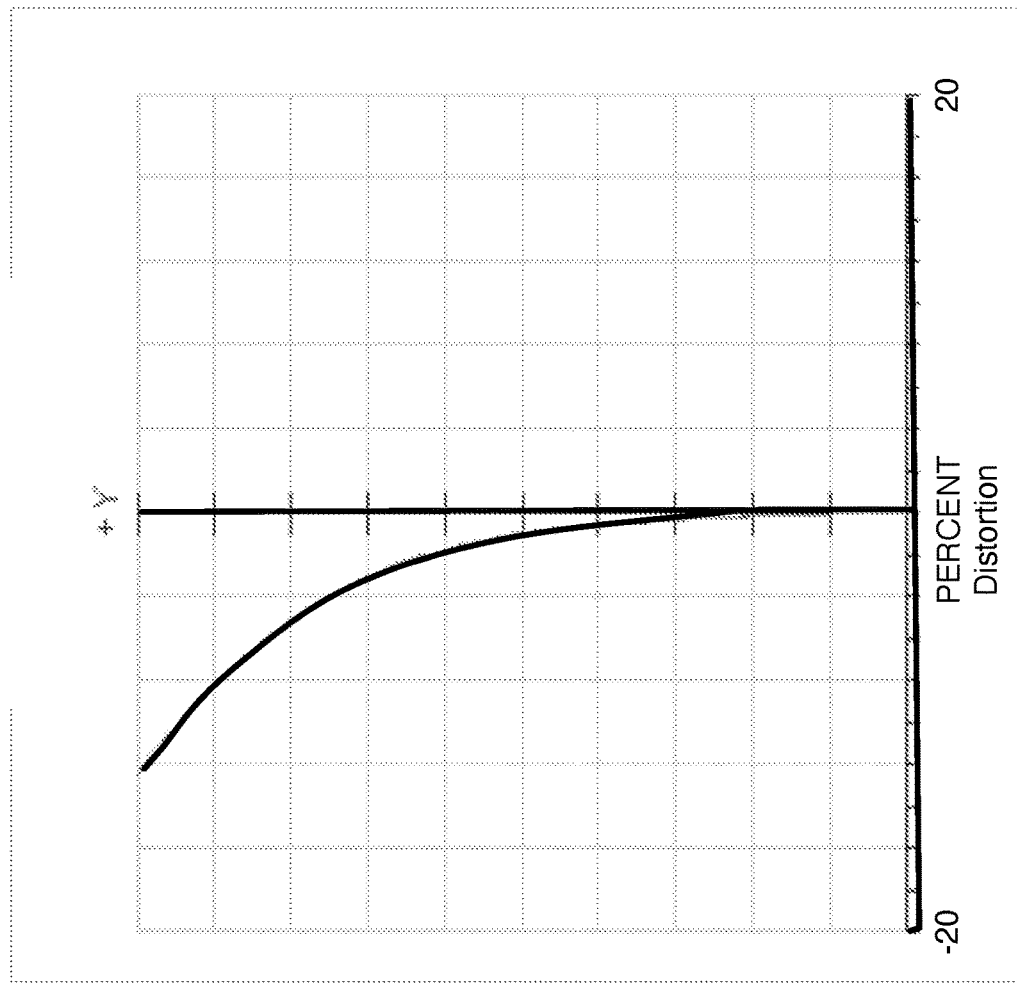
FIG. 12 shows optical performance curves for the embodiment of FIG. 10.

FIG. 11 shows the lateral color correction of Example 5. FIG. 12 shows the optical distortion performance of Example 5.

Example 6

Figure 13:
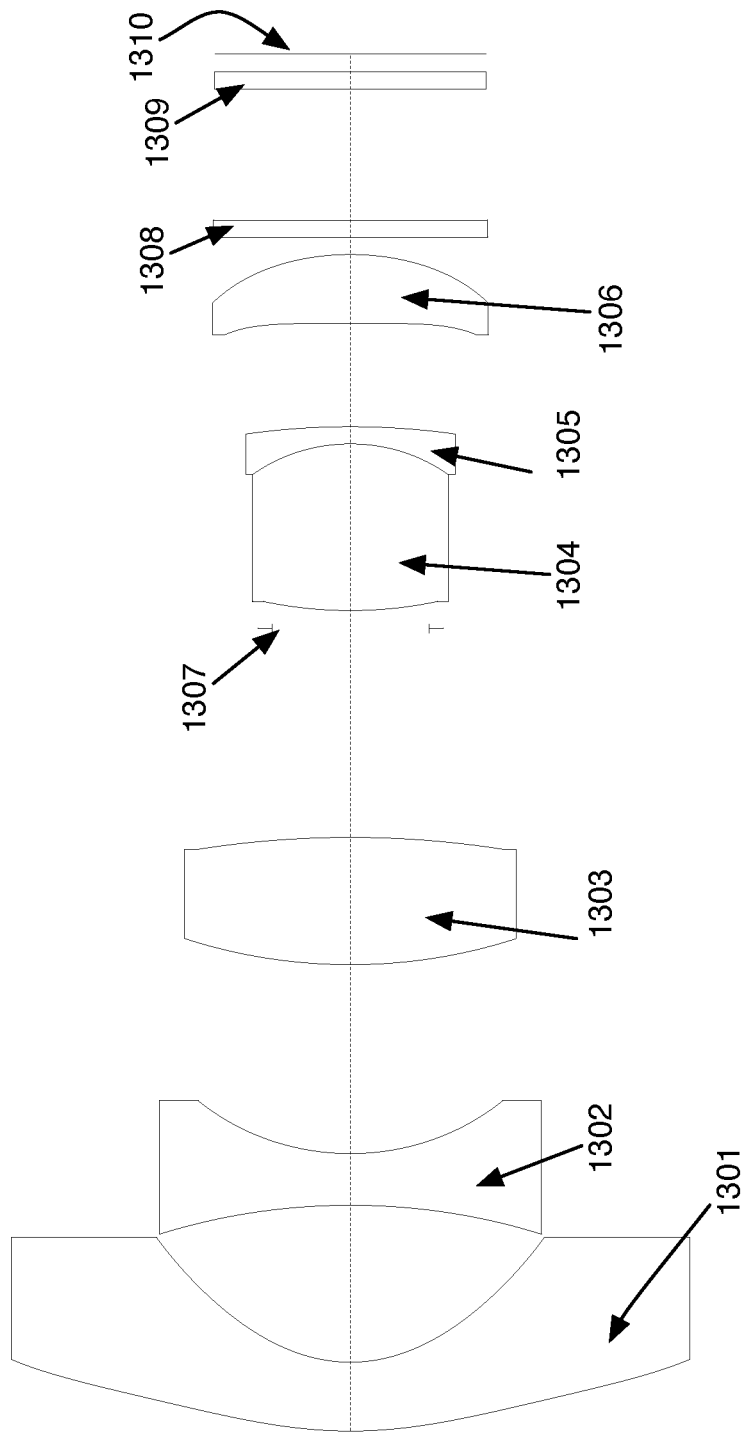
FIG. 13 shows a sixth embodiment: a six-element design, also identified as Example 6.
Figure 14:
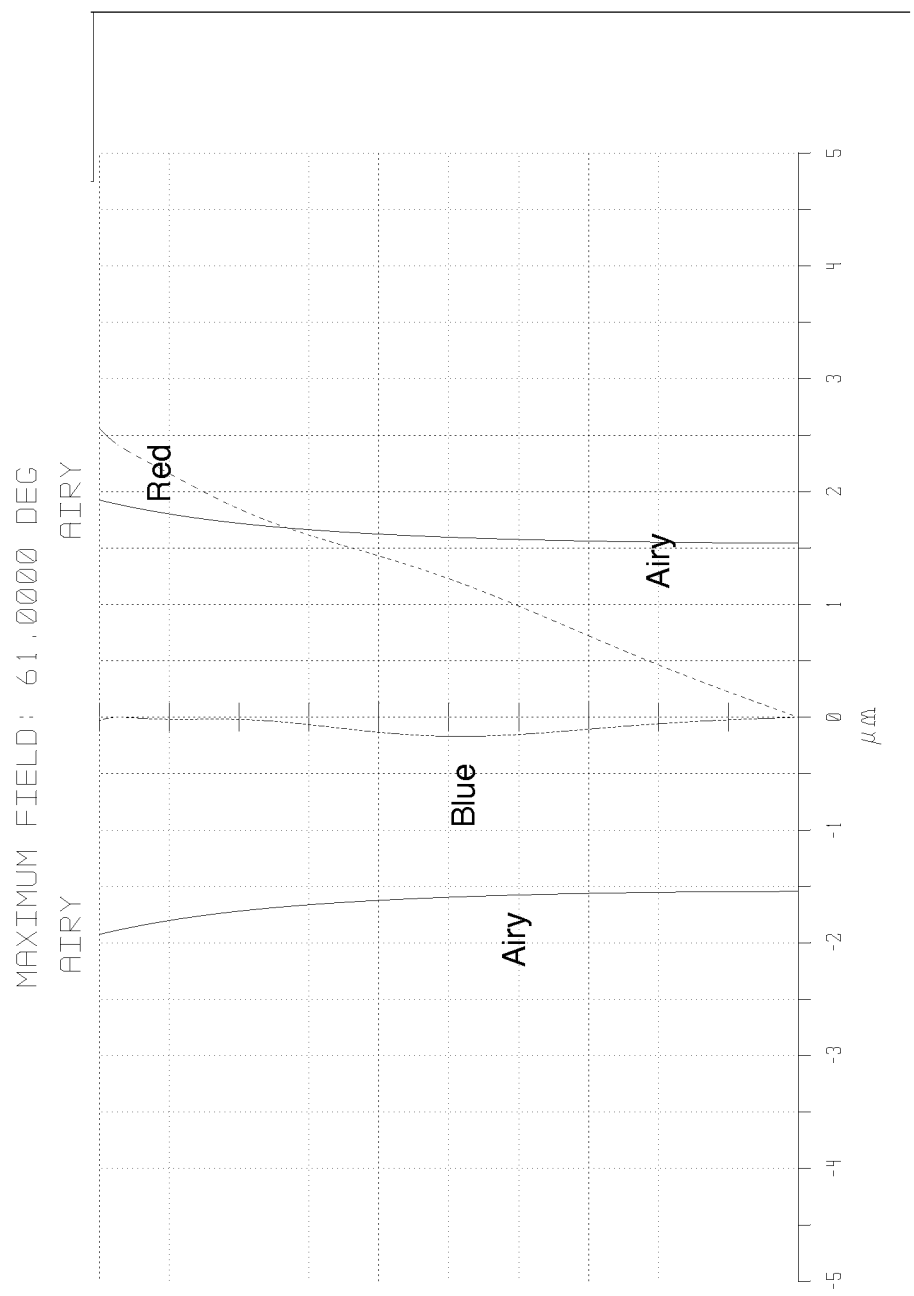
FIG. 14 shows the chromatic aberration performance for the embodiment of FIG. 13.

FIG. 13 shows the optical layout of Example 6. This design has a field of view of +/−61 degrees with a relative aperture of F/2.2. All of the lens systems of this first embodiment adhere to this general description. The lens system is comprised of four groups of lens elements. The groups arranged sequentially from object to image. Group 1 is the first lens group facing the object space. This group is comprised of two negative lens elements 1301, 1302. The first element 1301 (L1) is a meniscus element with a convex surface facing the object. This first group has negative power. In a preferred embodiment there is at least one aspheric element in this group to provide optical distortion correction. In this example 5 the first lens element 1301 is aspheric and the second lens element is spherical. The second group is comprised of a single lens element 1303 that has positive power. The second group is comprised of a single lens element made from material having an Abbe value between 40 and 50. There is an aperture stop 1307 between Group 2 and the next lens Group 3. The third lens group is comprised of two lens elements 1304, 1305. The lens elements in Group 3 are arranged as a doublet lens element structure. A doublet lens structure is made of two elements with opposing power. The negative element 1305 is either a meniscus or double concave element. The two elements are cemented together with optical cement to form a cemented doublet. The negative element 1305 of the doublet faces the image plane. The fourth lens group is comprised of a single lens element 1306 and has positive power. In the preferred embodiment there is at least one aspheric element in this group to provide distortion correction. The single lens element 1306 in example 5 is aspheric. The example further show filter elements 1308 and an image sensor cover glass 1309. These elements are shown as being located between the last lens element of Group 4 and image plane 1310. In the preferred embodiment the lens structures have short back focal distance. Table 8 shows the specific prescription for the lens system of Example 6. Group 1 comprises L1 and L2. Group 2 comprises L3. Group 3 is L4 and L5. Group 4 is L6. L1 and L6 are aspheric. Table 9 shows the aspheric coefficients for these elements. FIG. 14 shows the chromatic correction achieved in the design of Example 6.

TABLE 8

Optical Prescription for Example 6.

| Surf | Type | Radius | Thickness | Nd | Abbe# | Diameter | Comment |
|---|---|---|---|---|---|---|---|
| 1 | ASPH | 10.838 | 2.000 | 1.535 | 56.197 | 18.104 | L1 |
| 2 | ASPH | 3.719 | 4.560 | | | 10.357 | conic = −0.684 |
| 3 | STD | −15.872 | 1.500 | 1.593 | 68.327 | 10.188 | L2 |
| 4 | STD | 6.143 | 5.488 | | | 8.137 | |
| 5 | STD | 13.277 | 3.698 | 1.804 | 46.568 | 8.848 | L3 |
| 6 | STD | −24.078 | 6.068 | | | 8.267 | |
| STO | STD | Infinity | 0.521 | | | 4.183 | STOP |
| 8 | STD | 10.355 | 4.842 | 1.593 | 68.327 | 4.626 | L4 |
| 9 | STD | −4.269 | 0.500 | 1.805 | 25.477 | 5.228 | L5 |
| 10 | STD | −18.353 | 3.002 | | | 5.595 | |
| 11 | ASPH | Infinity | 2.000 | 1.535 | 56.197 | 6.742 | L6 |
| 12 | ASPH | −6.280 | 0.500 | | | 7.355 | |
| 13 | STD | Infinity | 0.500 | 1.517 | 64.212 | 7.319 | Filter |
| 14 | STD | Infinity | 3.800 | | | 7.313 | |
| 15 | STD | Infinity | 0.500 | 1.516 | 64.115 | 7.243 | cover |
| 16 | STD | Infinity | 0.524 | | | 7.237 | |
| IMA | STD | Infinity | | | | 7.227 | |

TABLE 9

Aspherical Parameters for Example 6.

Surface 1: L1

Coeff on r 2: 0
Coeff on r 4: −0.00071760039
Coeff on r 6: 5.8571777e−006
Coeff on r 8: −2.6662565e−008

Surface 2: L1

Coeff on r 2: 0
Coeff on r 4: −0.00076245193
Coeff on r 6: −1.3844439e−005

Surface 11: L6

Coeff on r 2: 0
Coeff on r 4: −0.0016043909
Coeff on r 6: −8.9672951e−005

Surface 12: L6

Coeff on r 2: 0
Coeff on r 4: −0.00033100516
Coeff on r 6: −7.2568246e−005
Coeff on r 8: 1.5450388e−006
Coeff on r 10: −6.4094387e−008

Example 7

Figure 15:
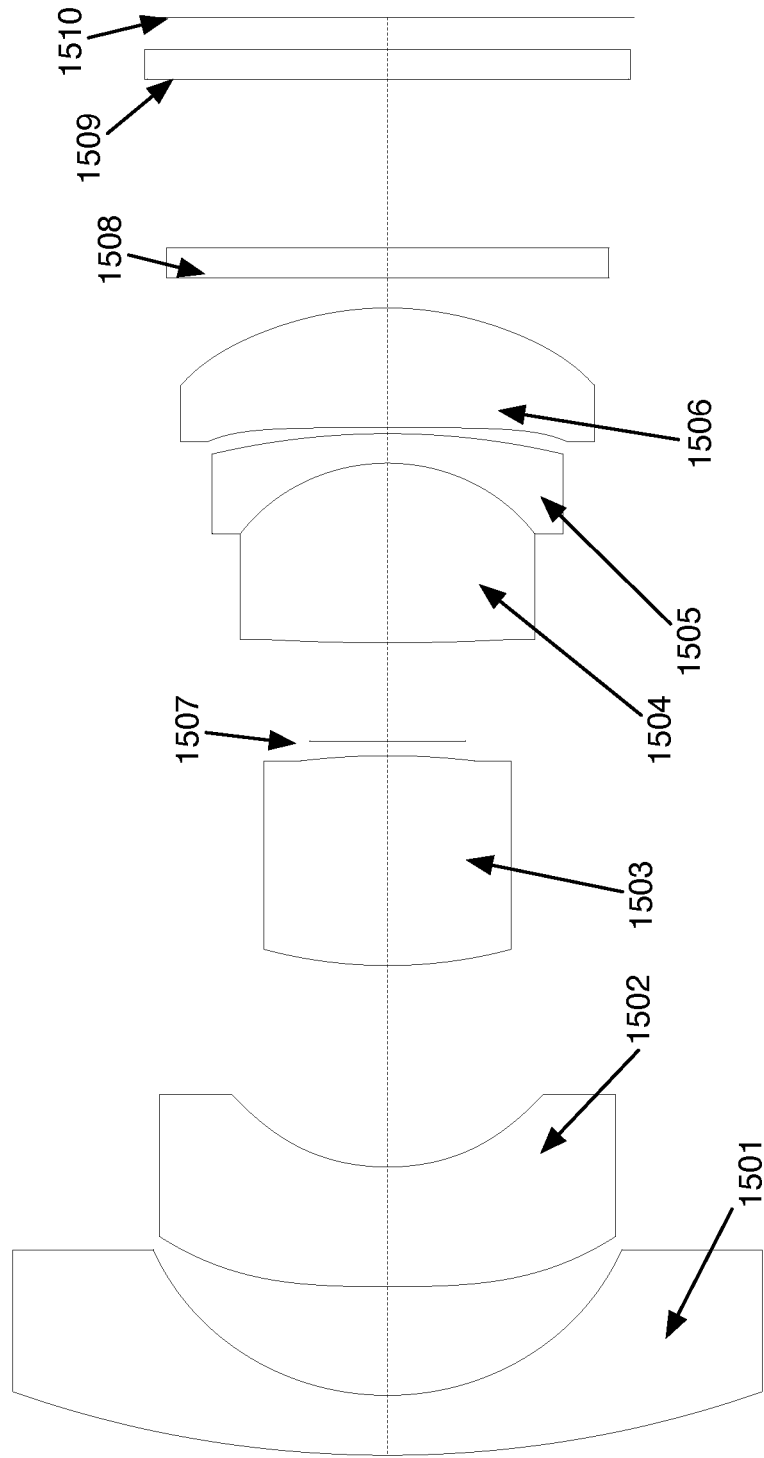
FIG. 15 shows a seventh embodiment: a six-element design, also identified as Example 7.

FIG. 15 shows the optical layout of Example 6 where the optical distortion is corrected. This design has a field angle of +/−58 degrees and a relative aperture of F/2.8. The lens system includes features of the generalized low optical distortion embodiment. The first lens group facing the object space is comprised of two negative lens elements 1501, 1502 with at least one aspheric element (L2) 1502. The first element 1501 (L1) is always a meniscus element with a convex surface facing the object. This first group has negative power. The aspheric element 1502 in this group has negative power. The next group is comprised of a single positive power element 1503. The element structure of this group is important for lateral color correction. There is an aperture stop 1507 between Group 2 and Group 3. The third lens group has two lens elements 1504 and 1505. The lens elements are arranged to form a doublet lens element structure. A doublet lens structure is made of two elements with opposing power. The negative element 1505 is either a meniscus or double concave element. The two elements are often cemented together with optical cement to form a cemented doublet. The negative element 1505 of the doublet faces the image plane. The fourth group is comprised of a single lens element (L6) 1506. This lens group has positive power. In addition, it is preferable to use at least one aspheric element in this group to provide distortion correction. The aspheric element 1506 in this group has positive power. The power of this element is about 88% of the absolute power of the negative aspheric element 1502 in the first group to provide effective athermalization. Also shown are a filter element 1508, a sensor cover 1509. Both the latter elements are placed between the last lens element 1506 of the fourth group and the image plane 1510. Table 10 shows the optical prescription for the lens elements of Example 7. Group 1 comprises L1 and L2. Group 2 comprises L3. Group 3 is L4 and L5. Group 4 is L6.

TABLE 10

Optical Prescription for Example 7.

| Surf | Type | Radius | Thickness | Nd | ABBE# | Diameter | Comment |
|---|---|---|---|---|---|---|---|
| 1 | STD | 16.519 | 1.000 | 1.618 | 63.417 | 11.661 | L1 |
| 2 | STD | 3.946 | 1.813 | | | 7.288 | |
| 3 | ASPH | 27.844 | 2.000 | 1.535 | 56.197 | 7.087 | L2 |
| 4 | ASPH | 3.212 | 3.364 | | | 4.849 | |
| 5 | STD | 6.971 | | 1.788 | 47.508 | 3.845 | L3 |
| 6 | STD | −10.584 | 0.246 | | | 2.706 | |
| STO | STD | Infinity | 1.639 | | | 2.423 | Stop |
| 8 | STD | 32.027 | 3.000 | 1.618 | 63.417 | 3.815 | L4 |
| 9 | STD | −2.813 | 0.493 | 1.847 | 23.791 | 4.577 | L5 |
| 10 | STD | −11.064 | 0.098 | | | 5.452 | |
| 11 | ASPH | Infinity | 2.000 | 1.535 | 56.197 | 5.610 | L6 |
| 12 | ASPH | −4.629 | 0.500 | | | 6.429 | |
| 13 | STD | Infinity | 0.500 | 1.517 | 64.212 | 6.811 | Filter |
| 14 | STD | Infinity | 2.816 | | | 6.881 | |
| 15 | STD | Infinity | 0.500 | 1.516 | 64.115 | 7.481 | Sensor Cover |
| 16 | STD | Infinity | 0.530 | | | 7.551 | |
| IMA | STD | Infinity | | | | 7.670 | |

In this example 6, both lens element number 2 or L2 and lens element number 6 or L6 are aspheric elements where at least one of the lens element surface is described by the well-known aspheric equation as follows:

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

Table 11 shows the detailed aspheric coefficients for L2 (surface 3 and 4) and L6 (surface 11 and 12).

TABLE 11

Aspheric Coefficients for Example 7.

Surface 3: L2

Coeff on r 2: 0
Coeff on r 4: 0.0064316702
Coeff on r 6: −0.0003279666
Coeff on r 8: 1.346379e−005
Coeff on r 10: −2.8103895e−007

Surface 4: L2

Coeff on r 2: 0
Coeff on r 4: 0.0070940736
Coeff on r 6: −5.4003043e−005
Coeff on r 8: −0.00010700945

TABLE 11-continued

Aspheric Coefficients for Example 7.

Surface 11: L6

Coeff on r 2: 0
Coeff on r 4: −0.0024701604
Coeff on r 6: 0.00010928823
Coeff on r 8: −3.6321749e−005

Surface 12: L6

Coeff on r 2: 0
Coeff on r 4: 0.0015853367
Coeff on r 6: 2.0791569e−005
Coeff on r 8: −1.0089047e−005
Coeff on r 10: −5.8729574e−007

Figure 16:
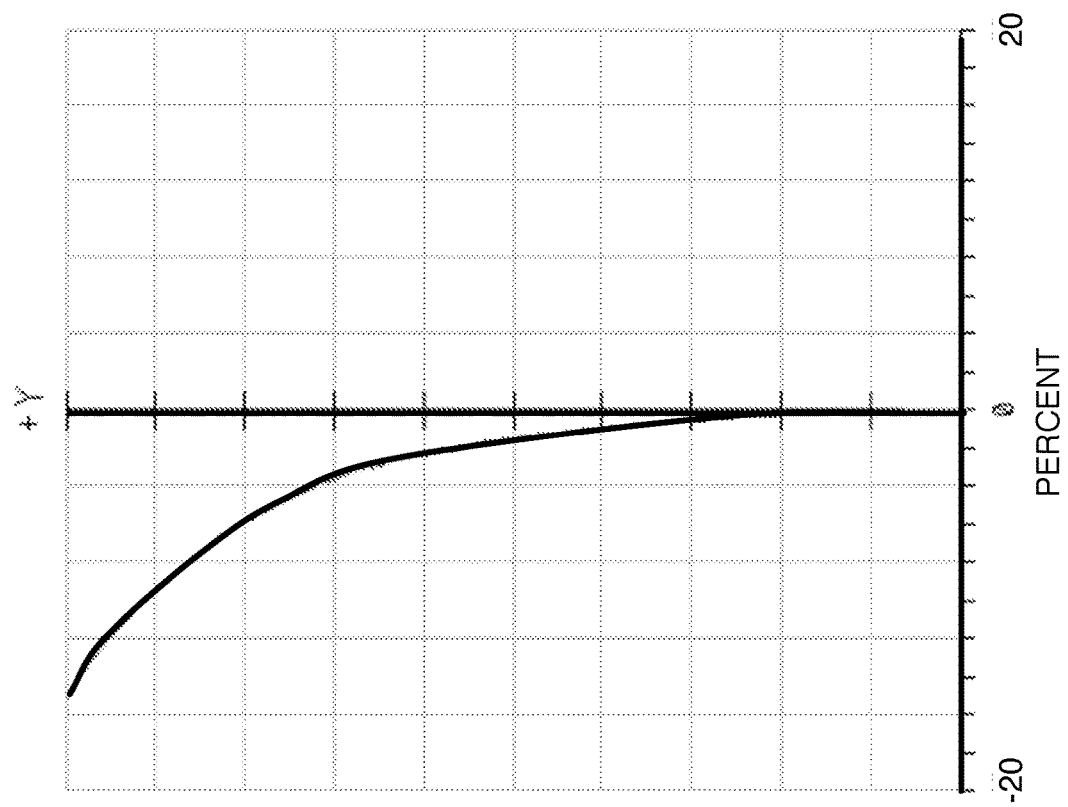
FIG. 16 shows the optical performance for the embodiment of FIG. 15.

FIG. 16 shows the distortion correction achieved in Example 7. The form of the Figure is the same as for FIG. 9 and already explained.

Example 8

Figure 17:
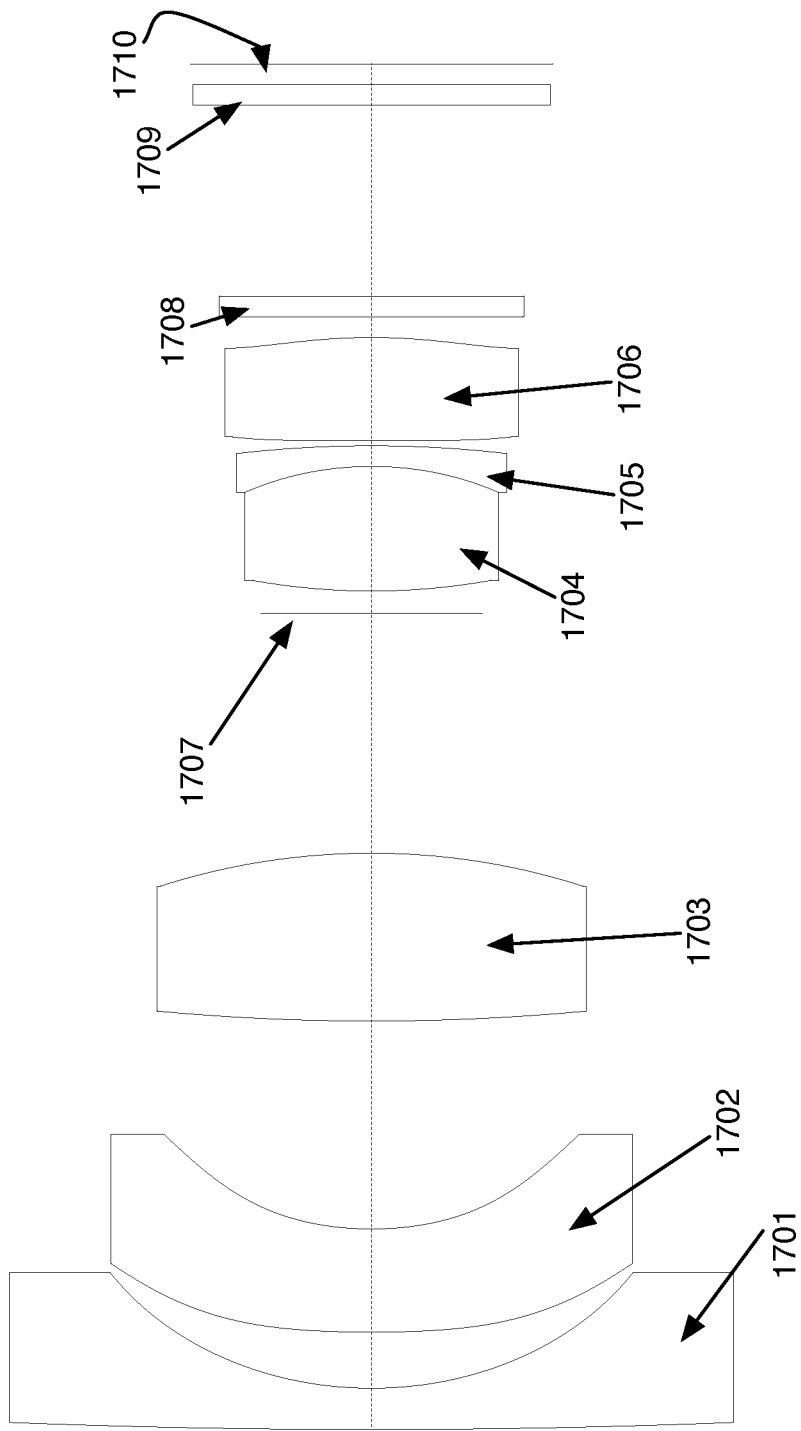
FIG. 17 shows an eighth embodiment: a six-element design, also identified as Example 8.

FIG. 17 shows the optical layout of Example 7 where the optical distortion is corrected. This design has a field of view of +/−47 degrees with a relative aperture of F/2.0. The lens system includes features of the generalized low optical distortion embodiment. The first lens group facing the object space is comprised of two negative lens elements 1701, 1702 with at least one aspheric element (L2) 1702. The first element 1701 (L1) is always a meniscus element with a convex surface facing the object. This first group has negative power. The aspheric element 1702 in this group has negative power. The next group is comprised of a single positive power element 1703. There is an aperture stop 1707 between Group 2 and Group 3. The third lens group has two lens elements 1704 and 1705. The lens elements are arranged to form a doublet lens element structure. A doublet lens structure is made of two elements with opposing power. The negative element 1705 is either a meniscus or double concave element. The two elements are often cemented together with optical cement to form a cemented doublet. The negative element 1705 of the doublet faces the image plane. The fourth group is comprised of a single lens element (L6) 1706. This lens group has positive power. In addition, it is preferable to use at least one aspheric element in this group to provide distortion correction. The aspheric element 1706 in this group has positive power. The power of this element is about 79% of the absolute power of the negative aspheric element 1702 in the first group to provide effective athermalization. Also shown are a filter element 1708, a sensor cover 1709. Both the latter elements are placed between the last lens element 1706 of the fourth group and the image plane 1710. Table 12 shows the optical prescription for the lens elements of Example 8. Group 1 comprises L1 and L2. Group 2 comprises L3. Group 3 is L4 and L5. Group 4 is L6.

TABLE 12

Optical Prescription for Example 8.

| Surf | Type | Radius | Thickness | Nd | Abbe# | Diameter | Comment |
|---|---|---|---|---|---|---|---|
| 1 | STANDARD | 151.215 | 1.030 | 1.618 | 63.417 | 14.597 | L1 |
| 2 | STANDARD | 6.259 | 1.402 | | | 10.552 | |
| 3 | EVENASPH | 22.188 | 2.575 | 1.535 | 56.197 | 10.508 | L2 |
| 4 | EVENASPH | 5.294 | 5.191 | | | 8.377 | |
| 5 | STANDARD | 37.775 | 4.191 | 1.788 | 47.508 | 8.652 | L3 |
| 6 | STANDARD | −11.424 | 5.988 | | | 8.527 | |
| STO | STANDARD | Infinity | 0.558 | | | 4.471 | Stop |
| 8 | STANDARD | 11.016 | 3.111 | 1.618 | 63.417 | 4.797 | L4 |
| 9 | STANDARD | −5.367 | 0.515 | 1.847 | 23.791 | 5.126 | L5 |

TABLE 12-continued

Optical Prescription for Example 8.

| Surf | Type | Radius | Thickness | Nd | Abbe# | Diameter | Comment |
|---|---|---|---|---|---|---|---|
| 10 | STANDARD | −19.247 | 0.129 | | | 5.455 | |
| 11 | EVENASPH | Infinity | 2.575 | 1.535 | 56.197 | 5.614 | L6 |
| 12 | EVENASPH | −9.267 | 0.515 | | | 5.919 | |
| 13 | STANDARD | Infinity | 0.515 | 1.517 | 64.212 | 6.080 | Filter |
| 14 | STANDARD | Infinity | 4.767 | | | 6.149 | |
| 15 | STANDARD | Infinity | 0.515 | 1.516 | 64.115 | 7.132 | Cover |
| 16 | STANDARD | Infinity | 0.515 | | | 7.203 | Sensor |

In this example 8, both lens element number 2 or L2 and lens element number 6 or L6 are aspheric elements where at least one of the lens element surface is described by the well-known aspheric equation as follows:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

Table 13 shows the detailed aspheric coefficients for L2 (surface 3 and 4) and L6 (surface 11 and 12).

TABLE 13

Aspheric Constants for Example 8.

Surface 3: L2

Coeff on r 2: 0
Coeff on r 4: 0.0024835789
Coeff on r 6: −6.1817855e−005
Coeff on r 8: 1.3416774e−006
Coeff on r 10: −1.8247677e−008

Surface 4: L2

Coeff on r 2: 0
Coeff on r 4: 0.0028302769
Coeff on r 6: −4.0818648e−005
Coeff on r 8: −3.6491814e−006

Surface 11: L6

Coeff on r 2: 0
Coeff on r 4: 0.00069811457
Coeff on r 6: 0.00013804927
Coeff on r 8: −4.9894005e−006

Surface 12: L6

Coeff on r 2: 0
Coeff on r 4: 0.0021559238
Coeff on r 6: 1.9344201e−005
Coeff on r 8: 1.0534932e−005
Coeff on r 10: −5.003017e−007

Figure 18:
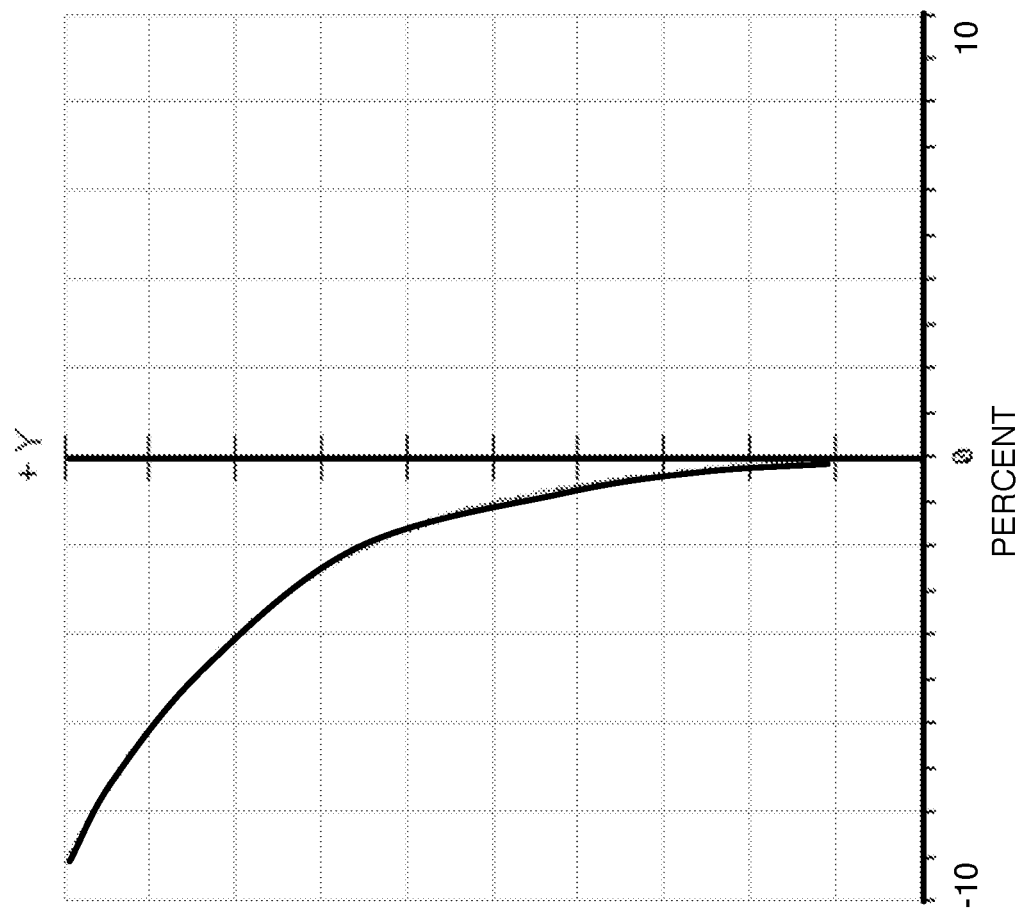
FIG. 18 shows the optical performance for the embodiment of FIG. 17.

FIG. 18 shows the distortion correction achieved in this design. The format is the same as already discussed for FIG. 9.

Example 9

Figure 19:
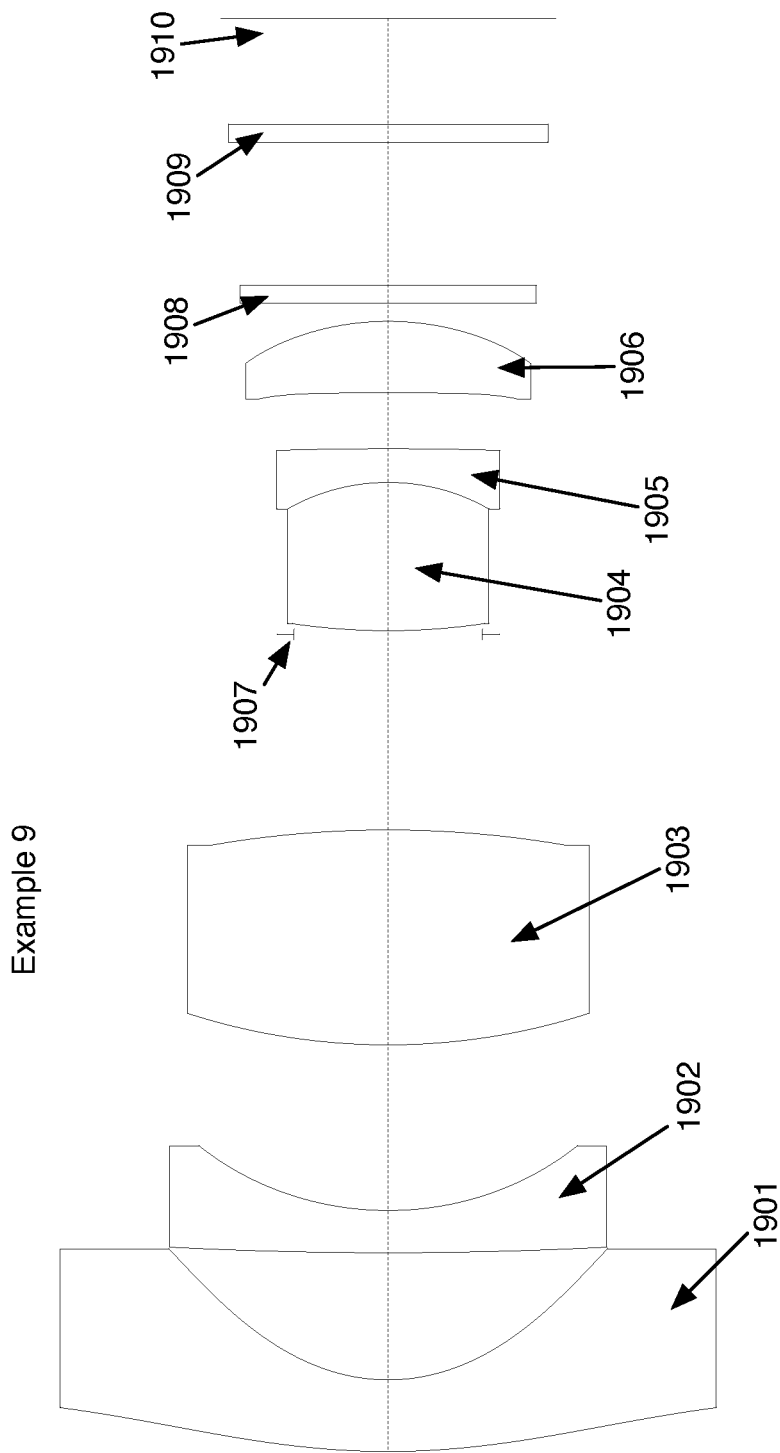
FIG. 19 shows a ninth embodiment: a six-element design, also identified as Example 9.

FIG. 19 shows the optical layout of Example 9 where the optical distortion is corrected. This design has a field of view of +/−46 degrees with a relative aperture of F/2.2. The lens system includes features of the generalized low optical distortion embodiment. The first lens group facing the object space is comprised of two negative lens elements 1901, 1902 with at least one aspheric element (L1) 1901. The first element 1901 (L1) is always a meniscus element with a convex surface facing the object. This first group has negative power. The aspheric element 1901 in this group has negative power. The next group is comprised of a single positive power element 1903. There is an aperture stop 1907 between Group 2 and Group 3. The third lens group has two lens elements 1904 and 1905. The lens elements are arranged to form a doublet lens element structure. A doublet lens structure is made of two elements with opposing power. The negative element 1905 is either a meniscus or double concave element. The two elements are often cemented together with optical cement to form a cemented doublet. The negative element 1905 of the doublet faces the image plane. The fourth group is comprised of a single lens element (L6) 1906. This lens group has positive power. In addition, it is preferable to use at least one aspheric element in this group to provide distortion correction. The aspheric element 1906 in this group has positive power. The power of this element is about 94% of the absolute power of the negative aspheric element 1902 in the first group to provide effective athermalization. Also shown are a filter element 1908, a sensor cover 1909. Both the latter elements are placed between the last lens element 1906 of the fourth group and the image plane 1910. Table 14 shows the optical prescription for the lens elements of Example 9. Group 1 comprises L1 and L2. Group 2 comprises L3. Group 3 is L4 and L5. Group 4 is L6.

TABLE 14

Optical Prescription for Example 9.

| Surf | Type | Radius | Thickness | Nd | Abbe# | Diameter | Comment |
|---|---|---|---|---|---|---|---|
| 1 | EVENASPH | 15.379 | 1.780 | 1.535 | 56.197 | 14.747 | L1 |
| 2 | EVENASPH | 3.799 | 3.160 | | | 9.857 | Conic = −0.997 |
| 3 | STANDARD | 87.560 | 1.049 | 1.593 | 68.327 | 9.825 | L2 |
| 4 | STANDARD | 6.420 | 4.117 | | | 8.502 | |
| 5 | STANDARD | 13.366 | 5.341 | 1.835 | 42.729 | 9.028 | L3 |
| 6 | STANDARD | −21.147 | 4.861 | | | 8.056 | |
| STO | STANDARD | Infinity | 0.091 | | | 4.231 | Stop |
| 8 | STANDARD | 13.280 | 3.686 | 1.595 | 67.834 | 4.316 | L4 |

TABLE 14-continued

Optical Prescription for Example 9.

| Surf | Type | Radius | Thickness | Nd | Abbe# | Diameter | Comment |
|---|---|---|---|---|---|---|---|
| 9 | STANDARD | −4.201 | 0.838 | 1.728 | 28.315 | 4.518 | L5 |
| 10 | STANDARD | −73.127 | 1.385 | | | 5.009 | |
| 11 | EVENASPH | Infinity | 1.780 | 1.535 | 56.197 | 5.861 | L6 |
| 12 | EVENASPH | −5.678 | 0.445 | | | 6.411 | |
| 13 | STANDARD | Infinity | 0.445 | 1.517 | 64.212 | 6.614 | Filter |
| 14 | STANDARD | Infinity | 3.560 | | | 6.654 | |
| 15 | STANDARD | Infinity | 0.445 | 1.516 | 64.115 | 7.138 | Cover |
| 16 | STANDARD | Infinity | 2.631 | | | 7.177 | |
| IMA | STANDARD | Infinity | | | | 7.535 | Sensor |

The Aspheric parameters for Example 9 are shown in Table 15. L1 and L6 are aspheric lens elements in this Example.

TABLE 15

Aspheric Parameters for Example 9.

Surface 1: L1

Coeff on r 2: 0
Coeff on r 4: −0.00026702579
Coeff on r 6: −1.3994624e−006
Coeff on r 8: 3.8281534e−008
Coeff on r 10: −2.3905981e−010

Surface 2: L1

Coeff on r 2: 0
Coeff on r 4: 0.00062902761
Coeff on r 6: −1.3766302e−005
Coeff on r 8: −3.3998898e−007

Surface 11: L6

Coeff on r 2: 0
Coeff on r 4: −0.0018009389
Coeff on r 6: 3.7255256e−005
Coeff on r 8: −8.6418952e−006

Surface 12: L6

Coeff on r 2: 0
Coeff on r 4: −4.0478852e−005
Coeff on r 6: −2.4555063e−005
Coeff on r 8: 9.0122395e−007
Coeff on r 10: −3.1506908e−007

Figure 20:
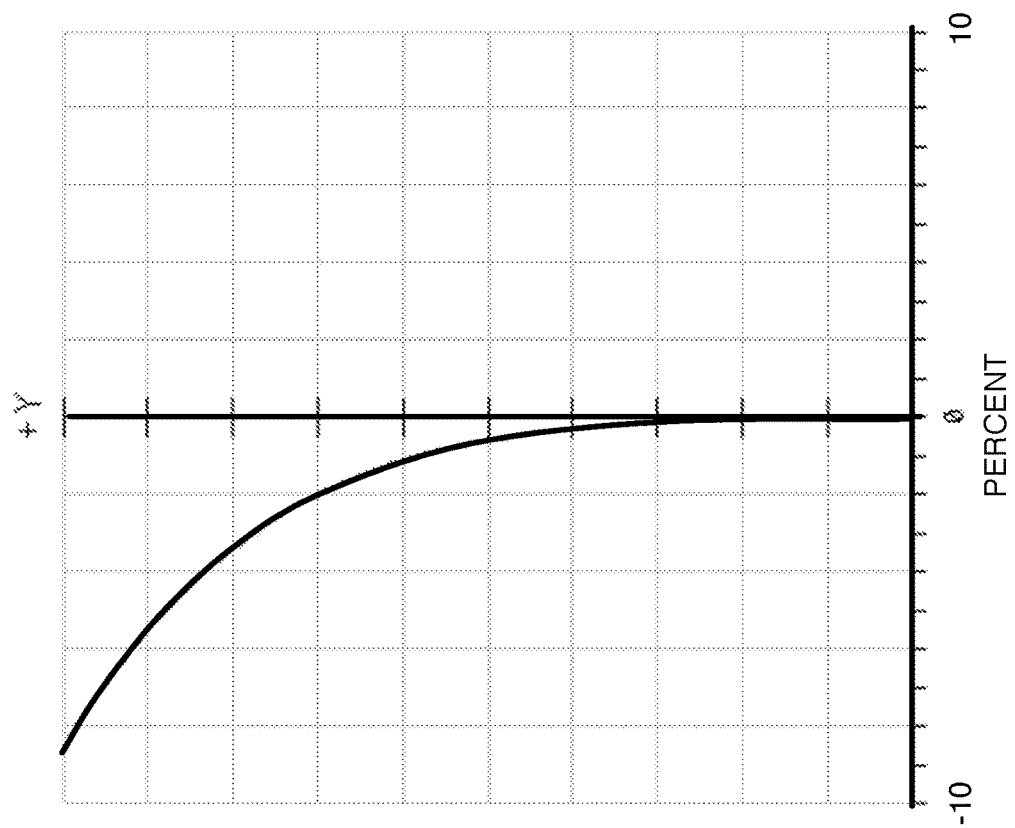
FIG. 20 shows the optical performance for the embodiment of FIG. 19.

FIG. 20 shows the distortion correction achieved in the design of Example 9. The format is the same as described for FIG. 9.

Example 10

In this embodiment, a positive meniscus lens 2101 is added as the first element in the first group. The positive element has positive distortion characteristic and it allows for partial compensation of the strong negative distortion of the negative meniscus elements 2102, 2103 in the first group.

Figure 21:
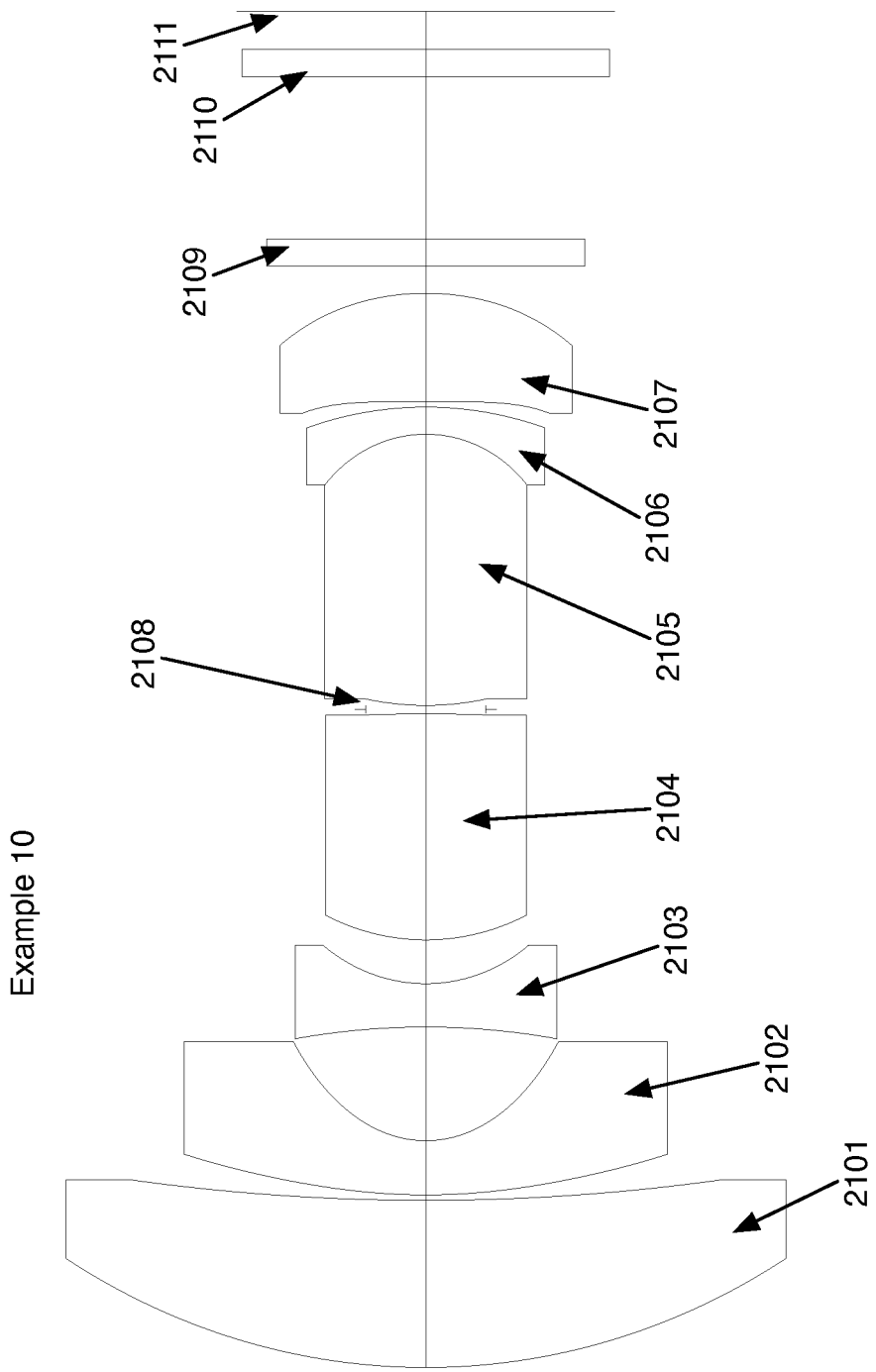
FIG. 21 shows a tenth embodiment: a seven-element design, also identified as Example 10.

FIG. 21 shows the optical layout of Example 10 where the optical distortion is corrected. The lens system includes features of the generalized low optical distortion embodiment. The first lens group facing the object space is comprised of the positive lens element 2101 and two negative lens elements 2102, 2103 with at least one aspheric element (L2) 2102. The first element 2101 (L1) is a meniscus element with a convex surface facing the object. This first group has negative power. The aspheric element 2102 in this group has negative power. The next group, second group, is comprised of a single positive power element 2104. There is an aperture stop 2108 between Group 2 and Group 3. The third lens group has two lens elements 2105 and 2106. The lens elements are arranged to form a doublet lens element structure. A doublet lens structure is made of two elements with opposing power. The negative element 2106 is either a meniscus or double concave element. The two elements are often cemented together with optical cement to form a cemented doublet. The negative element 2106 of the doublet faces the image plane. The fourth group is comprised of a single lens element (L7) 2107. This lens group has positive power. In addition, it is preferable to use at least one aspheric element in this group to provide distortion correction. The aspheric element 2107 in this group has positive power. Also shown are a filter element 2109, a sensor cover 2110. Both the latter elements are placed between the last lens element 2107 of the fourth group and the image plane 2111. Table 16 shows the optical prescription for the lens elements of Example 10. Group 1 comprises L1, L2 and L3. Group 2 comprises L4. Group 3 is L5 and L6.

Group 4 is L7. Lens elements L2 and L7 are aspheric. Table 17 gives the aspheric surface parameters for the surfaces of these two lens elements.

TABLE 16

Optical Prescription for Example 10.

| Surf | Type | Radius | Thickness | Nd | Abbe# | Diameter | Comment |
|---|---|---|---|---|---|---|---|
| 1 | STANDARD | 13.661 | 3.084 | 1.487 | 70.420 | 14.271 | L1 |
| 2 | STANDARD | 45.423 | 0.100 | | | 11.648 | |
| 3 | EVENASPH | 12.855 | 1.000 | 1.535 | 56.197 | 9.574 | L2 |
| 4 | EVENASPH | 2.299 | 2.097 | | | 5.259 | conic = −0.629 |
| 5 | STANDARD | −15.625 | 0.800 | 1.607 | 56.657 | 5.180 | L3 |
| 6 | STANDARD | 3.284 | 0.808 | | | 4.063 | |
| 7 | STANDARD | 4.589 | 4.169 | 1.835 | 42.729 | 3.974 | L4 |
| 8 | STANDARD | −38.247 | 0.081 | | | 2.430 | |
| STO | STANDARD | Infinity | 0.075 | | | 2.373 | |

TABLE 16-continued

Optical Prescription for Example 10.

| Surf | Type | Radius | Thickness | Nd | Abbe# | Diameter | Comment |
|---|---|---|---|---|---|---|---|
| 10 | STANDARD | 6.025 | 5.003 | 1.595 | 67.834 | 2.488 | L5 |
| 11 | STANDARD | −2.612 | 0.500 | 1.805 | 25.477 | 4.009 | L6 |
| 12 | STANDARD | −7.472 | 0.100 | | | 4.721 | |
| 13 | EVENASPH | Infinity | 2.000 | 1.535 | 56.197 | 4.904 | L7 |
| 14 | EVENASPH | −5.304 | 0.500 | | | 5.786 | |
| 15 | STANDARD | Infinity | 0.500 | 1.517 | 64.212 | 6.211 | Filter |
| 16 | STANDARD | Infinity | 3.000 | | | 6.307 | |
| 17 | STANDARD | Infinity | 0.500 | 1.516 | 64.115 | 7.185 | Cover |
| 18 | STANDARD | Infinity | 0.695 | | | 7.282 | |
| IMA | STANDARD | Infinity | | | | 7.489 | Sensor |

TABLE 17

Aspheric Parameters for Example 10.

Surface 3: L2

Coeff on r 2: 0
Coeff on r 4: −0.00058257447
Coeff on r 6: 1.3024687e−005
Coeff on r 8: −9.2783589e−008
Surface 4: L2

Coeff on r 2: 0
Coeff on r 4: 0.0012029115
Coeff on r 6: 6.6355931e−005
Surface 13: L7

Coeff on r 2: 0
Coeff on r 4: −0.0053031035
Coeff on r 6: −0.00011130846
Surface 14: L7

Coeff on r 2: 0
Coeff on r 4: −0.00089671451
Coeff on r 6: −0.00011600274
Coeff on r 8: 5.794357e−006

Figure 22:
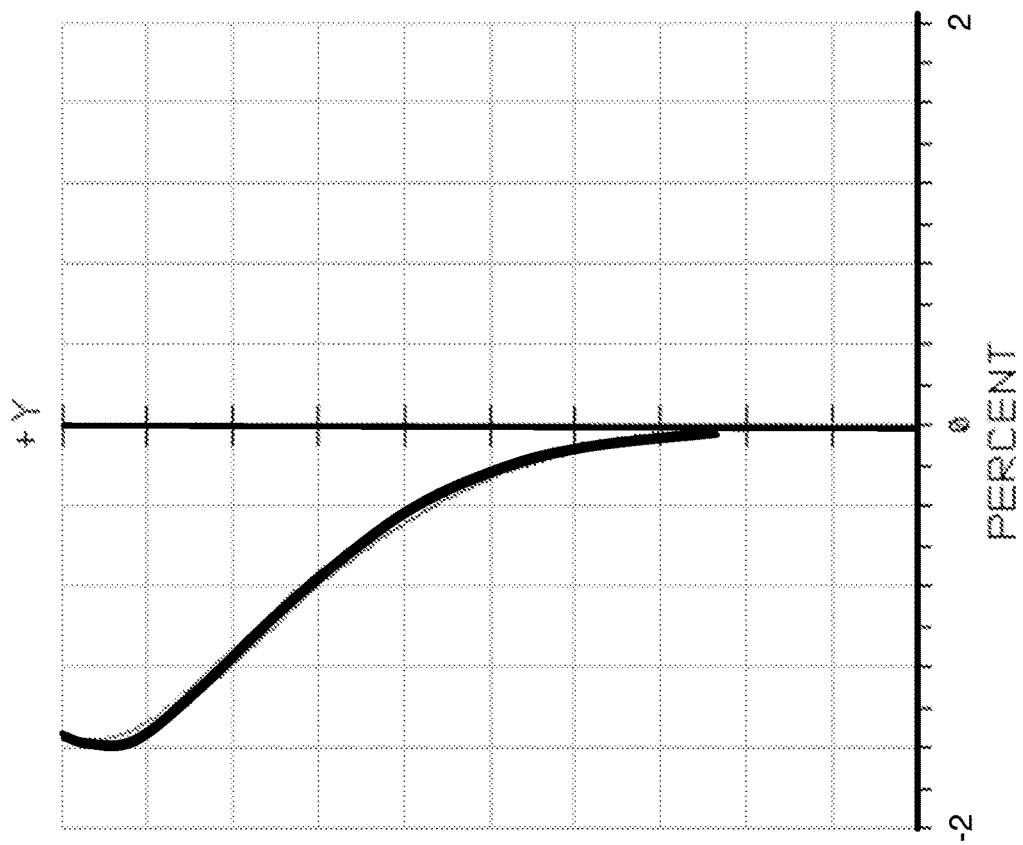
FIG. 22 shows the optical performance for the embodiment of FIG. 21.

FIG. 22 shows the distortion correction achieved in the design of Example 10. The form for the graph is the same as that of FIG. 9 already discussed. The lens design is seen to have less than 2% optical distortion over the entire field of view.

Example 11

In this embodiment, a positive meniscus lens 2301 is added to as the first element in the first group. The positive element has positive distortion characteristic and it allows for partial compensation of the strong negative distortion of the negative meniscus elements 2302, 2303 in the first group.

Figure 23:
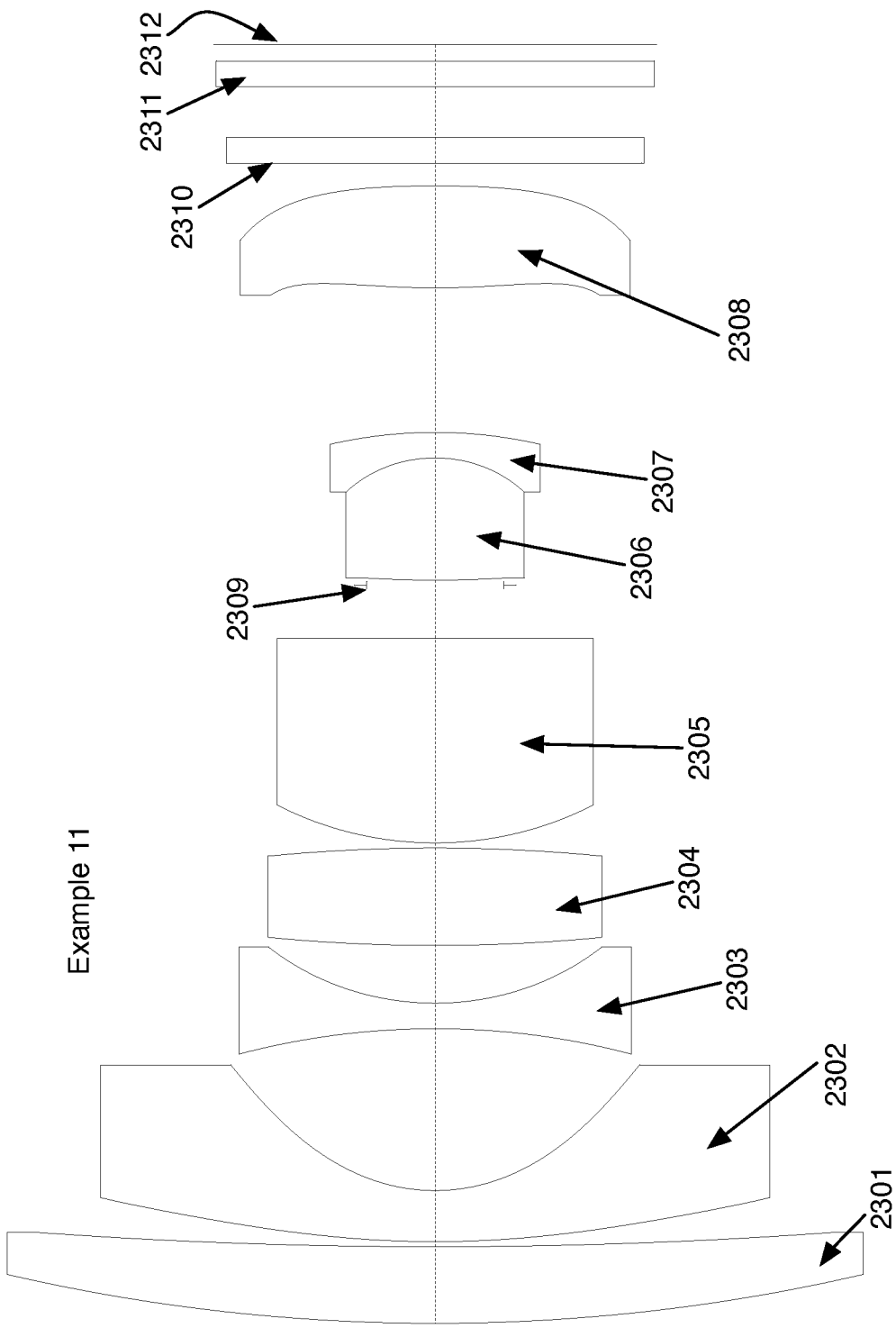
FIG. 23 shows an eleventh embodiment: a eight-element design, also identified as Example 11.

FIG. 23 shows the optical layout of Example 11 where the optical distortion is corrected. The lens system includes features of the generalized low optical distortion embodiment. The first lens group facing the object space is comprised of the positive lens element 2301 and two negative lens elements 2302, 2303 with at least one aspheric element (L2) 2302. The first element 2301 (L1) is a meniscus element with a convex surface facing the object. This first group has negative power. The aspheric element (L2) 2302 in this group has negative power. The next group, second group, is comprised of two positive power elements 2304, 2305. In the preferred embodiment, this group is made of a special structure as shown with at least two elements 2304, 2305. There is an aperture stop 2309 between Group 2 and Group 3. The third lens group has two lens elements 2306 and 2307. The lens elements are arranged to form a doublet lens element structure. A doublet lens structure is made of two elements with opposing power. The negative element 2307 is either a meniscus or double concave element. The two elements are often cemented together with optical cement to form a cemented doublet. The negative element 2307 of the doublet faces the image plane. The fourth group is comprised of a single lens element (L8) 2308. This lens group has positive power. In addition, it is preferable to use at least one aspheric element in this group to provide distortion correction. The aspheric element 2308 in this group has positive power, and also a complex aspheric profile on the object side. Also shown are a filter element 2310, a sensor cover 2311. Both the latter elements are placed between the last lens element 2308 of the fourth group and the image plane 2312. Table 18 shows the optical prescription for the lens elements of Example 11. Group 1 comprises L1, L2 and L3. Group 2 comprises L4 and L5. Group 3 is L6 and L7. Group 4 is L8. Lens elements L2 and L8 are aspheric. Table 19 shows the aspheric parameters for these lens elements.

TABLE 18

Optical Prescription for Example 11.

| Surf | Type | Radius | Thickness | Nd | Abbe# | Diameter | Comment |
|---|---|---|---|---|---|---|---|
| 1 | STANDARD | 29.801 | 1.500 | 1.620 | 60.374 | 14.994 | L1 |
| 2 | STANDARD | 86.825 | 0.100 | | | 13.880 | |
| 3 | EVENASPH | 16.109 | 1.000 | 1.535 | 56.197 | 11.717 | L2 |
| 4 | EVENASPH | 2.897 | 3.172 | | | 7.159 | Conic = −1.098 |
| 5 | STANDARD | −12.100 | 0.500 | 1.532 | 48.852 | 6.870 | L3 |
| 6 | STANDARD | 4.421 | 1.130 | | | 5.829 | |
| 7 | STANDARD | 26.856 | 1.910 | 1.835 | 42.729 | 5.851 | L4 |
| 8 | STANDARD | −26.856 | 0.100 | | | 5.792 | |
| 9 | STANDARD | 5.528 | 4.006 | 1.835 | 42.729 | 5.541 | L5 |
| 10 | STANDARD | Infinity | 1.042 | | | 3.512 | |

TABLE 18-continued

Optical Prescription for Example 11.

| Surf | Type | Radius | Thickness | Nd | Abbe# | Diameter | Comment |
|---|---|---|---|---|---|---|---|
| STO | STANDARD | Infinity | 0.099 | | | 2.398 | Stop |
| 12 | STANDARD | 17.963 | 2.394 | 1.595 | 67.834 | 2.500 | L6 |
| 13 | STANDARD | −2.153 | 0.500 | 1.728 | 28.315 | 3.124 | L7 |
| 14 | STANDARD | −7.359 | 2.830 | | | 3.670 | |
| 15 | EVENASPH | 11.450 | 2.000 | 1.535 | 56.197 | 5.778 | L8 |
| 16 | EVENASPH | −19.041 | 0.445 | | | 6.826 | |
| 17 | STANDARD | Infinity | 0.500 | 1.517 | 64.212 | 7.230 | Filter |
| 18 | STANDARD | Infinity | 1.000 | | | 7.318 | |
| 19 | STANDARD | Infinity | 0.500 | 1.516 | 64.115 | 7.585 | Cover |
| 20 | STANDARD | Infinity | 0.319 | | | 7.672 | |
| IMA | STANDARD | Infinity | | | | 7.758 | Sensor |

TABLE 19

Aspheric Parameters for Example 11.

Surface 3: L2

Coeff on r 2: 0
Coeff on r 4: −0.00015799408
Coeff on r 6: −6.988563e−006
Coeff on r 8: 2.0042355e−007
Coeff on r 10: −1.06316e−009

Surface 4: L2

Coeff on r 2: 0
Coeff on r 4: 0.0025730018
Coeff on r 6: 3.8073122e−005
Coeff on r 8: −6.4945946e−006

Surface 15: L8

Coeff on r 2: 0
Coeff on r 4: −0.0059377403
Coeff on r 6: 0.00033650966
Coeff on r 8: −6.154825e−005

Surface 16: L8

Coeff on r 2: 0
Coeff on r 4: −0.005230857
Coeff on r 6: 0.00034835163
Coeff on r 8: −4.1520872e−005
Coeff on r 10: 7.6800442e−007

Figure 24:
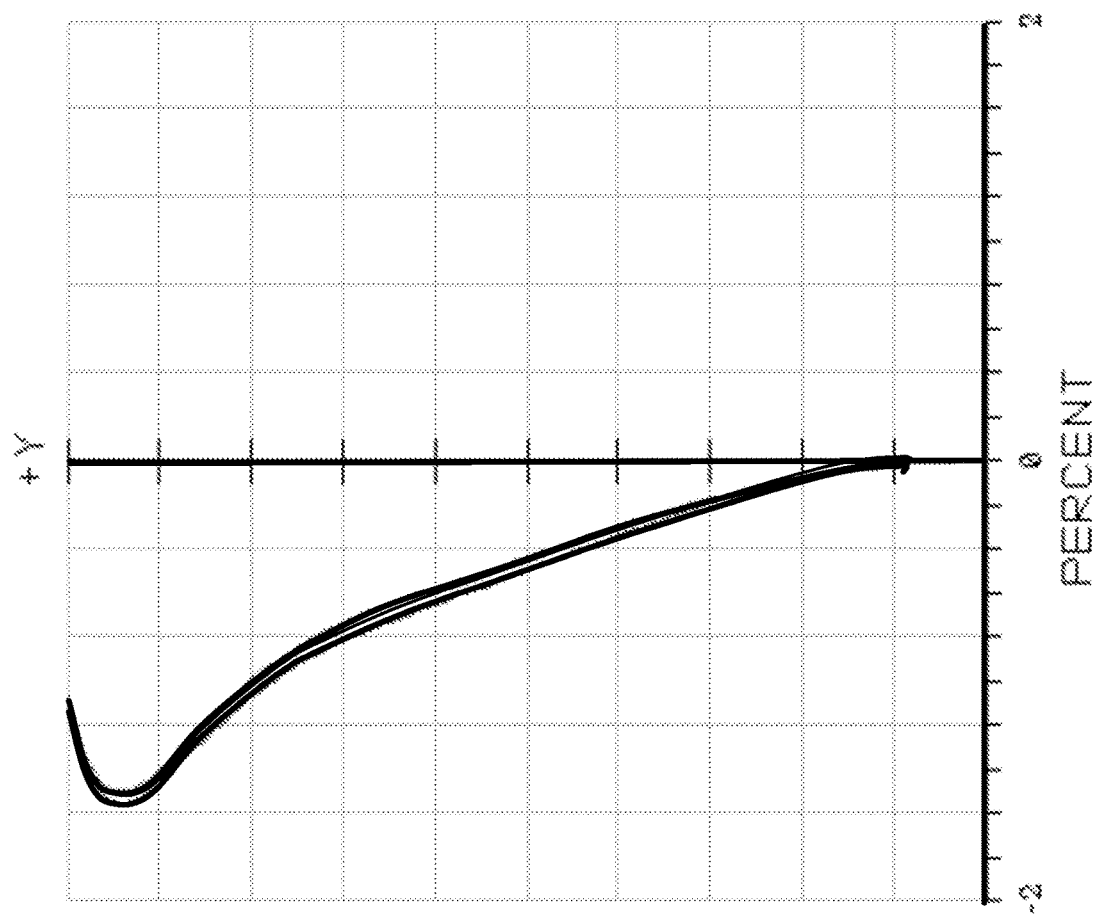
FIG. 24 shows the optical performance for the embodiment of FIG. 23.
Figure 25:
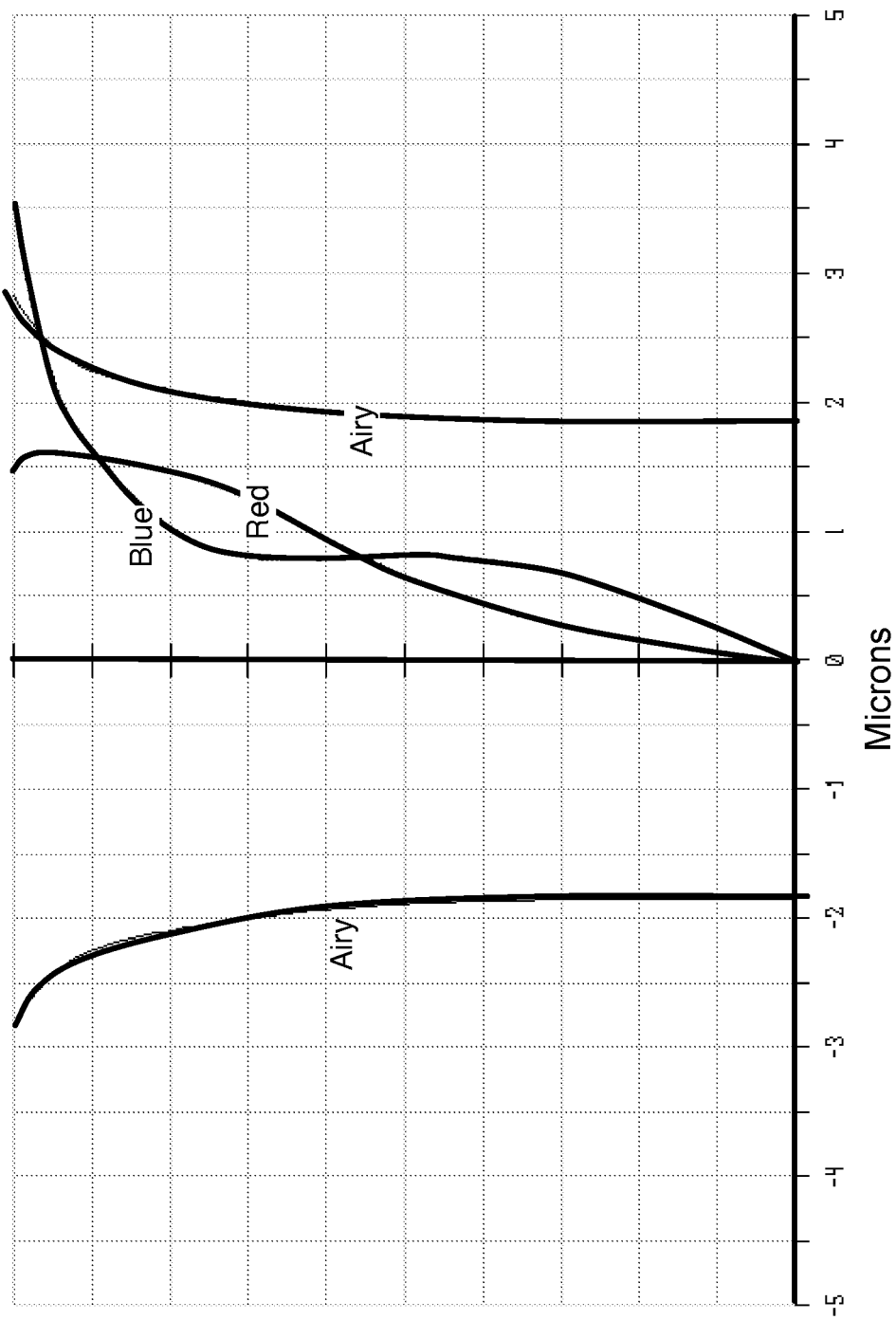
FIG. 25 shows the chromatic aberration performance for the embodiment of FIG. 23.

FIG. 24 shows the distortion correction achieved in this design. The form for the graph is the same as already discussed in FIG. 9. The optical distortion is less than 2% over the entire field of view. FIG. 25 shows the color aberration achieved with this design. The design has both very low optical distortion, as seen in FIG. 24, and very low color aberration as seen in FIG. 25.

Example 12

In this embodiment, a positive meniscus lens 2601 is added to as the first element in the first group. The positive element has positive distortion characteristic and it allows for partial compensation of the strong negative distortion of the negative meniscus elements 2602, 2603 in the first group.

Figure 26:
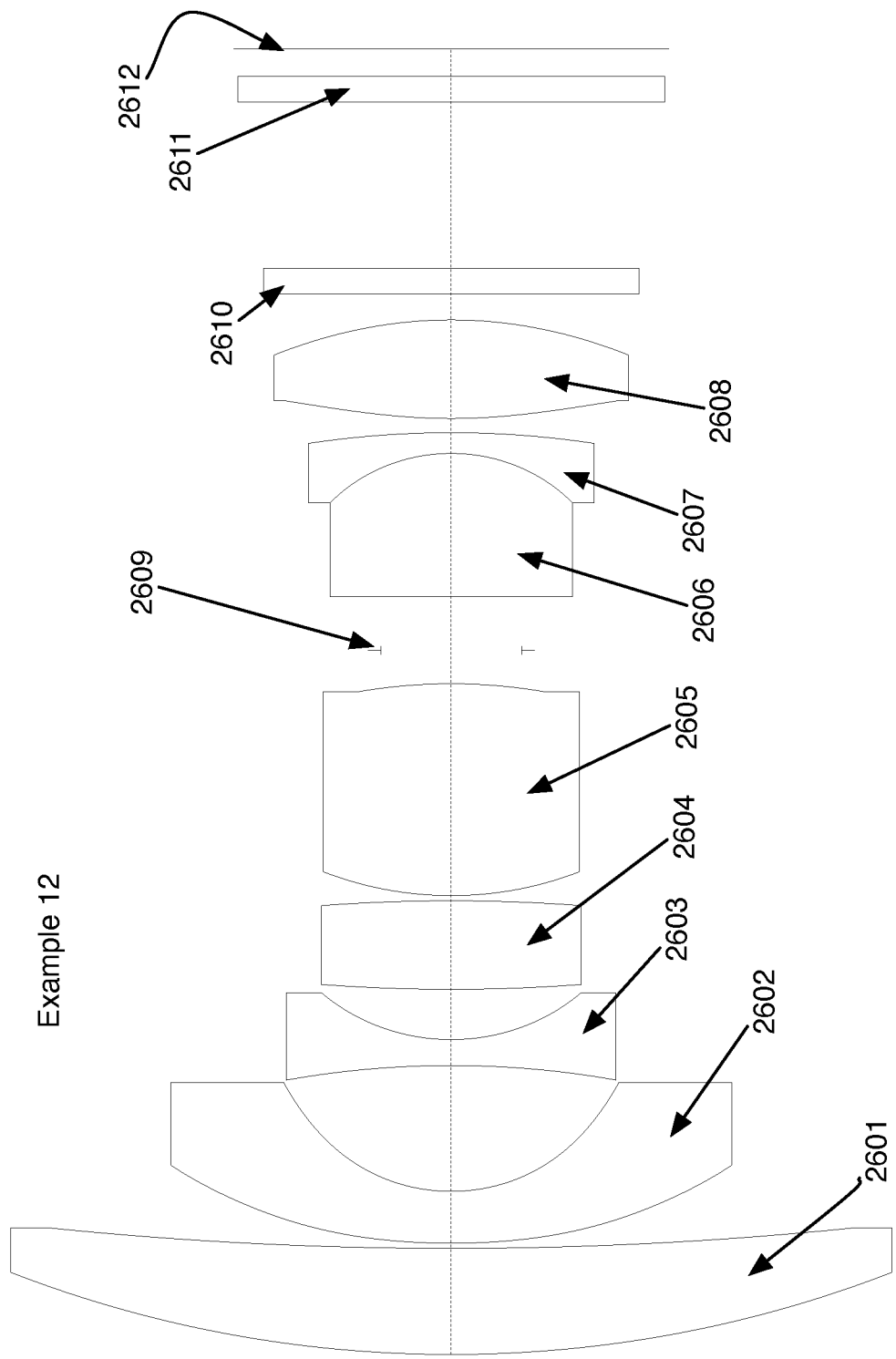
FIG. 26 shows an twelfth embodiment: a eight-element design, also identified as Example 12.

FIG. 26 shows the optical layout of Example 12 where both the optical distortion and color aberration are corrected. The lens system includes features of the generalized low optical distortion embodiment and the low color aberration embodiment. The first lens group facing the object space is comprised of the positive lens element 2601 and two negative lens elements 2602, 2603 with at least one aspheric element (L2) 2602. The first element 2601 (L1) is a meniscus element with a convex surface facing the object. This first group has negative power. The aspheric element (L2) 2602 in this group has negative power. The next group, second group, is comprised of two positive power elements 2604, 2605. The element structure of this group is important for lateral color correction. Although a single positive element can be used in this group. In the preferred embodiment, this group is made of a special structure as shown with at least two elements 2604, 2605. There is an aperture stop 2609 between Group 2 and Group 3. The third lens group has two lens elements 2606 and 2607. The lens elements are arranged to form a doublet lens element structure. A doublet lens structure is made of two elements with opposing power. The negative element 2607 is either a meniscus or double concave element. The two elements are often cemented together with optical cement to form a cemented doublet. The negative element 2607 of the doublet faces the image plane. The fourth group is comprised of a single lens element (L8) 2608. This lens group has positive power. In addition, it is preferable to use at least one aspheric element in this group to provide distortion correction. The aspheric element 2608 in this group has positive power. In one embodiment the power of this aspheric element is approximately 98% of the absolute power of the negative aspheric element 2602 in the first group. Also shown are a filter element 2610, a sensor cover 2611. Both the latter elements are placed between the last lens element 2608 of the fourth group and the image plane 2612. Table 20 shows the optical prescription for the lens elements of Example 12. Group 1 comprises L1, L2 and L3. Group 2 comprises L4 and L5. Group 3 is L6 and L7. Group 4 is L8. Lens elements L2 and L8 are aspheric. Table 21 shows the aspheric parameters for these lens elements.

TABLE 20

Optical Prescription for Example 12.

| Surf | Type | Radius | Thickness | Nd | Abbe# | Diameter | Comment |
|---|---|---|---|---|---|---|---|
| 1 | STANDARD | 20.394 | 2.046 | 1.517 | 64.212 | 15.759 | L1 |
| 2 | STANDARD | 65.643 | 0.100 | 14.381 | 0.000 | | |
| 3 | EVENASPH | 11.674 | 1.000 | 1.535 | 56.197 | 10.041 | L2 |

TABLE 20-continued

Optical Prescription for Example 12.

| Surf | Type | Radius | Thickness | Nd | Abbe# | Diameter | Comment |
|---|---|---|---|---|---|---|---|
| 4 | EVENASPH | 3.018 | 2.427 | 5.994 | −0.812 | | |
| 5 | STANDARD | −15.626 | 0.500 | 1.626 | 35.714 | 5.889 | L3 |
| 6 | STANDARD | 3.436 | 0.969 | 4.649 | 0.000 | | |
| 7 | STANDARD | 28.964 | 1.707 | 1.717 | 29.510 | 4.645 | L4 |
| 8 | STANDARD | −28.964 | 0.100 | 4.652 | 0.000 | | |
| 9 | STANDARD | 5.926 | 4.086 | 1.744 | 44.904 | 4.582 | L5 |
| 10 | STANDARD | −9.043 | 0.642 | 3.330 | 0.000 | | |
| STO | STANDARD | Infinity | 1.039 | 2.517 | 0.000 | | |
| 12 | STANDARD | Infinity | 2.761 | 1.593 | 68.327 | 3.412 | L6 |
| 13 | STANDARD | −2.941 | 0.400 | 1.805 | 25.477 | 4.339 | L7 |
| 14 | STANDARD | −15.844 | 0.273 | 5.114 | 0.000 | | |
| 15 | EVENASPH | 9.671 | 1.902 | 1.535 | 56.197 | 5.924 | L8 |
| 16 | EVENASPH | −7.341 | 0.500 | 6.330 | 0.000 | | |
| 17 | STANDARD | Infinity | 0.500 | 1.517 | 64.212 | 6.634 | Filter |
| 18 | STANDARD | Infinity | 3.200 | 6.719 | 0.000 | | |
| 19 | STANDARD | Infinity | 0.500 | 1.516 | 64.115 | 7.551 | Cover |
| 20 | STANDARD | Infinity | 0.527 | 7.638 | 0.000 | | |
| IMA | STANDARD | Infinity | 7.778 | 0.000 | | | Image |

TABLE 21

Aspheric Parameters for Example 12.

Surface 3: L2

Coeff on r 2: 0

Coeff on r 4: 0.0013859763

Coeff on r 6: −5.1767318e−005

Coeff on r 8: 6.418837e−007

Coeff on r 10: 6.3070083e−009

Surface 4: L2

Coeff on r 2: 0

Coeff on r 4: 0.0041495129

Coeff on r 6: 0.00028498408

Coeff on r 8: −1.3351761e−006

Surface 15: L8

Coeff on r 2: 0

Coeff on r 4: −0.0020431411

Coeff on r 6: 6.3908056e−005

Coeff on r 8: −1.7719234e−006

Surface 16: L8

Coeff on r 2: 0

Coeff on r 4: 0.0005900512

Coeff on r 6: −4.0197967e−005

Coeff on r 8: 2.7564179e−006

Coeff on r 10: −5.0501359e−008

Figure 27:
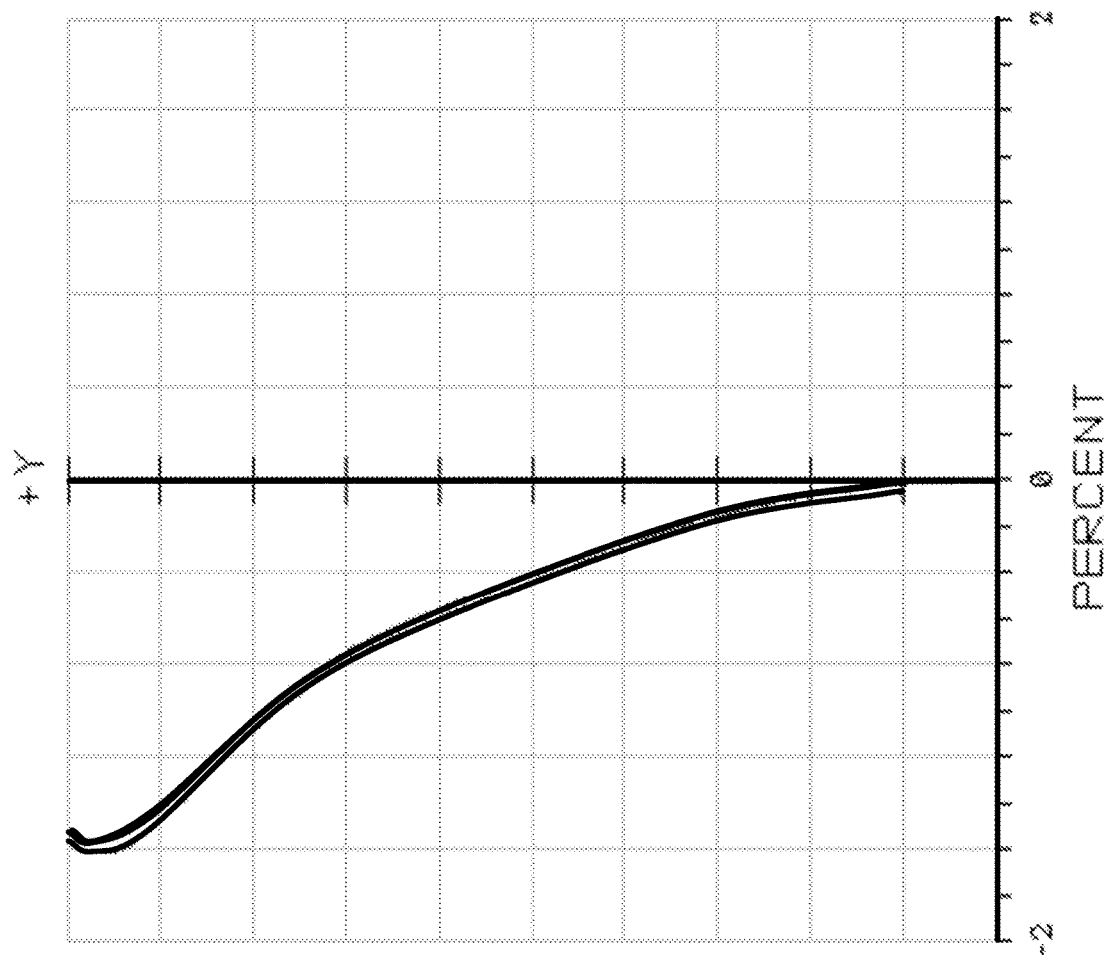
FIG. 27 shows the optical performance for the embodiment of FIG. 26.
Figure 28:
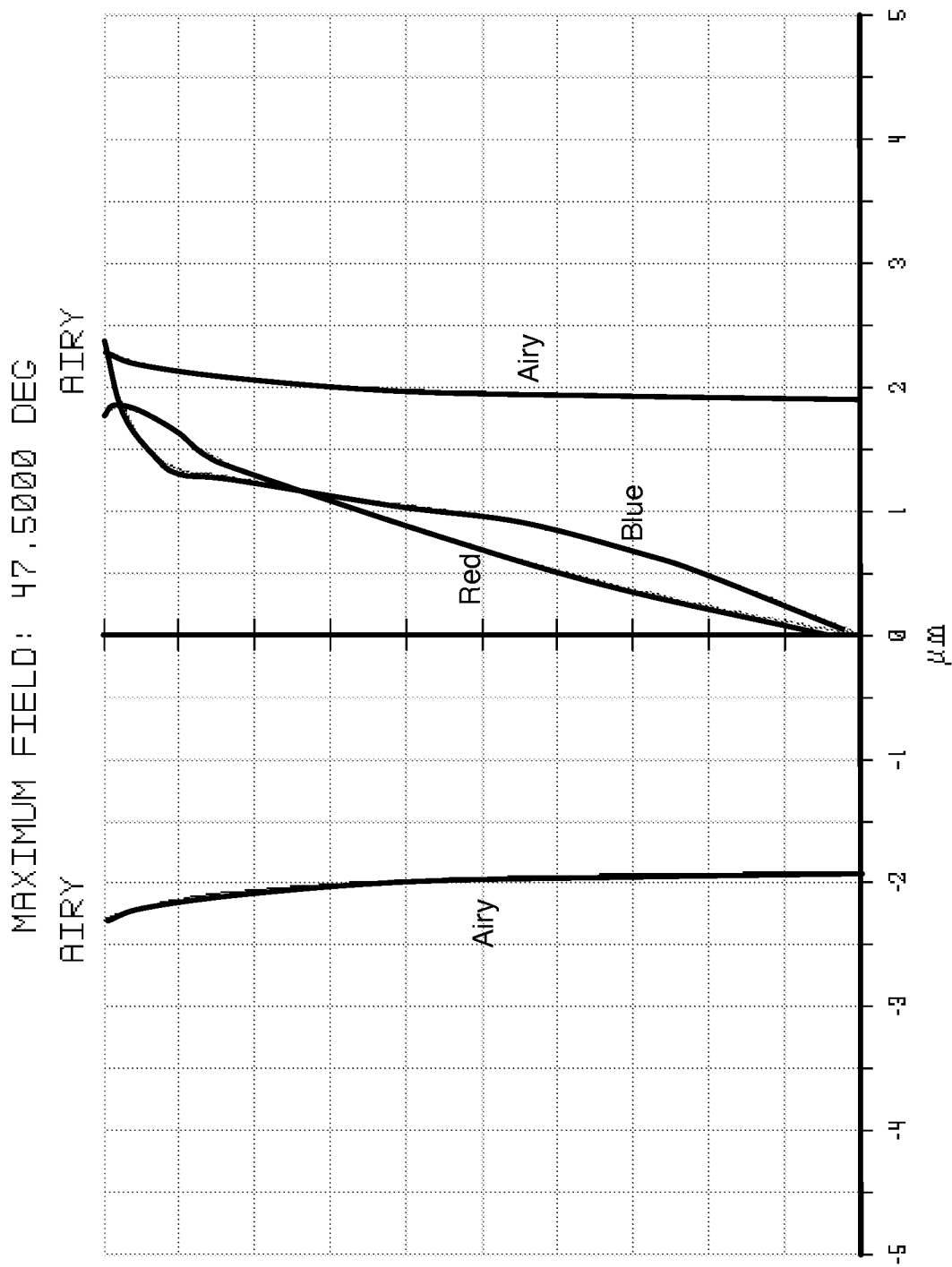
FIG. 28 shows the chromatic aberration performance for the embodiment of FIG. 26.

FIG. 27 shows the optical distortion correction achieved in this design. The form for the graph is the same as already discussed in FIG. 9. The optical distortion is less than 2% over the entire field of view. FIG. 28 shows the color aberration achieved with this design. The design has both very low optical distortion, as seen in FIG. 27, and very low color aberration as seen in FIG. 28.

Example 13

Figure 29:
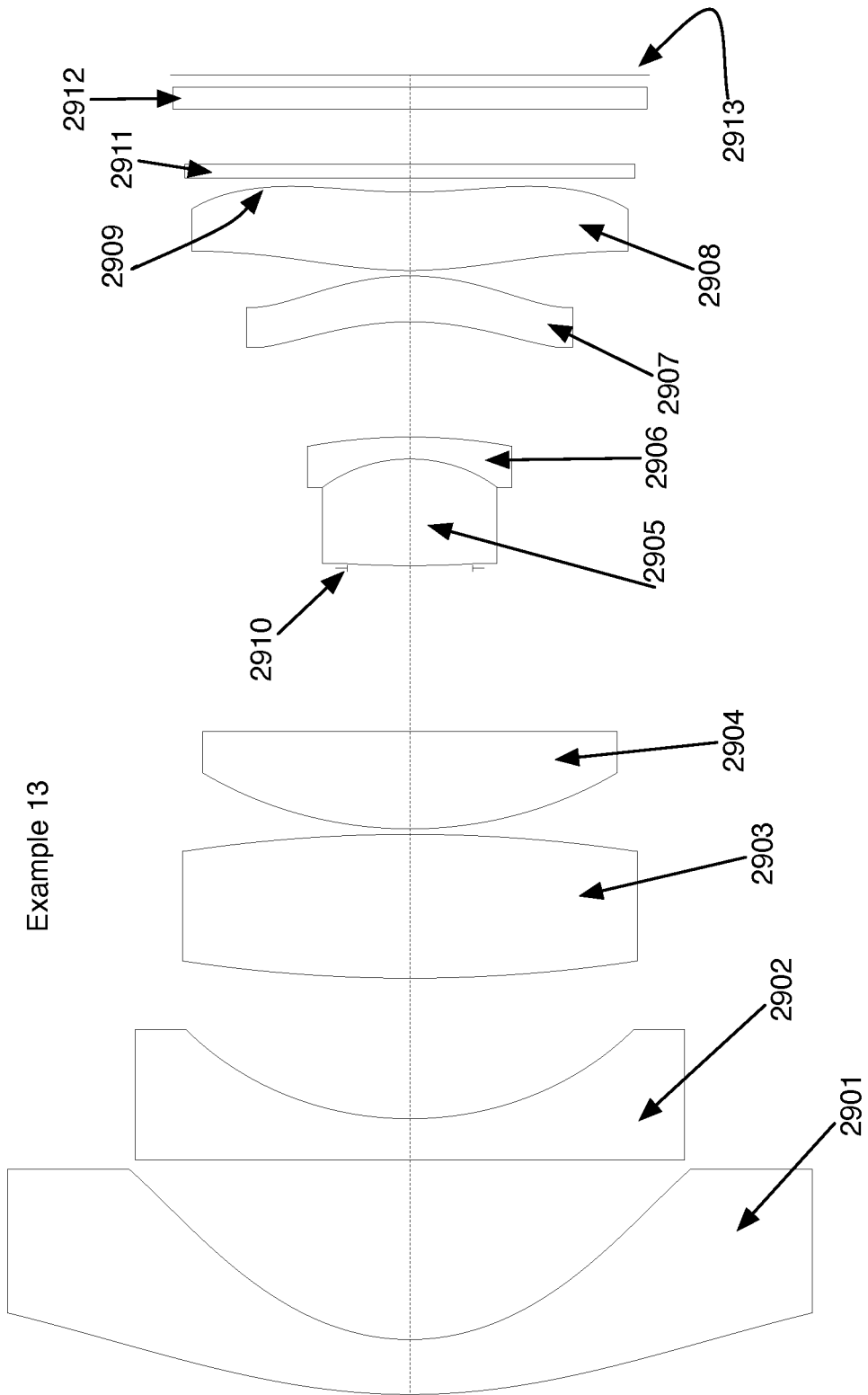
FIG. 29 shows a thirteenth embodiment: a eight-element design, also identified as Example 13.

FIG. 29 shows the optical layout of Example 13 where both the optical distortion and color aberration are corrected. The lens system includes features of the generalized low optical distortion embodiment and the low color aberration embodiment. The first lens group facing the object space is comprised of two negative lens elements 2901, 2902 with at least one aspheric element (L1) 2901. The first element 2901 (L1) is a meniscus element with a convex surface facing the object. This first group has negative power. The aspheric element (L2) 2902 in this group has negative power. The next group, second group, is comprised of two positive power elements 2903, 2304. The element structure of this group is important for lateral color correction. In the preferred embodiment, this group is made of a special structure as shown with at least two elements 2303, 2304. There is an aperture stop 2910 between Group 2 and Group 3. The third lens group has two lens elements 2305 and 2306. The lens elements are arranged to form a doublet lens element structure. A doublet lens structure is made of two elements with opposing power. The negative element 2906 is either a meniscus or double concave element. The two elements are often cemented together with optical cement to form a cemented doublet. The negative element 2906 of the doublet faces the image plane. The fourth group is comprised of two lens element (L7 and L8) 2907 and 2908. This lens group has positive power. In addition, it is preferable to use at least one aspheric element in this group to provide distortion correction. The subgroup of aspheric element 2907 and 2908 in this group has positive power. In preferred embodiments at least one of the aspheric surfaces is a complex surface. In this example, surface 2909 is a complex surface. In one embodiment the power of this subgroup compensates the negative power of the subgroup aspheric element 2901 in the first group. Also shown are a filter element 2911, a sensor cover 2912. Both the latter elements are placed between the last lens element 2909 of the fourth group and the image plane 2913. In this example, lens element number 1 or L1, lens element number 7 or L7, and lens element 8 or L8 are aspheric elements. The L8-S2 is a complex aspherical surface. Table 22 shows the optical prescription of Example 13. Table 23 shows the aspheric parameters for Example 13. Group 1 comprises L1 and L2. Group 2 comprises L3 and L4. Group 3 comprises L5 and L6. Group 4 comprises L7 and L8.

TABLE 22

Optical Prescription of Example 13.

| Surf | Type | Radius | Thickness | Nd | Abbe# | Diameter | Comment |
|---|---|---|---|---|---|---|---|
| 1 | EVENASPH | 19.347 | 2.060 | 1.689 | 52.782 | 26.928 | L1-S1 |
| 2 | EVENASPH | 6.533 | 6.735 | | | 18.795 | conic - −0.709 |
| 3 | STANDARD | Infinity | 1.545 | 1.593 | 68.695 | 18.380 | L2-S1 |
| 4 | STANDARD | 10.056 | 5.272 | | | 14.975 | L2-S2 |
| 5 | STANDARD | 44.988 | 5.394 | 1.697 | 55.534 | 15.217 | L3-S1 |
| 6 | STANDARD | −44.988 | 0.206 | | | 14.899 | L3-S2 |
| 7 | STANDARD | 12.488 | 3.644 | 1.713 | 53.868 | 13.857 | L4-S1 |
| 8 | STANDARD | Infinity | 6.125 | | | 12.719 | L4-S2 |
| STO | STANDARD | Infinity | 0.101 | | | 4.205 | APERTURE |
| 10 | STANDARD | 31.556 | 4.000 | 1.593 | 68.695 | 4.358 | L5-S1 |
| 11 | STANDARD | −4.532 | 0.824 | 1.728 | 28.315 | 5.840 | L5-S2 |
| 12 | STANDARD | −16.829 | 4.322 | | | 6.843 | L6-S2 |
| 13 | EVENASPH | −8.789 | 1.718 | 1.535 | 56.197 | 9.940 | L7-S1 |
| 14 | EVENASPH | −7.183 | 0.206 | | | 10.921 | conic = −0.0176 |
| 15 | EVENASPH | 12.824 | 2.936 | 1.535 | 56.197 | 13.540 | L8-S1 |
| 16 | EVENASPH | 16.539 | 0.523 | | | 14.590 | L8-S2 |
| 17 | STANDARD | Infinity | 0.523 | 1.517 | 64.212 | 14.950 | Filter |
| 18 | STANDARD | Infinity | 2.060 | | | 15.055 | |
| 19 | STANDARD | Infinity | 0.824 | 1.517 | 64.167 | 15.694 | Cover |
| 20 | STANDARD | Infinity | 0.448 | | | 15.863 | |
| IMA | STANDARD | Infinity | | 0.000 | | 16.011 | |

TABLE 23

Aspheric Coefficients for L1, L7 and L8.

Surface 1: L1-S1

Coeff on r 2: 0
Coeff on r 4: −8.3394108e−005
Coeff on r 6: 9.7863401e−008
Coeff on r 8: −1.8734545e−010
Surface 2: L1-S2

Coeff on r 2: 0
Coeff on r 4: −3.9636432e−005
Coeff on r 6: −1.3310784e−006
Coeff on r 8: −1.0978353e−008
Surface 13: L7-S1

Coeff on r 2: 0
Coeff on r 4: 0.00071872384
Coeff on r 6: 9.0672693e−006
Surface 14: L7-S2

Coeff on r 2: 0
Coeff on r 4: 0.00088963655
Coeff on r 6: 1.3829828e−005
Coeff on r 8: 2.1285903e−007
Surface 15: L8-S1

Coeff on r 2: 0
Coeff on r 4: −0.00082144529
Coeff on r 6: 5.384005e−006
Surface 16: L8-S2

Coeff on r 2: 0
Coeff on r 4: −0.0012938119
Coeff on r 6: 1.5619045e−005
Coeff on r 8: −1.2720579e−007

Figure 30:
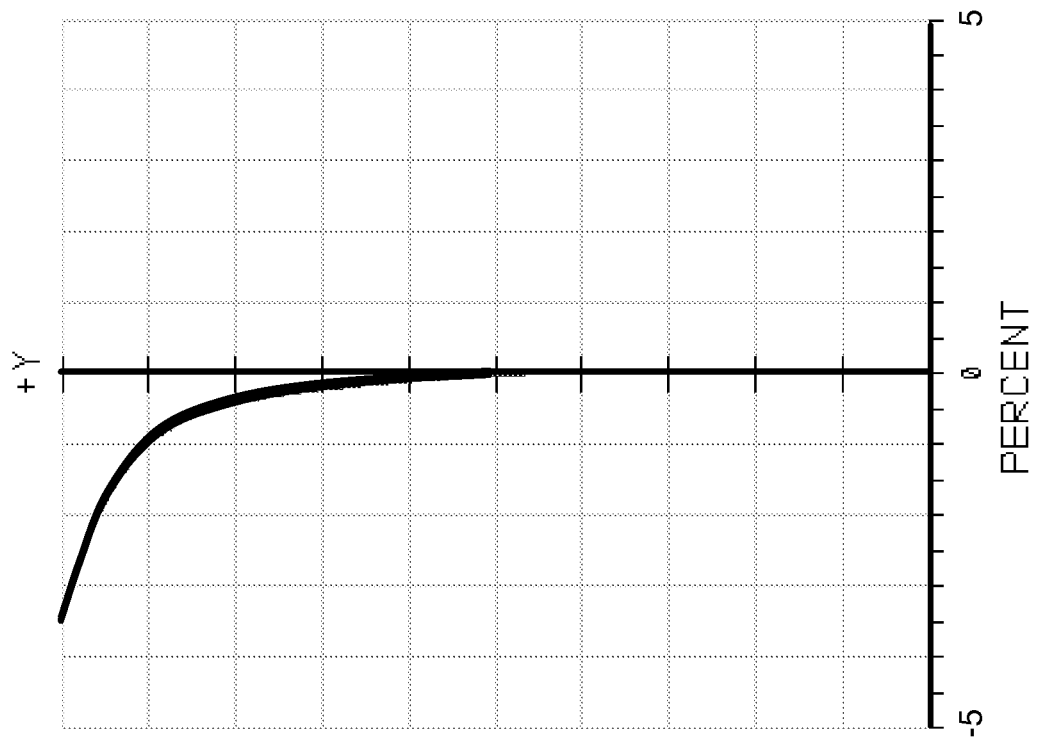
FIG. 30 shows the optical performance for the embodiment of FIG. 29.

FIG. 30 shows the optical distortion performance of Example 13. The form of the table is the same as those already discussed.

Example 14

Figure 31:
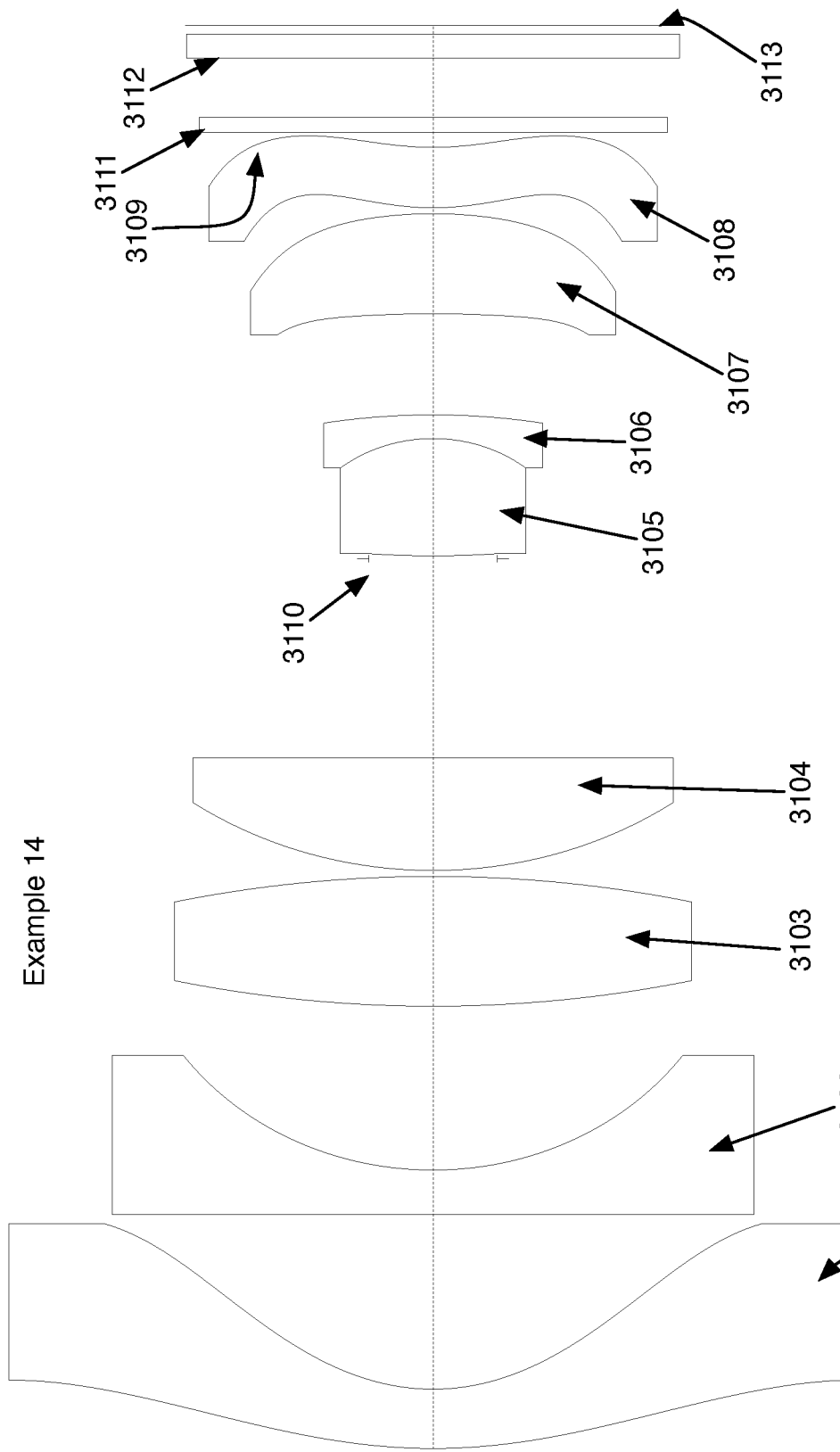
FIG. 31 shows a fourteenth embodiment: an eight-element design, also identified as Example 14.

FIG. 31 shows the layout of Example 14. where both the optical distortion and color aberration are corrected. The lens system includes features of the generalized low optical distortion embodiment and the low color aberration embodiment. The first lens group facing the object space is comprised of two negative lens elements 3101, 3102 with at least one aspheric element (L1) 3101. The first element 3101 (L1) is a meniscus element with a convex surface facing the object. This first group has negative power. The aspheric element (L2) 3102 in this group has negative power. The next group, second group, is comprised of two positive power elements 3103, 3104. The element structure of this group is important for lateral color correction. Although a single positive element can be used in this group. In the preferred embodiment, this group is made of a special structure as shown with at least two elements 3103, 3104. There is an aperture stop 3110 between Group 2 and Group 3. The third lens group has two lens elements 3105 and 3106. The lens elements are arranged to form a doublet lens element structure. A doublet lens structure is made of two elements with opposing power. The negative element 3106 is either a meniscus or double concave element. The two elements are often cemented together with optical cement to form a cemented doublet. The negative element 3106 of the doublet faces the image plane. The fourth group is comprised of two lens element (L7 and L8) 3107 and 3108. This lens group has positive power. In addition, it is preferable to use at least one aspheric element in this group to provide distortion correction. The subgroup of aspheric element 3107 and 3108 in this group has positive power. In preferred embodiments at least one of the aspheric surfaces is a complex surface. In this example, surface 3109 is one of the complex surfaces. In one embodiment the power of this subgroup compensates the negative power of the subgroup aspheric element 3101 in the first group. Also shown are a filter element 3111, a sensor cover 3112. Both the latter elements are placed between the last lens element 3109 of the fourth group and the image plane 3113. In this example, lens element number 1 or L1, lens element number 7 or L7, and lens element 8 or L8 are aspheric elements. Table 24 shows the optical prescription of Example 14. Table 25 shows the aspheric parameters for Example 14. Group 1 comprises L1 and L2. Group 2 comprises L3 and L4. Group 3 comprises L5 and L6. Group 4 comprises L7 and L8.

TABLE 24

Optical Prescription of Example 14.

| Surf | Type | Radius | Thickness | Nd | Abbe# | Diameter | Comment |
|---|---|---|---|---|---|---|---|
| 1.000 | ASPH | 7.761 | 1.000 | 1.689 | 52.782 | 12.751 | L1-S2 |
| 2.000 | ASPH | 2.902 | 2.947 | | | 9.875 | conic = −0.863 |
| 3.000 | STD | Infinity | 0.750 | 1.593 | 68.695 | 9.648 | L2-S1 |
| 4.000 | STD | 4.604 | 2.764 | | | 7.506 | L2-S2 |
| 5.000 | STD | 17.675 | 2.191 | 1.586 | 60.714 | 7.763 | L3-S1 |
| 6.000 | STD | −17.675 | 0.100 | | | 7.721 | L3-S2 |
| 7.000 | STD | 6.255 | 1.894 | 1.713 | 53.868 | 7.213 | L4-S1 |
| 8.000 | STD | Infinity | 3.365 | | | 6.661 | L4-S2 |
| STO | STD | Infinity | 0.050 | | | 1.926 | Aperture |
| 10.000 | STD | 12.906 | 1.978 | 1.593 | 68.695 | 2.009 | L5-S1 |
| 11.000 | STD | −2.200 | 0.400 | 1.728 | 28.315 | 2.789 | L5-S2 |
| 12.000 | STD | −9.739 | 1.706 | | | 3.293 | L6-S2 |
| 13.000 | ASPH | −14.561 | 1.688 | 1.535 | 56.197 | 4.677 | L7-S1 |
| 14.000 | ASPH | −5.915 | 0.100 | | | 5.492 | conic = −16.256 |
| 15.000 | ASPH | 3.599 | 1.019 | 1.535 | 56.197 | 5.677 | L8-S1 |
| 16.000 | ASPH | 4.035 | 0.254 | | | 6.734 | L8-S2 |
| 17.000 | STD | Infinity | 0.254 | 1.517 | 64.212 | 6.995 | Filter |
| 18.000 | STD | Infinity | 1.000 | | | 7.043 | |
| 19.000 | STD | Infinity | 0.400 | 1.517 | 64.167 | 7.330 | Cover |
| 20.000 | STD | Infinity | 0.151 | | | 7.405 | |
| IMA | STD | Infinity | | | | 7.449 | image plane |

TABLE 25

Aspheric Coefficients for L1, L7 and L8 of Example 14.

Surface 1: L1-S1

Coeff on r 2: 0
Coeff on r 4: −0.0014197006
Coeff on r 6: 4.7327687e−006
Coeff on r 8: 3.4615728e−008
Coeff on r 10: −2.2357752e−009
Surface 2: L1-S2

Coeff on r 2: 0
Coeff on r 4: −0.00026995035
Coeff on r 6: −0.00019486976
Coeff on r 8: 2.9603264e−006
Surface 13: L7-S1

Coeff on r 2: 0
Coeff on r 4: 0.0053478211
Coeff on r 6: −0.0019948009
Surface 14: L7-S2

Coeff on r 2: 0
Coeff on r 4: −0.010581926
Coeff on r 6: −0.00052026403
Coeff on r 8: −2.1637163e−005
Surface 15: L8-S1

Coeff on r 2: 0
Coeff on r 4: −0.021284219
Coeff on r 6: −0.0010888169
Surface 16: L8-S2

Coeff on r 2: 0
Coeff on r 4: −0.026187705
Coeff on r 6: 0.001623308
Coeff on r 8: −8.873256e−005

Figure 32:
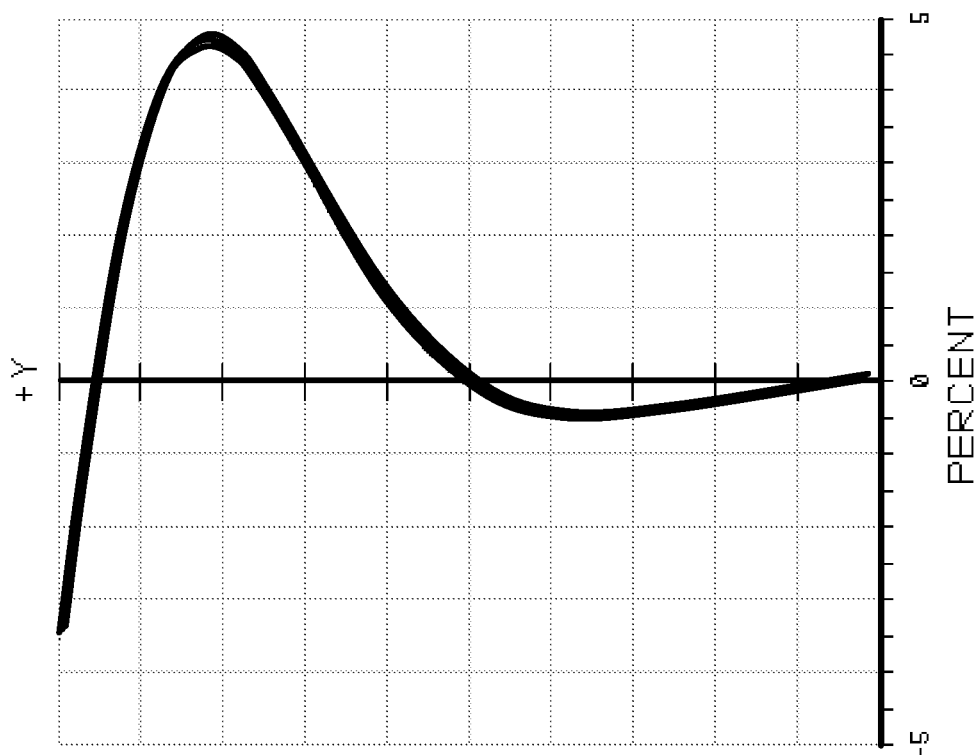
FIG. 32 shows the optical performance for the embodiment of FIG. 31.

FIG. 32 shows the optical distortion achieved in Example 14.

Example 15

Figure 33:
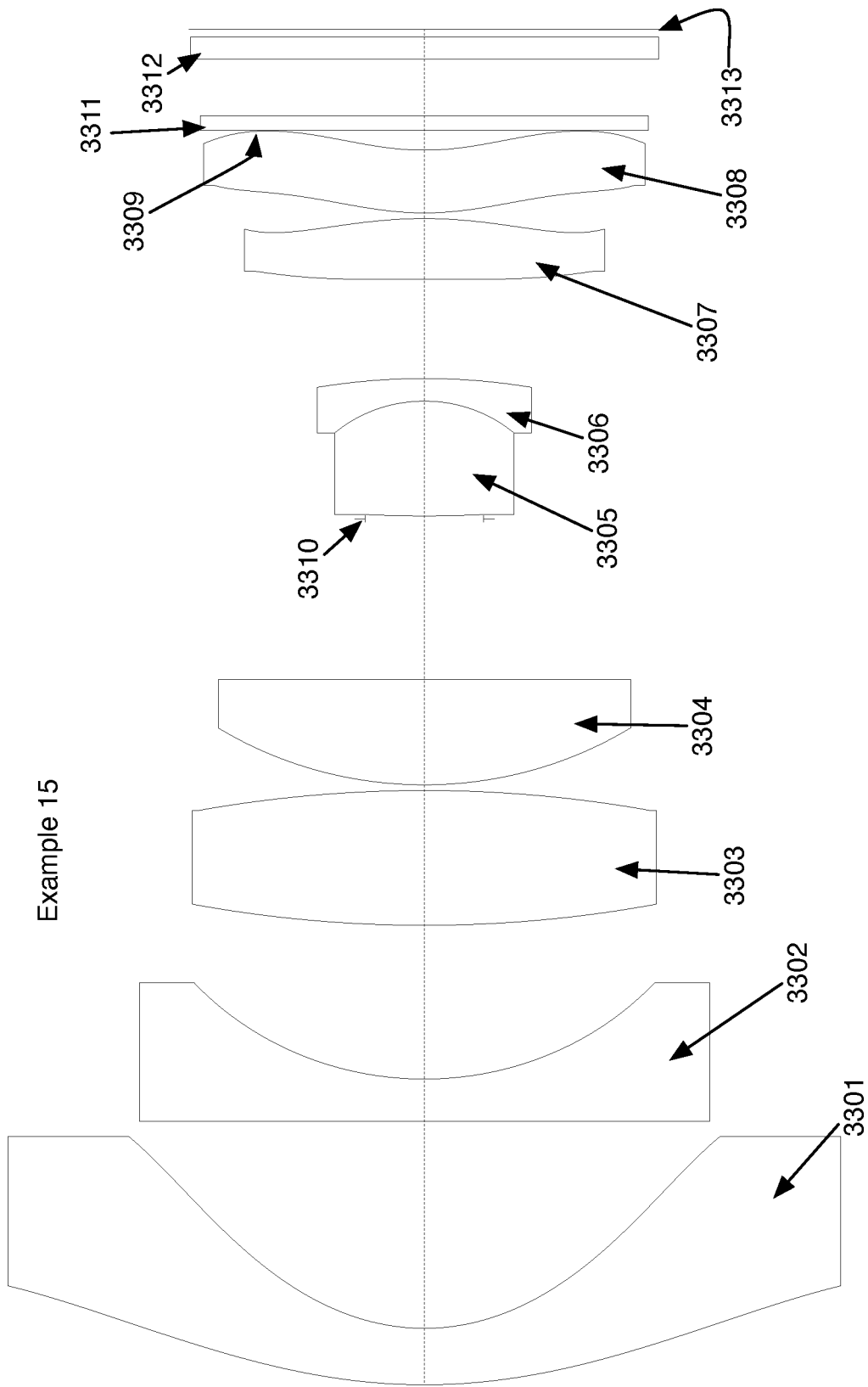
FIG. 33 shows a fifteenth embodiment: an eight-element design, also identified as Example 15.

FIG. 33 shows the layout of Example 15. Where both the optical distortion and color aberration are corrected. The lens system includes features of the generalized low optical distortion embodiment and the low color aberration embodiment. The first lens group facing the object space is comprised of two negative lens elements 3301, 3302 with at least one aspheric element (L1) 3301. The first element 3301 (L1) is a meniscus element with a convex surface facing the object. This first group has negative power. The aspheric element (L2) 3302 in this group has negative power. The next group, second group, is comprised of two positive power elements 3303, 3304. The element structure of this group is important for lateral color correction. Although a single positive element can be used in this group. In the preferred embodiment, this group is made of a special structure as shown with at least two elements 3303, 3304. There is an aperture stop 3310 between Group 2 and Group 3. The third lens group has two lens elements 3305 and 3306. The lens elements are arranged to form a doublet lens element structure. A doublet lens structure is made of two elements with opposing power. The negative element 3306 is either a meniscus or double concave element. The two elements are often cemented together with optical cement to form a cemented doublet. The negative element 3306 of the doublet faces the image plane. The fourth group is comprised of two lens element (L7 and L8) 3307 and 3308. This lens group has positive power. In addition, it is preferable to use at least one aspheric element in this group to provide distortion correction. The subgroup of aspheric element 3307 and 3308 in this group has positive power. In preferred embodiments at least one of the aspheric surfaces is a complex surface. In this example, surface 3309 is one of the complex surfaces. In one embodiment the power of this subgroup compensates the negative power of the subgroup aspheric element 3301 in the first group. Also shown are a filter element 3311, a sensor cover 3312. Both the latter elements are placed between the last lens element 3309 of the fourth group and the image plane 3313. In this example, lens element number 1 or L1, lens element number 7 or L7, and lens element 8 or L8 are aspheric elements. Table 26 shows the optical prescription of Example 14. Table 27 shows the aspheric parameters for Example 14. Group 1 comprises L1 and L2. Group 2 comprises L3 and L4. Group 3 comprises L5 and L6. Group 4 comprises L7 and L8.

TABLE 26

Optical Prescription of Example 15.

| Surf | Type | Radius | Thickness | Nd | Abbe# | Diameter | Comment |
|---|---|---|---|---|---|---|---|
| 1 | ASPH | 8.756 | 1.000 | 1.689 | 52.782 | 13.659 | L1-S1 |
| 2 | ASPH | 3.241 | 3.664 | | | 9.701 | conic = −0.685 |
| 3 | STD | Infinity | 0.750 | 1.593 | 68.695 | 9.354 | L2-S1 |
| 4 | STD | 5.035 | 2.722 | | | 7.556 | L2-S2 |
| 5 | STD | 19.539 | 2.388 | 1.640 | 60.214 | 7.615 | L3-S1 |
| 6 | STD | −19.539 | 0.100 | | | 7.416 | L3-S2 |
| 7 | STD | 6.175 | 1.860 | 1.729 | 54.669 | 6.769 | L4-S1 |
| 8 | STD | Infinity | 2.851 | | | 6.154 | L4-S2 |
| STO | STD | Infinity | 0.050 | | | 1.942 | Aperture |
| 10 | STD | 20.069 | 2.032 | 1.593 | 68.695 | 2.033 | L5-S1 |
| 11 | STD | −2.200 | 0.400 | 1.728 | 28.315 | 2.943 | L5-S2 |
| 12 | STD | −9.952 | 1.758 | | | 3.516 | L6-S2 |
| 13 | ASPH | −90.588 | 1.075 | 1.535 | 56.197 | 5.563 | L7-S1 |
| 14 | ASPH | −6.816 | 0.100 | | | 5.915 | conic = −0.436 |
| 15 | ASPH | 4.514 | 1.110 | 1.535 | 56.197 | 6.928 | L8-S1 |
| 16 | ASPH | 3.971 | 0.354 | | | 7.247 | L8-S2 |
| 17 | STD | Infinity | 0.254 | 1.517 | 64.212 | 7.307 | Filter |
| 18 | STD | Infinity | 1.000 | | | 7.349 | |
| 19 | STD | Infinity | 0.400 | 1.517 | 64.167 | 7.604 | Cover |
| 20 | STD | Infinity | 0.136 | | | 7.677 | |
| IMA | STD | Infinity | | | | 7.715 | image plane |

TABLE 27

Aspheric Coefficients for L1, L7 and L8 of Example 15.

Surface 1: L1-S1

Coeff on r 2: 0
Coeff on r 4: −0.00066102564
Coeff on r 6: 4.2358073e−007
Coeff on r 8: −7.0258413e−009
Coeff on r 10: −4.3216933e−010

Surface 2: L1-S2

Coeff on r 2: 0
Coeff on r 4: −0.00027055499
Coeff on r 6: −3.302384e−005
Coeff on r 8: −2.3760819e−006

Surface 13: L7-S1

Coeff on r 2: 0
Coeff on r 4: 0.0049614379
Coeff on r 6: −0.00024100413

Surface 14: L7-S2

Coeff on r 2: 0
Coeff on r 4: 0.0041380548
Coeff on r 6: 0.0002407508
Coeff on r 8: −6.7077967e−007

TABLE 27-continued

Aspheric Coefficients for L1, L7 and L8 of Example 15.

Surface 15: L8-S1

Coeff on r 2: 0
Coeff on r 4: −0.012975846
Coeff on r 6: 0.00042915435

Surface 16: L8-S2

Coeff on r 2: 0
Coeff on r 4: −0.018188899
Coeff on r 6: 0.00092896076

Figure 34:
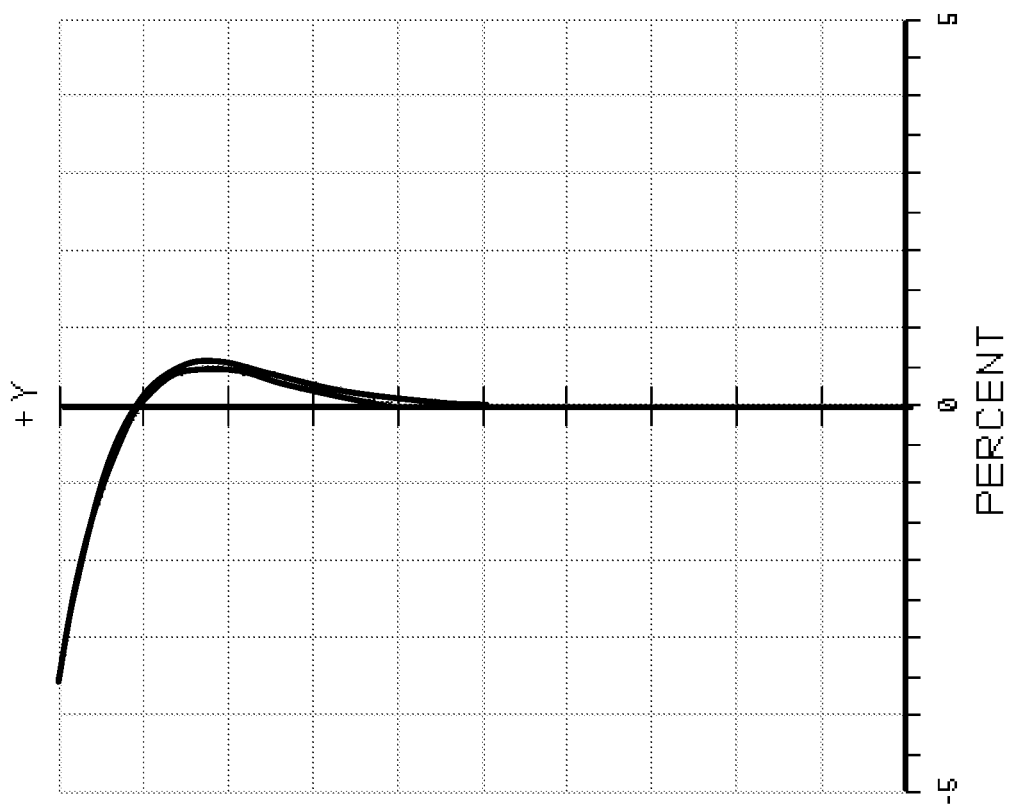
FIG. 34 shows the optical performance for the embodiment of FIG. 33.

FIG. 34 shows the optical distortion achieved in Example 15.

SUMMARY

A wide-angle lens system that includes four lens groups arranged from object to image and having a field of view greater than 90 degrees is described. The lens elements within each of the four groups are selected for optimization of performance factors of low chromatic aberration, low optical distortion and manufacturability. Design methods are included and shown through exemplary optimized designs. The Designs and Examples all meet the general description discussed above and the parametric equations for the design. Table 28 summarizes the optical parameters of the Examples 1 to 15 and Table 29 shows that all Examples meet the conditions set by inequalities (1) thru (10).

TABLE 28

Optical Properties of Examples 1-15

| Example | F Focal length of entire lens assembly | F1 Focal length of Group 1 | F2 Focal length of Group 2 | F3 Focal length of Group 3 | F4 Focal length of Group 4 | F1a Focal length of aspheric subgroup in Group 1 | F4a Focal length of aspheric subgroup in Group 4 |
|---|---|---|---|---|---|---|---|
| 1 | 3.184 | −2.75 | 4.94 | 110.6 | 10.787 | NA | NA |
| 2 | 5.87 | −7.266 | 10.996 | 987.751 | 16.835 | NA | NA |
| 3 | 3.3 | −3.84 | 11.54 | 26.133 | 17.68 | NA | NA |
| 4 | 5.677 | −4.588 | 9.41 | −953.447 | 13.02 | −15.944 | 13.02 |
| 5 | 3.21 | −2.95 | 5.178 | −197.4 | 7.173 | −6.97 | 7.173 |

TABLE 28-continued

Optical Properties of Examples 1-15

| Example | F Focal length of entire lens assembly | F1 Focal length of Group 1 | F2 Focal length of Group 2 | F3 Focal length of Group 3 | F4 Focal length of Group 4 | F1a Focal length of aspheric subgroup in Group 1 | F4a Focal length of aspheric subgroup in Group 4 |
|---|---|---|---|---|---|---|---|
| 6 | 3.108 | −3.625 | 11.08 | 19.343 | 11.697 | −11.694 | 11.697 |
| 7 | 2.817 | −3.21 | 5.823 | 67.525 | 8.626 | −7.555 | 8.626 |
| 8 | 3.736 | −5.169 | 11.51 | 17.63 | 17.26 | −13.679 | 17.26 |
| 9 | 3.965 | −4.628 | 10.497 | 40.538 | 10.575 | −9.929 | 10.575 |
| 10 | 3.478 | −2.362 | 5.108 | 8.62 | 9.879 | −5.394 | 9.879 |
| 11 | 3.589 | −2.763 | 4.808 | 14.712 | 13.605 | −6.746 | 13.605 |
| 12 | 3.612 | −2.685 | 4.572 | −45.895 | 8.092 | −7.9 | 8.092 |
| 13 | 6.031 | −6.573 | 11.826 | 31.994 | 30.55 | −15.24 | 30.55 |
| 14 | 2.81 | −3.127 | 5.757 | 17.391 | 10.748 | −7.3 | 10.748 |
| 15 | 2.906 | −3.354 | 5.667 | 24.993 | 13.203 | −8.03 | 13.203 |

TABLE 29

Parametric Conditions for Examples 1-15.

| Example | V21 Condition 2, Abbe # of 1st element in Group 2 | V22 Condition 2, Abbe # of 2nd element in Group 2 | V2ave Condition 3, Average Abbe # of Group 2 | V3n Condition 5, Abbe # of negative element Group 3 doublet pair in Group 3 | F1/F Condition 1 | F2/F Condition 4 |
|---|---|---|---|---|---|---|
| 1 | 46.6 | 46.6 | 46.6 | 25.5 | −0.86 | 1.55 |
| 2 | 42.7 | 35.3 | 39 | 23.8 | −1.24 | 1.87 |
| 3 | 42.7 | 49.6 | 46.15 | 23.8 | −1.16 | 3.50 |
| 4 | 46.6 | 42.7 | 44.65 | 28.3 | −0.81 | 1.66 |
| 5 | 47.5 | 38 | 42.75 | 25.5 | −0.92 | 1.61 |
| 6 | 46.6 | NA | 46.6 | 25.5 | −1.17 | 3.56 |
| 7 | 47.5 | NA | 47.5 | 23.8 | −1.14 | 2.07 |
| 8 | 47.5 | NA | 47.5 | 23.8 | −1.38 | 3.08 |
| 9 | 42.7 | NA | 42.7 | 28.3 | −1.17 | 2.65 |
| 10 | 42.7 | NA | 42.7 | 25.5 | −0.68 | 1.47 |
| 11 | 42.7 | 42.7 | 42.7 | 28.3 | −0.77 | 1.34 |
| 12 | 29.5 | 44.9 | 37.2 | 25.5 | −0.74 | 1.27 |
| 13 | 55.5 | 53.9 | 54.7 | 28.3 | −1.09 | 1.96 |
| 14 | 60.7 | 53.9 | 57.3 | 28.3 | −1.11 | 2.05 |
| 15 | 60.2 | 54.7 | 57.45 | 28.3 | −1.15 | 1.95 |

| Example | F1/F2 Condition 11 | \|F3/F\| Condition 7 | F4/F Condition 8 | \|Rd/F\| Condition 6 | F1a/F4a Condition 9 | F1a/F Condition 10 |
|---|---|---|---|---|---|---|
| 1 | −0.56 | 34.74 | 3.39 | 0.73 | NA | NA |
| 2 | −0.66 | 168.2 | 2.87 | 0.70 | NA | NA |
| 3 | −0.33 | 7.92 | 5.36 | 1.51 | NA | NA |
| 4 | −0.49 | 167.9 | 2.29 | 0.61 | −1.22 | −2.81 |
| 5 | −0.57 | 61.50 | 2.23 | 0.98 | −0.97 | −2.17 |
| 6 | −0.33 | 6.22 | 3.76 | 1.37 | −1.00 | −3.76 |
| 7 | −0.55 | 23.97 | 3.06 | 1.00 | −0.88 | −2.68 |
| 8 | −0.45 | 4.72 | 4.62 | 1.44 | −0.79 | −3.66 |
| 9 | −0.44 | 10.22 | 2.67 | 1.06 | −0.94 | −2.50 |
| 10 | −0.46 | 2.48 | 2.84 | 0.75 | −0.55 | −1.55 |
| 11 | −0.57 | 4.10 | 3.79 | 0.60 | −0.50 | −1.88 |
| 12 | −0.59 | 12.71 | 2.24 | 0.81 | −0.98 | −2.19 |
| 13 | −0.56 | 5.30 | 5.07 | 0.75 | −0.50 | −2.53 |
| 14 | −0.54 | 6.19 | 3.82 | 0.78 | −0.68 | −2.60 |
| 15 | −0.59 | 8.60 | 4.54 | 0.76 | −0.61 | −2.76 |

I claim:

1. A wide-angle lens system comprised of four lens groups said four groups each comprised of lens elements, and the groups as ordered from object to image plane, comprising:
   a. a first lens group comprised of at least two lens elements the last lens element in group one is negative said first group having negative power,
   b. a second lens group said second group having positive power
   c. an aperture stop or spacer,
   d. a third lens group comprising a doublet lens element structure, said doublet lens structure is made of a positive power lens element and a negative power lens element, the negative power element is either a meniscus or double concave element, and the negative power element faces the image plane,
e. a fourth lens group having at least one lens element of positive power, the fourth lens group having positive power,
f. wherein the wide-angle lens system further includes at least one selected from:
  i. a positive power meniscus lens element as the first lens element of the first group,
  ii. two lens elements in the second group,
  iii. an aspheric element in the first group,
  iv. a negative power aspheric subgroup in the first group and an aspheric subgroup in the fourth group having compensating positive power,
  v. a complex aspheric element in the fourth group.

2. The wide-angle lens of claim 1 further satisfying the following parametric conditions:

a. $-1.38 = <F1/F = <-0.68$ b. $V2i >= 35.3$ c. $1.27 = <F2/F = <3.56$ d. $-0.66 = <F1/F2 = <-0.33$ e. $23.8 = <V3n = <28.3$ f. $0.6 = <|Rd/F| = <1.51$ g. $|F3/F| = <168.3$ h. $2.23 = <F4/F = <5.36$ where F is the effective focal length of the wide-angle lens, Fi is the effective focal length of the lens group i, V2 is the Abbe number of any lens element in the second group, V3n is the Abbe number of the negative power lens element in the third group and Rd is the radius of curvature of the common surface of the doublet of group 3.

3. The wide-angle lens of claim 1 wherein:
   a. the first lens group is comprised of two negative power meniscus lenses, and,
   b. the second lens group is comprised of two lens elements and the second and last element of the second group is a positive power meniscus element having a concave image-facing surface,
   c. the third lens group is comprised of a cemented doublet,
   d. the fourth lens group is comprised of a positive power lens element,
   e. and all lens elements are spherical.

4. The wide-angle lens of claim 2 wherein:
   a. the first lens group is comprised of two negative power meniscus lenses, and,
   b. the second lens group is comprised of two lens elements and the second and last element of the second group is a positive power meniscus element having a concave image-facing surface,
   c. the third lens group is comprised of a cemented doublet,
   d. the fourth lens group is comprised of a positive power lens element,
   e. and all lens elements are spherical.

5. The wide-angle lens of claim 4 further satisfying the parametric condition:

a. $37.2 = <V2ave = <57.5$ where V2ave is the average value for the abbe number of the lens elements in group 2.

6. The wide-angle lens of claim 2 made according to an optical prescription and the optical prescription is one selected from Tables 1, 2 and 3.

7. The wide-angle lens of claim 1 wherein:
   a. the first lens group is comprised of two negative power meniscus lenses and at least one of the two lens elements in the first lens group is aspherical, and,
   b. the second lens group is comprised of two lens elements,
   c. the third lens group is comprised of a cemented doublet,
   d. the fourth lens group is comprised of a positive power aspherical lens element.

8. The wide-angle lens of claim 7 wherein the two lens elements of the second group are a cemented doublet.

9. The wide-angle lens of claim 7 wherein group 2 is comprised of two lens elements and the second and last element of the second group is a positive power meniscus element having a concave image-facing surface.

10. The wide-angle lens of claim 7 wherein, in group 2, the second and last element of the second group is a positive power meniscus element having a concave image-facing surface.

11. The wide-angle lens of claim 7 wherein, in group 2, the two lens elements are a cemented doublet.

12. The wide-angle lens of claim 7 further satisfying the parametric condition:

$$0.75 = <|F1a|/F4a = <1.25$$

where F1a is the effective focal length of the aspheric lens elements in group 1 and F4a is the effective focal length of the aspheric lens elements in group 4.

13. The wide-angle lens of claim 7 made according to an optical prescription and the optical prescription is one selected from: a) Table 4 and Table 5, and b) Table 6 and Table 7.

14. The wide-angle lens of claim 1 wherein:
   a. the first lens group is comprised of two negative power meniscus lenses and at least one of the two lens elements in the first lens group is aspherical, and,
   b. the second lens group is comprised of one lens element,
   c. the third lens group is comprised of a cemented doublet,
   d. the fourth lens group is comprised of a positive power aspherical lens element.

15. The wide-angle lens of claim 14 further satisfying the parametric condition:

$$0.75 = <|F1a|/F4a = <1.25$$

where F1a is the effective focal length of the aspheric lens elements in group 1 and F4a is the effective focal length of the aspheric lens elements in group 4.

16. The wide-angle lens of claim 14 made according to an optical prescription and the optical prescription is one selected from:
   a. table 8 and table 9
   b. table 10 and table 11
   c. table 12 and table 13
   d. table 14 and table 15.

17. The wide-angle lens of claim 1 wherein:
   a. the first lens group is comprised of a positive lens element and two negative power meniscus lenses and at least one of the two negative lens elements in the first lens group is aspherical, and,
   b. the second lens group is comprised of at least one positive lens element,
   c. the third lens group is comprised of a cemented doublet,
   d. the fourth lens group is comprised of a positive power aspherical lens element.

18. The wide-angle lens of claim 17 further satisfying the parametric conditions:

a. $-1.38 =< F1/F =< -0.68$ b. $37.2 =< V2ave =< 57.5$ c. $1.27 =-< F2/F =< 3.56$ d. $2.23 =< F4/F < 5.36$.

19. The wide-angle lens of claim 17 made according to an optical prescription and the optical prescription is one selected from:
    a. table 16 and table 17
    b. table 18 and table 19
    c. table 20 and table 21.

20. The wide-angle lens of claim 1 wherein:
    a. the first lens group is comprised of two negative power meniscus lenses and at least one of the two negative lens elements in the first lens group is aspherical, all of the aspheric lens elements in group 1 forming a group 1 aspheric subgroup, and,
    b. the second lens group is comprised of two positive power lens elements,
    c. the third lens group is comprised of a cemented doublet,
    d. the fourth lens group is comprised of a positive power aspherical lens element subgroup and at least one surface of the aspherical lens elements in the subgroup is a complex aspherical lens surface.

21. The wide-angle lens of claim 20 further satisfying the parametric conditions:

a. $-1.38 =< F1/F =< -0.68$ b. $F1a/F =< -1.55$ c. $37.2 =< V2ave =< 57.5$ d. $1.27 =< F2/F =< 3.56$ e. $2.23 =< F4/F =< 5.36$ f. $-1.22 =< F1a/F4a =< -0.5$ where F is the effective focal length of the wide-angle lens, F1 is the effective focal length of the first group, F1a is the effective focal length of the aspheric lens subgroup of group 1, V2ave is the average Abbe number of all elements in group 2, F2 is the effective focal length of the second lens group, F4 is the effective focal length of the fourth lens group, and, F4a is the effective focal length of the aspheric subgroup in Group 4.

22. The wide-angle lens of claim 20 made according to an optical prescription and the optical prescription is one selected from:
    a. table 22 and table 23
    b. table 24 and table 25
    c. table 26 and table 27.

\* \* \* \* \*